US005764871A

United States Patent [19]
Fogel

[11] Patent Number: 5,764,871
[45] Date of Patent: *Jun. 9, 1998

[54] METHOD AND APPARATUS FOR CONSTRUCTING INTERMEDIATE IMAGES FOR A DEPTH IMAGE FROM STEREO IMAGES USING VELOCITY VECTOR FIELDS

[75] Inventor: Sergei Valentinovich Fogel, Rochester, N.Y.

[73] Assignee: Eastman Kodak Company, Rochester, N.Y.

[*] Notice: The term of this patent shall not extend beyond the expiration date of Pat. No. 5,530,774.

[21] Appl. No.: 141,157

[22] Filed: Oct. 21, 1993

[51] Int. Cl.$^6$ ................................................. G06T 15/00
[52] U.S. Cl. ........................ 395/127; 395/119; 395/175; 382/154
[58] Field of Search ............................ 395/101, 111, 395/118, 119, 120, 121, 125, 127, 175; 359/465; 348/51; 354/102; 382/154

[56] References Cited

U.S. PATENT DOCUMENTS

| | | | |
|---|---|---|---|
| 4,170,415 | 10/1979 | Lemeshewsky et al. | 355/22 |
| 4,704,627 | 11/1987 | Yuyama et al. | 348/43 |
| 4,781,435 | 11/1988 | Lippmann et al. | 359/464 |
| 4,837,616 | 6/1989 | Kasano et al. | 348/139 |
| 4,870,600 | 9/1989 | Hiraoka | 395/119 |
| 4,875,034 | 10/1989 | Brokenshire | 345/120 |
| 4,894,776 | 1/1990 | Dekel | 364/413.13 |
| 4,899,295 | 2/1990 | Nonweiler | 395/125 |
| 4,940,972 | 7/1990 | Mouchot et al. | 395/121 |
| 4,965,753 | 10/1990 | Kraemer | 395/121 |
| 4,965,840 | 10/1990 | Subbarao | 382/1 |
| 5,030,984 | 7/1991 | Buckler et al. | 354/430 |
| 5,113,213 | 5/1992 | Sandor et al. | 355/22 |
| 5,121,343 | 6/1992 | Faris | 395/111 |
| 5,146,415 | 9/1992 | Faris | 395/101 |
| 5,179,441 | 1/1993 | Anderson et al. | 348/43 |
| 5,220,441 | 6/1993 | Gerstenberger | 358/487 |
| 5,264,964 | 11/1993 | Faris | 359/465 |
| 5,330,799 | 7/1994 | Sandor et al. | 427/510 |
| 5,383,013 | 1/1995 | Cox | 356/2 |
| 5,432,543 | 7/1995 | Hasegawa et al. | 348/45 |
| 5,530,774 | 6/1996 | Fogel | 382/154 |

OTHER PUBLICATIONS

Ribas–Corbera et al., "Interpolation of Cinematic Sequences", Applications of Computer Vision, 1992 Workshop, pp. 36–44.

Dawson et al., "On the usefulness of optical flow for robotic part manipulation", IEEE/RSJ International Workshop on Intelligent Robot and Systems, 1991, pp. 117–122.

Ishiguro et al., "Analysis of Omni–Directional Views at Different Location", IEEE International Workshop on Intelligent Robots and Systems IROS '90, pp. 659–664.

Bandari et al., "Visual Echo Analysis", Computer Vision, 1993 4th International Conference, pp. 220–225.

Tistarelli et al, "Dynamic Stereo in Visual Navigation", IEEE Computer Vision and Pattern Recognition, 1991, pp. 186–193.

Gambotto, "Determining Stereo Correspondences and Ego-motion from a Sequence of Stereo Images", Pattern Recognition, 1990 10th International Conference, pp. 159–262.

(List continued on next page.)

Primary Examiner—Heather R. Herndon
Assistant Examiner—Stephen Hong
Attorney, Agent, or Firm—J. Randall Beckers

[57] ABSTRACT

An interpolation operation is performed between a pair of stereo images to produce plural intermediate images. The interpolation operation involves estimating the velocity vector field of the intermediate images. The estimation for a particular intermediate image includes constraining the search for the correspondences between the two images in the horizontal direction allowing the system to arrive at a more optimal solution. Excessive gap filling by smoothing is not necessary. At the same time the process vertically aligns the entirety of the images.

4 Claims, 3 Drawing Sheets

Microfiche Appendix Included
(1 Microfiche, 63 Pages)

OTHER PUBLICATIONS

Scheuing et al., "Computing depth from dtereo images by using optical flow", Jul. 1986, Pattern Recognition Letters, pp. 205–212.

Agui, "An in-betweening method of Gray-valued images using density contour lines", System & Computers in Japan, Feb. 1986, pp. 89–96.

Gerstenberger, PCT Application WO-A-92 06444, Sep. 1991.

U.S. Ser. No. 07/823723, Filing Date Jan. 22, 1992, Applicant Name Sergei Fogel, Assignee Eastman Kodak Company.

U.S. Ser. No. 07/631750, Filing Date Dec. 20, 1990, Applicant Name Sergei Fogel, Assignee Eastman Kodak Company.

U.S. Ser. No. 07/885699, Filing Date May 19, 1992, Applicant Name Roy T. Taylor et al., Assignee Eastman Kodak Company.

U.S. Ser. No. 07/697868, Filing Date May 9, 1991, Applicant Name Muhammed Ibrahim Sezan et al., Assignee Eastman Kodak Company.

U.S. Ser. No. 07/722713, Filing Date Jun. 27, 1991, Applicant Name Taylor et al., Assignee Eastman Kodak Company.

Chen et al., "View Interpolation for Image Synthesis", Association for Computing Machinery Computer Graphics Proceedings (SIG graph 93), Aug. 1993, pp. 279–288.

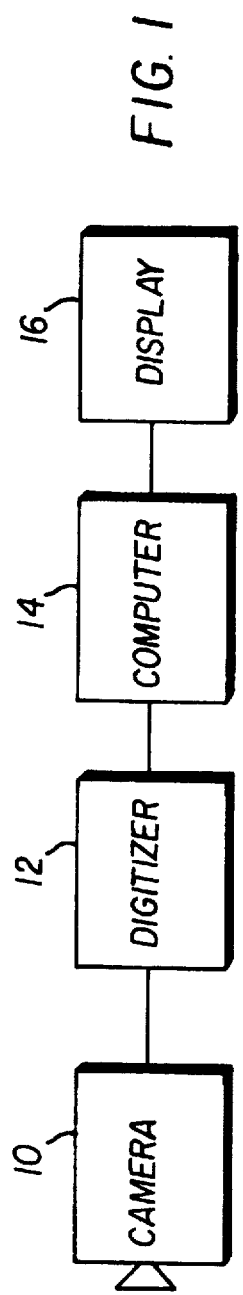
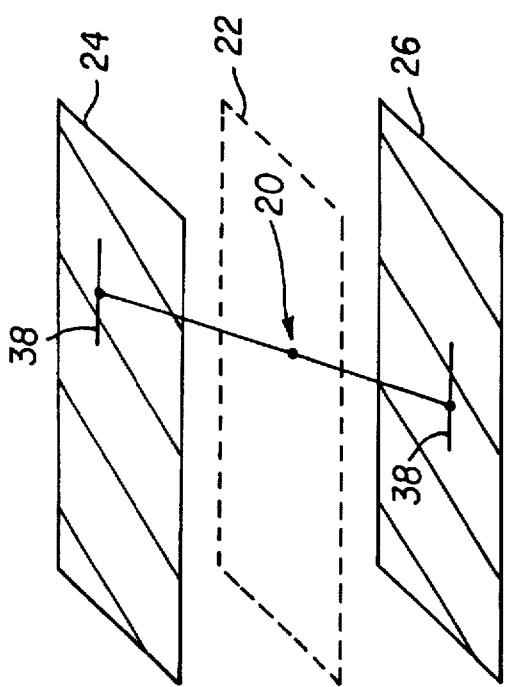
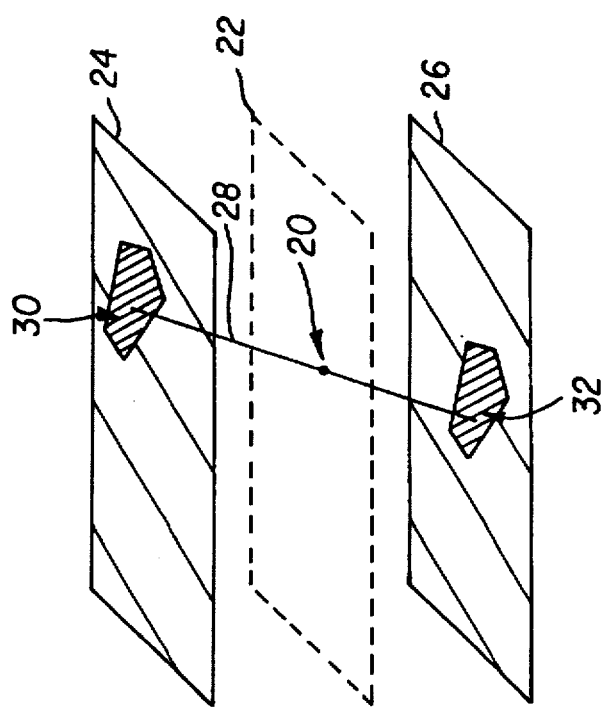
FIG. 1
FIG. 2
FIG. 3

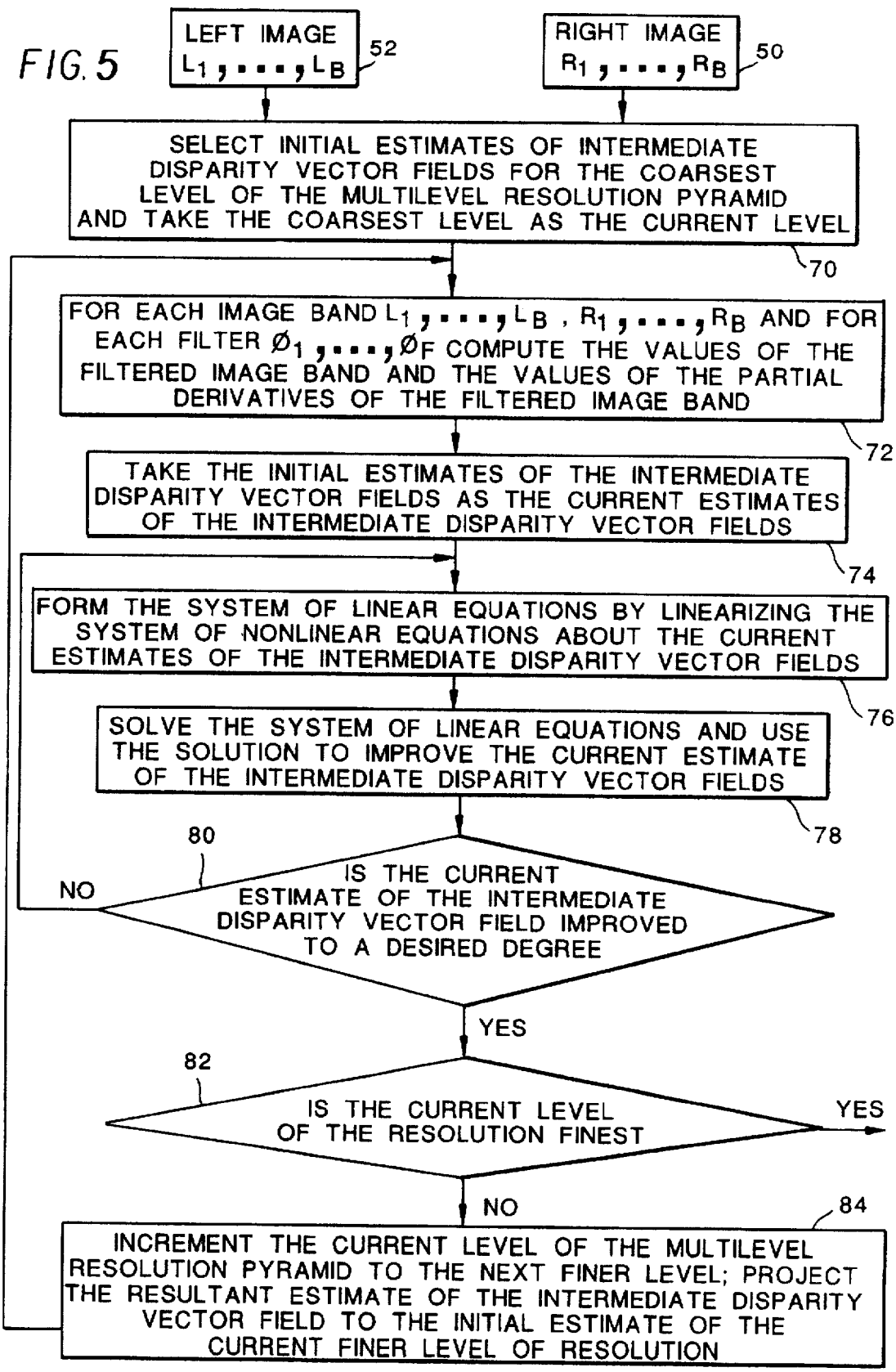

METHOD AND APPARATUS FOR CONSTRUCTING INTERMEDIATE IMAGES FOR A DEPTH IMAGE FROM STEREO IMAGES USING VELOCITY VECTOR FIELDS

REFERENCE TO MICROFICHE APPENDIX

A microfiche appendix of source code in the "C" language having 63 total frames and one total microfiche. The microfiche appendix included herewith provides source code suitable for implementing an embodiment of the present invention on a Sun Microsystem Sparc 10 computer running the Unix operating system.

BACKGROUND OF THE INVENTION

1. Field of the Invention

The present invention relates to a method and an apparatus for constructing a depth image from a pair of stereo images by interpolating intermediate images and then interlacing them into a single image.

2. Description of the Related Art

Producing images that have the perception of depth has traditionally been accomplished by photographic methods. Integral and lenticular photography have a long history of theoretical consideration and demonstration, but have only been met with limited commercial success. Many of the elementary concepts supporting integral and lenticular photography have been known for many years (see Takanori Okoshi, Three-Dimensional Imaging Techniques, Academic Press, New York, 1976; and G. Lippman, "E'preuves re'versibles, Photographics integrales," Comptes Rendus, 146, 446–451, Mar. 2, 1908). The term integral photography refers to the composition of the overall image as an integration of a large number of microscopically small photographic image components. Each photographic image component is viewed through a separate small lens usually formed as part of a mosaic of identical spherically-curved surfaces embossed or otherwise formed onto the front surface of a plastic sheet of appropriate thickness. This sheet is subsequently bonded or held in close contact with the emulsion layer containing the photographic image components. Lenticular photography could be considered a special case of integral photography where the small lenses are formed as sections of cylinders running the full extent of the print area in the vertical direction. A recent commercial attempt at a form of lenticular photography is the Nimslo camera which is now being manufactured by a Hong Kong camera works and sold as a Nishika camera. A sense of depth is clearly visible, however, the images resulting have limited depth realism and appear to jump as the print is rocked or the viewer's vantage relative to the print is changed.

An optical method of making lenticular photographs is described by Okoshi. A photographic camera is affixed to a carriage on a slide rail which allows it to be translated in a horizontal direction normal to the direction of the desired scene. A series of pictures is taken where the camera is translated between subsequent exposures in equal increments from a central vantage point to later vantage points either side of the central vantage point. The distance that the lateral vantage points are displaced from the central vantage point is dependent on the maximum angle which the lenticular material can project photographic image components contained behind any given lenticule before it begins to project photographic image components contained behind an adjacent lenticule. It is not necessary to include a picture from the central vantage point, in which case the number of images will be even. If a picture from the central vantage point is included, the number of images will be odd. The sum of the total number of views contained between and including the lateral vantage points will determine the number of photographic components which eventually will be contained behind each lenticule.

The negatives resulting from each of these views are then placed in an enlarger equipped with a lens of the same focal length the camera lens. Since the camera had been moved laterally between successive exposures as previously described, the positions of the images in the original scene will be seen to translate laterally across the film format. Consequently, the position of the enlarged images from the negatives also move laterally with respect to the center of the enlarger's easel as successive negatives are placed in the film gate. An assemblage consisting of a sheet of photographic material oriented with it's emulsion in contact with the flat back side of a clear plastic sheet of appropriate thickness having lenticules embossed or otherwise formed into its other side, is placed on the enlarger easel with the lenticular side facing the enlarger lens. The position of this sheet on the easel is adjusted until the field of the central image is centered on the center of this assemblage, and an exposure of the information being projected out of the enlarger lens is made through the lenticules onto the photographic emulsion. Subsequently, negatives from the successive exposures are placed in the film gate and the position of this assemblage is readjusted on the easel to reposition each respective view to the center of the assemblage, and additional exposures of the information being projected from the enlarger lens are be made. When all the views contained between the lateral vantages have been similarly exposed on the emulsion through the lenticular plastic sheet, the film sheet can be separated from the lenticular plastic sheet and developed. If the aperture diameter of the enlarger lens is set to equal the amount of lateral shift between alternate views, the space behind each lenticule will be found to be exactly filled with photographic image components. The final step in this process is to reassemble the photographic film and the plastic sheet again with intimate contact between the emulsion layer and the flat side of the lenticular plastics heet and so positioned laterally, so that the long strips of adjacent images resulting from exposures through the cylindrical lenticules are again positioned in a similar manner under the lenticules for viewing.

Ideally, an integral or lenticular photograph displays an infinite number of different angular views from each lenslet of lenticule. This is impossible since each angular view must have a corresponding small finite area of exposed emulsion or other hard copy media. Consequently, as an upper limit, the number of views must not exceed the resolution limit of the hard copy media. In the Nimslo print, the number of views behind each lens is limited to four views, two of which were considered left perspective views and the remaining two as right perspective views. This is well below the resolution limit of conventional photographic emulsions and allows for only two options of stereoscopic viewing perspective as the viewer's head moves laterally.

The optical multiple projection method was also utilized in many experiments by Eastman Kodak researchers and engineers in the 1960's and 1970's and produced a lenticular photo displayed on the front cover of the 1969 Annual Report to Stockholders. This print had a large number of cameras taking alternate views of the scene to provide a smooth transition of perspectives for each lens. It is possible that as many as 21 different angular views were present and the result is much more effective. This method of image recording is called an "indirect" technique because the final print recording is indirectly derived from a series of two-dimensional image recordings.

A more modern method of creating a lenticular print of depth image is to photographically capture two or more spatially separated images of the same scene and digitize the images, or capture digital images electronically. The digitized images are used to drive a printer to print the images electronically onto a print or transparency media to which a lenticular faceplate is attached for viewing. This method of creating a depth image is typified by U.S. Pat. No. 5,113,213 and U.S. application Ser. No. 885,699 (Kodak Dkt. 64.374).

One problem with the above-described methods is that quite often the images are captured at a location distant from the printing site and if more images of the scene are necessary to provide a realistic sense of depth, the process of capturing, etc. must be completely performed again. Since images are digital and are processed for printing by a computer it is possible to solve this problem by using the computer to create the extra needed images using interpolation. However, conventional interpolation is not suitable because of problems related to object occlusion. A process for creating the extra needed images is described in U.S. application Ser. No. 07/722,713. However, this approach does not produce the best intermediate image possible because an optimal solution is not always found during the search for the features of the intermediate image due to the multidimensional searching and the requirement for image smoothing when a multidimensional search is being performed.

A second problem with the above systems is that plural images must be stored between which the interpolated intermediate images are created.

What is needed is a system of stereo image interpolation which will produce multiple intermediate images between a pair of captured images such that the intermediate image quality is better because more optimal solutions to the search are found requiring less images smoothing.

SUMMARY OF THE INVENTION

It is an object of the present invention to produce a depth image that is more appealing to the viewer.

It is another object of the present invention to create several intermediate images from a single pair of stereo images.

It is also an object of the present invention to constrain the image search process in a horizontal direction to improve interpolated image quality and reduce the need for filling in image gaps with image smoothing processes.

It is an additional object of the present invention to align the entirety of the stereo images in the vertical direction in a single operation.

The present invention accomplishes the above objects by performing an interpolation operation between a pair of stereo images to produce plural intermediate images which are then used to produce a depth image. The interpolation operation involves estimating the velocity vector field of the intermediate images. The estimation for a particular intermediate image involves constraining the search for the correspondences between the two images in the horizontal direction allowing the system to arrive at a more optimal solution which as a result does not require excessive gap filling by smoothing and which at the same time vertically aligns the entirety of the images.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 depicts the hardware components of the present invention;

FIG. 2 illustrates two dimensional searching during correspondence processing;

FIG. 3 depicts one dimensional searching during correspondence processing;

FIG. 5 illustrates disparity vector field processing.

DESCRIPTION OF THE PREFERRED EMBODIMENTS

Figure 4:
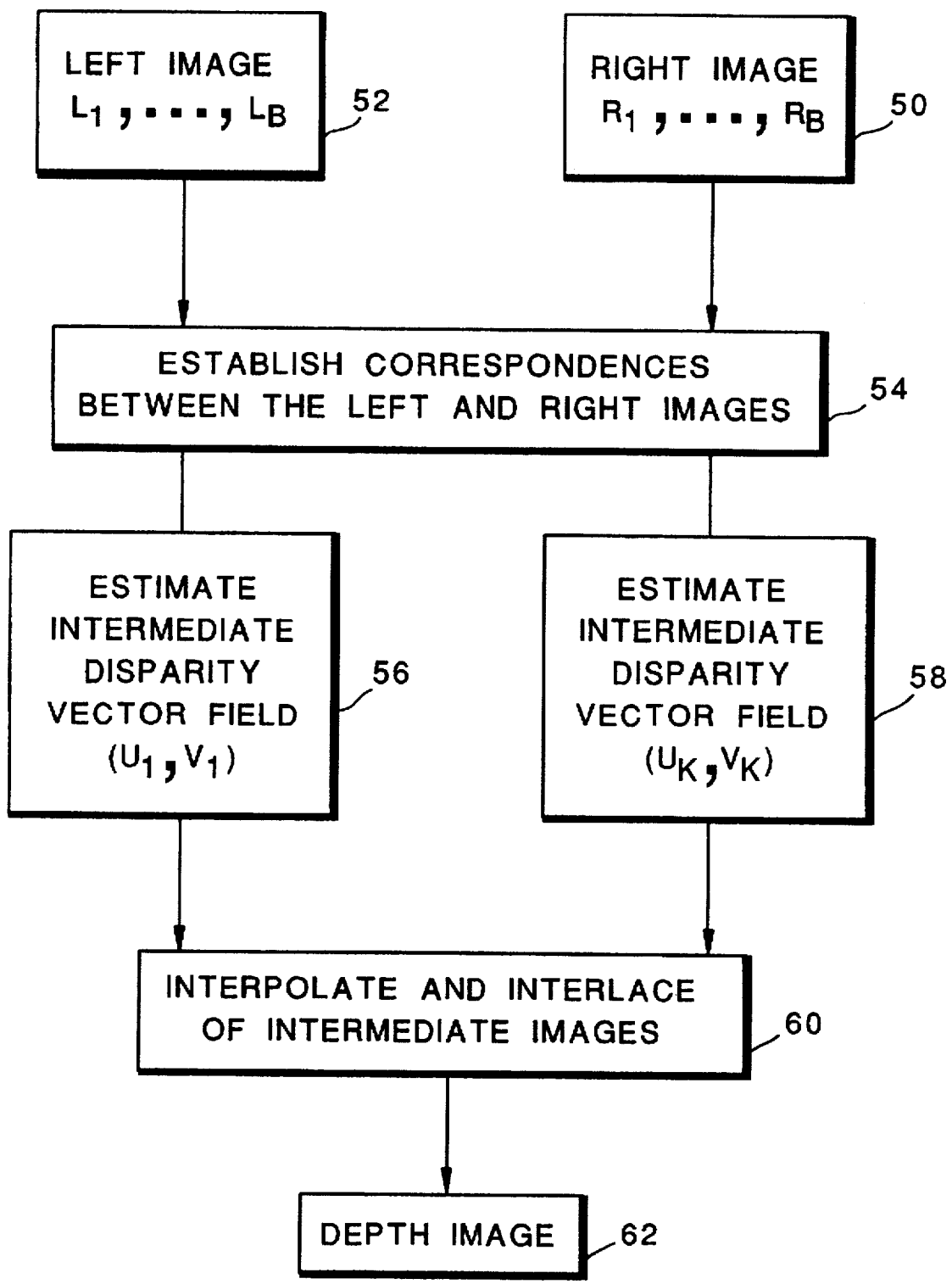
FIG. 4 is a block diagram of the processes of the present invention.

The present invention is designed to obtain images intermediate to a pair of stereo images so that a depth image, such as a lenticular or barrier image, can be created. The present invention, as illustrated in FIG. 1, is implemented using conventional image processing equipment. The equipment includes one or more cameras 10 that captures stereo images on film. The film images are digitized by a conventional digitizer 12. An electronic camera can of course substitute for the film camera and digitizer. The digitizer images are supplied to a computer 14 which performs the process discussed herein to create intermediate images. The images are interlaced and provided to a display device 16. The display device 16 can be a CRT with a lenticular or barrier strip faceplate or it can be a print or transparency printer which produces a print to which a lenticular or barrier strip faceplate is attached.

To obtain the most appealing perception of depth it is desirable to produce a depth image with the maximum number of angular views. It is also desirable to reduce the number of optically recorded images to a single pair of stereo images and to reconstruct the images corresponding to the missing angular views (the intermediate images) from this stereo pair. To reconstruct the intermediate images, first the correspondences between the stereo pair are established, then these correspondences are used to estimate the intermediate images through an interpolation process. The correspondence between the stereo pair establishes the apparent movement in the two images caused by differences in the position of the camera lens. By considering the change in position of a point as a vector a means of estimating images as if a camera was positioned intermediate between the two actual cameras can be established. Not all points will have corresponding points, primarily due to occlusions, and allowances must be made to reconstruct images with these occurences. This vector field is commonly referred to as the optical flow (see Robot Vision, B. K. P. Horn, The MIT Press, 1991). One of the well-known characterizations of optical flow is that depth is inversely proportional to the magnitude of the optical flow vector. In this instance the zero parallax plane occurs in object space where the optical flow vectors have magnitude zero, i.e., points unaffected by the change of camera position, such as the background.

In creating a pixel 20 (See FIG. 2) of an intermediate image 22 the first step is to find correspondences between the pair of images 24 and 26. To find the corresponding portions of pair of images a vector or line 28 passing through the pixel 20 being created in the intermediate image is used to designate different areas on the images 24 and 26 are to be compared. Essentially the point of incidence on the images 24 and 26 can be systematically moved about two dimensional areas 30 and 32 searching for the areas that have the highest correlation in spectral and other image characteristics. Once these points are found the correspondences can be used to interpolate the value of the intermediate pixel 20. The correspondences between two images in two dimensions does not have a unique solution and, as a result, a search process as illustrated in FIG. 2 may not produce the best solution. In addition, because the solution is not unique it is necessary to perform smoothing of the image to reduce or eliminate noise artifacts created in the intermediate image 22.

The process of establishing correspondence when stereo images are involved can be enhanced and the solution improved by recognizing that the two images are of the same scene. The only difference being the horizontal displacement of the views or points from which the images were captured. Instead of searching a two dimensional area as in FIG. 2, a one dimensional search along the horizontal axis 38 of the images is performed as illustrated in FIG. 3.

Given this understanding of the concept of the present invention, the problem being solved by the present invention can be stated in more detail.

Given a pair of stereo images (images of a scene taken from different viewpoints) estimates of intermediate images (images taken from some intermediate viewpoints) must be found and the depth image constructed by interlacing the intermediate images. To estimate the intermediate images, the correspondences between the stereo image pair must be established, then these correspondences used to estimate the intermediate images through an interpolation process. The axes of the scene coordinate system are defined as the horizontal axis, the vertical axis, and the depth axis. The selection of the viewpoints is restricted in such a way that the image planes of the pair of stereo images coincide with the plane of the scene spanning the horizontal and the vertical axes. The cameras used in obtaining the stereo image pair are assumed to be positioned parallel to the plane of the scene spanning the horizontal and vertical axes, and the changes in the camera positions are assumed to be strictly in the horizontal direction. It is assumed that the horizontal and the vertical axes of each image of the stereo image pair coincide with the horizontal and the vertical axes of the scene. Under these assumptions the correspondence between the images of the stereo image pair can be characterized by the intermediate disparity vector field with the constant vertical component relating to the alignment of the images and with the variable horizontal component relating to the depths of the corresponding points in the scene.

To solve this problem as discussed hereinafter an overview of the right and the left images of the scene forming a stereo image pair and taken by a camera are digitized into multi-banded digital images with a fixed number of spectral band, B. Each band of the right and the left digital images is defined as a two-dimensional array of numbers representing some measurements, known as pixels, taken from some grid of points $\Omega''$ on the sensed image. In the preferred embodiment, this grid is assumed to be a rectangular lattice. Given the right digital image 50 (See FIG. 4) taken at the viewpoint $t_R$ and comprising of the spectral bands $R_1, \ldots, R_B$, and given the left digital image 52 taken at the viewpoint $t_L$ and comprising of the spectral bands $L_1, \ldots, L_B$, the process of constructing the depth image consisting of the bands $D_1, \ldots, D_B$ is illustrated in FIG. 4 and can be described as follows. First the correspondences between the left and right images are established 54, and the intermediate disparity vector fields $(U_1, V_1), \ldots, (U_K, V_K)$ at some intermediate viewpoints $t_1, \ldots, t_K$ respectively are estimated 56 and 58. Then for each band $b=1, \ldots, B$ and for each intermediate viewpoint $t_K, k=1, \ldots, K$, the estimate of the intermediate image band $I_{b,k}$ is obtained 60 by the interpolation process. Finally, for each image band the depth image band $D_b$ is constructed by interlacing the intermediate image bands $I_{b,1}, \ldots, I_{b,K}$ to produce the depth image 62.

For each $k=1, \ldots, K$ the method of estimating the intermediate disparity vector field $(U_k, V_k)$ at the intermediate viewpoint $t_k$ is illustrated in FIG. 5 and can be described as the following multi-level resolution process: 1) Start 70 with the coarsest resolution level and the current estimate of the intermediate disparity vector field, (initially set to some constant); 2) Iteratively 72–82 improve the current estimate; 3) Project 84 to the next finer level of resolution to obtain the initial estimate of the intermediate disparity vector field at the next finer level which is taken as the current estimate of the intermediate disparity vector field; 4) Repeat steps 2) and 3) until the finest resolution level is reached.

The proper estimate of the finest resolution level is taken as the final estimate of the intermediate disparity vector field.

On each level of the multi-level resolution process a system of nonlinear equations relative to the unknown current estimate of the intermediate disparity vector field is formed 76, then iterative improvement of the current estimate of the intermediate disparity vector field is achieved by solving 78 this system of nonlinear equations. The system of nonlinear equations relative to the unknown current estimate of the intermediate disparity vector field is defined in terms of the unknown current estimate of the intermediate disparity vector field, the quantities related to the right and to the left pixels and the generalized spatial partial derivatives of the right and the left images. These quantities are obtained by filtering each band of the right and the left images with filters $\phi_1, \ldots, \phi_F$ and with the spatial partial derivatives of these filters. The symbol G is used for the set of indices with each index $g \in G$ specifying a particular band and a particular filter. The multi-level resolution process (See U.S. application Ser. No. 631,750 incorporated by reference herein) is built around a multi-level resolution pyramid meaning that on each coarser resolution level the filtered right and the filtered left images, their spatial partial derivatives and the estimates of the intermediate disparity vector fields are defined on subgrids of grids at a finer resolution level.

At a given resolution level the bands of the filtered right images, the spatial partial derivatives of the bands of the filtered right images, the bands of the filtered left images, and the spatial partial derivatives of the bands of the filtered left images are defined on the same grid of points $\Omega'$ on the image plane of size N' by M'. At the same resolution level the intermediate disparity vector fields are defined on a grid of points $\Omega$ on the image plane of size N by M. (In the following discussion the partial spatial derivatives taken with respect to the vertical direction will have the subscript v, and analogously partial spatial derivatives with respect to the horizontal direction will have the subscript u.) To form the system of nonlinear equations at this resolution level proceed as follows:

For each index $g \in G$ specifying a particular filter and a particular image band, form an optical flow function $g_t$ relative to a grid $\Omega$ as the difference between the estimated right filtered image band and the estimated left filtered image band. To obtain the estimated right filtered image band, find the grid of image points $\Omega_R$ which are the taken from the viewpoint $t_R$ estimated perspective projections onto the image plane of the visible points in the scene, whose perspective projections onto the image plane from the viewpoint $t_k$ are the grid points $\Omega$; and then interpolate the right filtered image from the grid of points $\Omega'$ where the right filtered image is defined to the grid of points $\Omega_R$. The estimated left filtered image band is determined analogously. To obtain the grid of image points $\Omega_R$, each image point of the grid $\Omega$ is shifted by the amount equal to the scaled by the factor $(t_R-t_k)/(t_R-t_L)$ value of the estimated intermediate disparity vector defined at that grid point. To obtain the grid of image points $\Omega_L$, each image point of the grid $\Omega$ is shifted by the amount equal to the scaled by the factor $(t_k-t_L)/(t_R-t_L)$ value of the estimated intermediate disparity vector defined at that grid point.

For each index $g \in G$ specifying a particular filter and a particular image band, form a spatial partial derivative $g_{ru}$ of the optical flow function $g_t$ with respect to the component u of the current estimate of the intermediate disparity vector corresponding to the index g as the defined on the grid $\Omega$ sum of the scaled by the factor $(t_R-t_k)/(t_R-t_L)$ spatial partial derivative of the estimated right filtered image band and the scaled by the factor $(t_k-t_L)/(t_R-t_L)$ spatial partial derivative of the estimated left filtered image band. To obtain the spatial partial derivative of the estimated right filtered image band, find the grid of image points $\Omega_R$ which are taken from the viewpoint $t_R$ estimated perspective projections onto the image plane of the visible points in the scene, whose perspective projections onto the image plane from the viewpoint $t_k$ are the grid points $\Omega$; and then interpolate the spatial partial derivatives of the right filtered image from the grid of points $\Omega'$ where the spatial partial derivative of the right filtered image is defined to the grid of points $\Omega_R$. To obtain the spatial partial derivative of the estimated left filtered image band, find the grid of image points $\Omega_L$ which are taken from the viewpoint $t_L$ estimated perspective projections onto the image plane of the visible points in the scene, whose perspective projections onto the image plane from the viewpoint $t_k$ are the grid points $\Omega$; and then interpolate the spatial partial derivatives of the left filtered image from the grid of points $\Omega'$ where the spatial partial derivative of the left filtered image is defined to the grid of points $\Omega_L$. To obtain the grid of image points $\Omega_R$, each image point of the grid $\Omega$ is shifted by the amount equal to the scaled by the factor $(t_R-t_k)/(t_R-t_L)$ value of the estimated intermediate disparity vector defined at that grid point. To obtain the grid of image points $\Omega_L$, each image point of the grid $\Omega$ is shifted by the amount equal to the scaled by the factor $(t_k-t_L)/(t_R-t_L)$ value of the estimated intermediate disparity vector defined at that grid point.

For each index $g \in G$ specifying a particular filter and a particular image band, form a spatial partial derivative $g_{rv}$ of the optical flow function $g_t$ with respect to the component v of the current estimate of the intermediate disparity vector corresponding to the index g as the defined on the grid $\Omega$ sum of the scaled by the factor $(t_R-t_k)/(t_R-t_L)$ spatial partial derivative with respect to the vertical component of the image coordinate system of the estimated right filtered image band corresponding to the index g and the scaled by the factor $(t_k-t_L)/(t_R-t_L)$ spatial partial derivative with respect to the vertical component of the image coordinate system of the estimated left filtered image band corresponding to the index g. To obtain the spatial partial derivative with respect to the vertical component of the image coordinate system of the estimated right filtered image band, find the grid of image points $\Omega_R$ which are the taken from the viewpoint $t_R$ estimated perspective projections onto the image plane of the visible points in the scene, whose pespective projections onto the image plane from the viewpoint $t_k$ are the grid points $\Omega$; and then interpolate the spatial partial derivatives with respect to the vertical component of the image coordinate system of the right filtered image from the grid of points $\Omega'$ where the spatial partial derivative with respect to the vertical component of the image coordinate system of the right filtered image is defined to the grid of points $\Omega_R$. To obtain the spatial partial derivative with respect to the vertical component of the image coordinate system of the estimated left filtered image band, find the grid of image points $\Omega_L$ which are taken from the viewpoint $t_L$ estimated perspective projections onto the image plane of the visible points in the scene, whose perspective projections onto the image plane from the viewpoint $t_k$ are the grid points $\Omega$; and then interpolate the spatial partial derivatives with respect to the vertical component of the image coordinate system of the left filtered image from the grid of points $\Omega'$ where the spatial partial derivative with respect to the vertical component of the image coordinate system of the left filtered image is defined to the grid of points $\Omega_L$. To obtain the grid of image points $\Omega_R$, each image point of the grid $\Omega$ is shifted by the amount equal to the scaled by the factor $(t_R-t_k)/(t_R-t_L)$ value of the estimated intermediate disparity vector defined at the grid point. To obtain the grid of image points $\Omega_L$, each image point of the grid $\Omega$ is shifted by the amount equal to the scaled by the factor $(t_k-t_L)/(t_R-t_L)$ value of the estimated intermediate disparity vector defined at the grid point.

Each non-boundary grid point of the rectangular grid $\Omega$ is surrounded by its eight nearest neighbors specifying eight different directions on the image plane. For each boundary grid point of the rectangular grid $\Omega$ the nearest neighbors are present only for some of these eight different directions. The symbol s is used to denote a vector on the image plane specifying one of these eight different directions on the image plane. The symbol S is used to denote the set of these eight vectors. For each vector s from the set S specifying a particular direction on the image plane, form a directional smoothness function $(s, \nabla u)$ for the variable horizontal component u of the current estimate of the intermediate disparity vector field as a finite difference approximation to the directional derivative of the horizontal component u of the current estimate of the intermediate disparity vector field. This directional smoothness function $(s, \nabla u)$ is defined on the rectangilar subgrid $\Omega_s$ of the rectangular grid $\Omega$ with the property that every grid point of the rectangilar subgrid $\Omega_s$ has the nearest in the direction s neighbor on the rectangular grid $\Omega$. At each grid point of the rectangular subgrid $\Omega_s$ the directional smoothness function $(s, \nabla u)$ is equal to the difference between the value of the horizontal component u of the current estimate of the intermediate disparity vector field at the nearest in the direction s neighbor of this grid point and the value of the horizontal component u of the current estimate of the intermediate disparity vector field at this grid point.

The system of nonlinear equations relative to the unknown current estimate of the intermediate disparity vector field is formed by combining the optical flow function $g_t$ and its spatial partial derivatives $g_{ru}$, $g_{rv}$ for each filter and each image band specified by the index $g \in G$ together with the directional smoothness function $(s, \nabla u)$ for each image direction $s \in S$ and together with some constant parameters using four basic algebraic operations such as addition, subtraction, multiplication and division.

Given the right digital image taken at the right viewpoint $t_R$ and consisting of the bands $R_1, \ldots, R_B$, and given the left digital image taken at the left viewpoint $t_L$ and consisting of the bands $L_1, \ldots, L_B$, the method of estimating the intermediate digital image taken at the intermediate viewpoint $t_k$ and consisting of the bands $I_{1,k}, \ldots, I_{B,k}$ based on the estimate of the intermediate disparity vector field $(U_k, V_k)$ obtained at the intermediate viewpoint $t_k$ can be described as follows. For each image band $b=1, \ldots, B$ the estimate of the intermediate digital image band $I_{b,k}$ is defined as the sum of the scaled by the factor $(t_k-t_L)/(t_R-t_L)$ estimated right digital image band and the scaled by the factor $(t_R-t_k)/(t_R-t_L)$ estimated left digital image band. To obtain the estimated right digital image band, find the grid of image points $\Omega_R$ which are the taken from the viewpoint $t_R$ estimated perspective projections onto the image plane of the visible points in the scene, whose perspective projections onto the image plane from the viewpoint $t_k$ are the grid points $\Omega$; and then interpolate the right digital image band from the grid of points $\Omega"$ where the right digital image is defined to the grid of points $\Omega_R$. To obtain the estimated left digital image band, find the grid of image points $\Omega_L$ which are the taken from the viewpoints $t_L$ estimated perspective projections onto the image plane of the visible points in the scene, whose perspective projections onto the image plane from the viewpoint $t_k$ are the grid points $\Omega$; and then interpolate the left digital image band from the grid of points $\Omega"$ where the left digital image is defined to the grid of points $\Omega_L$. To obtain the grid of image points $\Omega_R$, each image point of the grid $\Omega$ is shifted by the amount equal to the scaled by the factor $(t_R-t_k)/(t_R-t_L)$ value of the estimated intermediate disparity vector defined at that grid point. To obtain the grid of image points $\Omega_L$, each image point of the grid $\Omega$ is shifted by the amount equal to the scaled by the factor $(t_k-t_L)/(t_R-t_L)$ value of the estimated intermediate disparity vector defined at that grid point.

To provide a more thorough understanding of the fundamental operations of the present invention the following more detailed explanation is provided.

In what follows a more general problem is considered and some of the notation is changed. The above mentioned right digital image which is taken at the viewpoint $t_R$ and consists of the bands $R_1, \ldots, R_B$ and the above mentioned left digital image which is taken at the viewpoint $t_L$ and consists of the bands $L_1, \ldots, L_B$ are both represented in what follows by the irradiance image functions $\xi(x,y,t)$, $\xi\epsilon\Theta$. For a fixed $k=1, \ldots, K$ the above mentioned intermediate disparity vector field $(U_k,V_k)$ which is defined at the intermediate viewpoint $t_k$ is represented in what follows by the parametric velocity vector field estimate $\{(\tilde{u}^\sigma(x,y,t_k), \tilde{u}(t_k))|(x,y)\epsilon\Omega, \sigma\epsilon[1,\infty]\}$. The pair of stereo viewpoints $\{t_R, t_L\}$ is represented in what follows by the sequence of viewpoints $\{t"_o, \ldots, t"_{k"}\}$ where $K"=1$.

We shall deal with images of a three-dimensional scene and their spatial partial derivatives taken at the viewpoints within some interval T. The initial images of a three-dimensional scene are, in general, discontinuous functions and their spatial partial derivatives are not defined at the points of discontinuity. The points of discontinuity are, often, among the most important points in the images and cannot be easily ignored. To overcome these difficulties the initial images are treated as generalized functions and their partial derivatives as generalized partial derivatives. These generalized functions are defined on some subset of the set of infinitely differentiable functions. The functions from the subset are called "testing functions". Parametric families of secondary images are then introduced through evaluations of the generalized functions associated with the initial images on the specific parametric family of functions taken from the set of testing functions. The secondary images are infinitely differentiable, and their partial derivatives can be obtained through evaluations of the generalized functions associated with the initial images on the partial derivatives of this specific parametric family of functions. This process can be described as follows.

One way of constructing an initial image for a given viewpoint $t \in R$ (here R is a one-dimensional Euclidean space) is by projecting the light reflected by the objects in the scene onto a two-dimensional Euclidean space $R^2$, called the "image plane", and then identifying the irradiance value $\xi(x,y,t)$ of each point $(x,y)$ in the image plane $R^2$. The function $\xi(x,y,t)$ defined as above will be called the "irradiance image function". The value $\xi(x,y,t)$ of the irradiance image function at the point $(x,y) \in R^2$ and the viewpoint $t \in R$ is assumed to be roughly proportional to the radiance of the point in the scene being imaged, which projects to such a point $(x,y)$ at the viewpoint t for every $(x,y) \in R^2$ and every $t \in R$. Different irradiance image functions $\xi(x,y,t)$, $(x,y,t)\in R^3$ (here $R^3$ is a three-dimensional Euclidean space) can be obtained by changing the following aspects of the image formation process: the direction of a light source illuminating the scene, the color of such a light source, and the spectral responsivity function that is used to compute the irradiance.

Assume that each irradiance image function $\xi(x,y,t)$ is locally integrable with respect to the Lebesgue measure dx dy dt in $R^3$ and thereby can be used to form a continuous linear functional $\Gamma_\xi$ (generalized function) defined on the locally convex linear topological space $\Phi(R^3)$. The space $\Phi(R^3)$ consists of all infinitely differentiable functions having compact supports in the set $R^3$. This means that for each function $\phi\epsilon\Phi(R^3)$ there exists a closed bounded subset $S_\phi\epsilon R^3$ such that the function $\phi$ is equal to zero at the points that are outside the subset $S_\phi$. The topology of the space $\Phi(R^3)$ is defined by a certain family of semi-norms. The functions $\phi$ from the set $\Phi(R^3)$ will be called the "testing functions". The value of the generalized function $\Gamma_\xi$ associated with the irradiance image function $\xi$ at the testing function $\phi\epsilon\Phi(R^3)$ is defined by the following relation:

$$\Gamma\xi(\phi) = \int \int_{R^3} \int \xi(x, y, t)\phi(x, y, t)dx\, dy\, dt. \qquad (2\text{-}1)$$

The generalized function $\Gamma_\xi$ associated with different irradiance image functions $\xi(x,y,t)$ are united into the family $\{\Gamma_\xi|\xi\epsilon\Theta\}$. Here, to simplify the notation, the symbol $\xi$ takes the role of the index (parameter) specifying the generalized function $\Gamma_\xi$ associated with a particular irradiance image function $\xi(x,y,t)$ in addition to its role as a part of the notation for such an irradiance image function. The symbol $\Theta$ denotes the set of indices.

Another way of constructing an initial image at a given viewpoint $t \in R$ is by identifying the set of points $M(t)\subset R^2$ in the image plane, called the "feature points", where significant variations in the projected light patterns represented by the irradiance image functions take place at the viewpoint t, and then assigning feature value $\eta(x_\mu,y_\mu,t_\mu)$ to each feature point $(x_\mu,y_\mu,t_\mu)\epsilon M(t)$. The set of feature points $$M \equiv \bigcup_{t\epsilon R} M(t)$$

is assumed to be a closed subset of the space $R^3$. The function $\eta(x_\mu,y_\mu,t_\mu)$ defined on the set M as above will be called the "feature image function". Different feature image functions $\eta(x_\mu,y_\mu,t_\mu)$, $(x_\mu,y_\mu,t_\mu)\epsilon M$ can be obtained by changing the criteria for selecting the set of feature points M and the criteria for assigning the feature value $\eta(x_\mu, y_\mu, t_\mu)$. The set M may, for example, be a finite combination of the following four types of the subsets of the space $R^3$: the three-dimensional regions, the two-dimensional regions, the one-dimensional contours, and the isolated points.

By the family $B \equiv B(M)$ of "Borel subsets" of the set M shall be meant the members of the smallest σ-finite, σ-additive family of subsets of M which contains every compact set of M. Let μ(B) be a σ-finite, σ-additive, and real-valued measure defined on the family B of Borel subsets of the set M. The feature image function $\eta(x_\mu, y_\mu, t_\mu), (x_\mu, y_\mu, t_\mu) \in M$ is assumed to be μ-measurable and thereby can be used to form a continuous linear functional $\Gamma_\eta$ (generalized function) defined on the locally convex linear topological space $\Phi(R^3)$. The value of the generalized function $\Gamma_\eta$ associated with the feature image function η at the testing function $\phi \in \Phi(R^3)$ is given by the following relation:

$$\Gamma_\eta(\phi) = \int \int_M \int \eta(x_\mu, y_\mu, t_\mu) \phi(x_\mu, y_\mu, t_\mu) \, d\mu. \qquad (2\text{-}2)$$

The generalized function $\Gamma_\eta$ associated with different feature image functions $\eta(x_\mu, y_\mu, t_\mu)$ are united into the family $\{\Gamma_\eta | \eta \in H\}$. Here, to simplify the notation, the symbol η takes the role of the index (parameter) specifying the generalized function $\Gamma_\eta$ associated with a particular feature image function $\eta(x_\mu, y_\mu, t_\mu)$ in addition to its role as a part of the notation for such a feature image function. The symbol H denotes the set of indices.

Given a generalized function F defined on the locally convex linear topological space $\Phi(R^3)$, and given non-negative integer constants $m_x, m_y, m_t$ the "generalized partial derivative"

$$\frac{\partial^{m_x+m_y+m_t}}{\partial x^{m_x} \partial y^{m_y} \partial t^{m_t}}$$

of the generalized function F is the generalized function $$\frac{\partial^{m_x+m_y+m_t}}{\partial x^{m_x} \partial y^{m_y} \partial t^{m_t}} F$$

defined on the locally convex linear topological space $\Phi(R^3)$ as follows. The value of the generalized function $$\frac{\partial^{m_x+m_y+m_t}}{\partial x^{m_x} \partial y^{m_y} \partial t^{m_t}} F$$

at a testing function $\phi \in \Phi(R^3)$ is the value of the generalized function F itself at the testing function $$\phi_{m_x, m_y, m_t} \in \Phi(R^3),$$

$$\phi_{m_x, m_y, m_t}(x, y, t) \equiv (-1)^{m_x+m_y+m_t} \frac{\partial^{m_x+m_y+m_t}}{\partial x^{m_x} \partial y^{m_y} \partial t^{m_t}} \phi(x, y, t),$$

$(x, y, t) \in R^3$.

A "combined generalized initial image function" will be defined as a linear combination of the generalized partial derivatives of the generalized functions associated with the irradiance image functions and one of the generalized partial derivatives of the generalized functions associated with the feature image functions. Let $\lambda \equiv \{\lambda_\xi, \lambda_\eta | \xi \in \Theta, \eta \in H\}$ be a set of real-valued constants; let $g(\lambda)$ be an index attached to the set λ; and let $m_{g(\lambda)} \equiv \{m_{\lambda,x}, m_{\lambda,y}, m_{\lambda,t}, m_{\eta,x}, m_{\eta,y}, m_{\eta,t} | \xi \in \Theta,$ $\eta \in H\}$ be a set of non-negative integer constants corresponding to the set of constants λ. Then the combined generalized initial image function corresponding to the set of constants λ is the generalized function $\Gamma_{g(\lambda)}$ defined on the locally convex linear topological space $\Phi(R^3)$. The value of the combined generalized initial image function $\Gamma_{g(\lambda)}$ corresponding to the set of constants λ at the testing function $\phi \in \Phi(R^3)$ is given by the relation $$\Gamma_{g(\lambda)}(\phi) = \sum_{\xi \in \Xi} \lambda_\xi \frac{\partial^{m_{\xi,x}+m_{\xi,y}+m_{\xi,t}}}{\partial x^{m_{\xi,x}} \partial y^{m_{\xi,y}} \partial t^{m_{\xi,t}}} \Gamma_\xi(\phi) + \qquad (2\text{-}3)$$

$$\sum_{\eta \in H} \lambda_\xi \frac{\partial^{m_{\eta,x}+m_{\eta,y}+m_{\eta,t}}}{\partial x^{m_{\eta,x}} \partial y^{m_{\eta,y}} \partial t^{m_{\eta,t}}} \Gamma_\xi(\phi)$$

and is called the "observation" of the combined generalized initial image function $\Gamma_{g(\lambda)}$ corresponding to the set of constants λ on the testing function $\phi$. The combined generalized initial image functions $\Gamma_{g(\lambda)}$ corresponding to sets of constants λ with different values are united into the family $\{\Gamma_{g(\lambda)} | \lambda \in \Lambda\}$. Here the symbol λ denotes the family of all different sets of constants λ, while the symbol g denotes the one-to-one mapping from the family Λ onto the set of indices denoted by the symbol G. In what follows, to simplify the notation, the argument λ appearing in the notation for a combined generalized initial image function is omitted and the symbol $\Gamma_g$, $g \in G$ is used instead of the symbol $\Gamma_{g(\lambda)}$, $\lambda \in \Lambda$ to denote it.

Assume that there is a given fixed testing function $\psi \in \Phi(R^3)$, which will be called the "measurement function". (An example of the measurement function ψ is given later.) Let $g \in G$; then for every point (x,y) of some convex bounded subset $\Omega \subset R^2$ (such points will be called "image points"), for every viewpoint $t \in T$, and for every value of the parameter $\sigma \in [1, \infty)$, the value of the component $g^\sigma(x,y,t)$ of the image corresponding to the parameter value σ at the image point (x,y) and the viewpoint t is determined as the observation $\Gamma_g(\psi^\sigma_{x,y,t})$ of the combined generalized initial image function $\Gamma_g$ on the testing function $$\psi^\sigma_{x,y,t} \in \Phi(R^3), \qquad (2\text{-}4)$$

$$\psi^\sigma_{x,y,t}(\tilde{x}, \tilde{y}, \tilde{t}) \equiv \frac{1}{\sigma^3} \psi((\tilde{x}-x)/\sigma, (\tilde{y}-y)/\sigma, (\tilde{t}-t)/\sigma),$$

$(\tilde{x}, \tilde{y}, \tilde{t}) \in R^3$.

Note that, to simplify the notation, the symbol g is used as the part of the notation $g^\sigma$ for the component of the image corresponding to the parameter value σ in addition to its role as the index for such a component.

The parametric vector valued function $g^\sigma(x,y,t) \equiv \{g^\sigma(x, y,t) | g \in G\}$, $(x,y,t) \in \Omega \times T$, $\sigma \in [1, \infty)$ with each component $g^\sigma(x, y,t)$, $g \in G$ defined on the set $\Omega \times T$ as the observation $\Gamma_g(\psi^\sigma_{x, y,t})$ of the combined generalized initial image function $\Gamma_g$ on the testing function $\psi^\sigma_{x,y,t} \in \Phi(R^3)$ specified by the relation (2-4) for every parameter value σ from the set $[1, \infty)$ (here the symbol $\Omega \times T$ denotes the Cartesian product of the set $\Omega$ on the set T) will be called the "parametric viewpoint-varying image function". The points (x,y,t) from the set $\Omega \times T$ will be called "viewpoint-varying image points". By the "image" corresponding to the parameter value $\sigma \in [1, \infty)$ and taken at the viewpoint $t \in T$ is meant the collection, $\{g^\sigma(x, y,t) | (x,y) \in \Omega\}$, of the values of the parametric viewpoint-varying image function $g^\sigma(x,y,t)$, $(x,y,t) \in \Omega \times T$. The collection $\{g^\sigma(x,y,t) | (x,y) \in \Omega, \sigma \in [1, \infty)\}$ of the images $\{g^\sigma(x,y,t) | (x, y) \in \Omega\}$ corresponding to every parameter value $\sigma \in [1, \infty)$ and taken at a fixed viewpoint $t \in T$ will be called the "parametric image" taken at the viewpoint t.

Each component $g^\sigma$ (x,y,t), $g\in G$ of the parametric viewpoint-varying image function $g^\sigma$(x,y,t) is infinitely differentiable everywhere in the domain $\Omega\times T$, and its partial derivatives with respect to the variables x, y, t can be obtained as observations of the combined generalized initial image function $\Gamma_g$ on the partial derivatives with respect to the parameters x, y, t of the testing function $\psi^\sigma_{x,y,t}\in\Phi(R^3)$ specified by the relation (2-4). For example, the components $g_x^\sigma$(x,y,t), $g_y^\sigma$(x,y,t), $g\in G$ of the first-order partial derivatives $g_x^\sigma$(x,y,t)$\equiv\{g_x^\sigma$(x,y,t)$|g\in G\}$, $g_y^\sigma$(x,y,t)$\equiv\{g_y^\sigma$(x,y,t)$|g\in G\}$ of the parametric viewpoint-varying image function $g^\sigma$(x,y,t) are given as the observations $$\Gamma_g\left(\frac{\partial}{\partial x}\psi^\sigma_{x,y,t}\right), \Gamma_g\left(\frac{\partial}{\partial y}\psi^\sigma_{x,y,t}\right)$$

of the combined generalized initial image function $\Gamma_g$ on the testing functions $$\frac{\partial}{\partial x}\psi^\sigma_{x,y,t}, \frac{\partial}{\partial y}\psi^\sigma_{x,y,t}\in\Phi(R^3),$$

for every (x,y,t) $\in\Omega\times T$, $\sigma\in[1,\infty)$, where $$\frac{\partial}{\partial x}\psi^\sigma_{x,y,t}(\tilde{x},\tilde{y},\tilde{t}) \equiv -\frac{1}{\sigma^4}\psi_x((\tilde{x}-x)/\sigma,(\tilde{y}-y)/\sigma, \quad (2\text{-}5)$$

$(\tilde{t}-t)/\sigma), (\tilde{x},\tilde{y},\tilde{t})\in R^3,$ $$\frac{\partial}{\partial y}\psi^\sigma_{x,y,t}(\tilde{x},\tilde{y},\tilde{t}) \equiv -\frac{1}{\sigma^4}\psi_y((\tilde{x}-x)/\sigma,(\tilde{y}-y)/\sigma, \quad (2\text{-}6)$$

$(\tilde{t}-t)/\sigma), (\tilde{x},\tilde{y},\tilde{t})\in R^3,$ and $\psi_x$(x,y,t), $\psi_y$(x,y,t) are the partial derivatives of the function $\psi$(x,y,t) with respect to the variables x,y.

Let t$-\Delta t^-$,t,t$+\Delta t^+\in R$ be three consecutive viewpoint (here $\Delta t^-$ and $\Delta t^+$ are positive viewpoint increments), and let (x(t$-\Delta t^-$),y(t$-\Delta t^-$))$\in R^2$ be a projection of some point in the scene taken at the viewpoint t$-\Delta t^-$, while (x(t$+\Delta t^+$),y(t$+\Delta t^+$))$\in R^2$ is a projection of the same point taken at the viewpoint t$+\Delta t^+$. The vector $(u_A(x,y,t,\Delta t^-,\Delta t^+),v_A(x,y,t,\Delta t^-,\Delta t^+))$ defined by the relations $$u_A(x,y,t,\Delta t^-,\Delta t^+)=(x(t+\Delta t^+)-x(t-\Delta t^-))/(\Delta t^-+\Delta t^+), \quad (2\text{-}7)$$

$$v_A(x,y,t,\Delta t^-,\Delta t^+)=(y(t+\Delta t^+)-y(t-\Delta t^-))/(\Delta t^-+\Delta t^+), \quad (2\text{-}8)$$

where $$x=(\Delta t^-x(t+\Delta t^+)+\Delta t^+x(t-\Delta t^-))/(\Delta t^-+\Delta t^+), \quad (2\text{-}9)$$

$$y=(\Delta t^-y(t+\Delta t^+)+\Delta t^+y(t-\Delta t^-))/(\Delta t^-+\Delta t^+), \quad (2\text{-}10)$$

will be called the "average velocity vector" of the scene projection at the point (x,y)$\in R^2$ and the viewpoint t$\in R$ based on the scene projections at the viewpoint t$+\Delta t^+$ and the viewpoint t$-\Delta t^-$. The vector $(u_A(x,y,t,\Delta t^-,\Delta t^+), v_A(x,y,t,\Delta t^-,\Delta t^+))$ can be defined only at those points (x,y) from the set $R^2$ that are projections of the points in the scene visible at the viewpoint t$-\Delta t^-$ as well as the viewpoint t$+\Delta t^+$. The collection of such image points will be denoted by the symbol $\Omega(t,\Delta t^-,\Delta t^+)$.

The "instantaneous velocity vector" $(u_I(x,y,t),v_I(x,y,t))$ of the scene projection at the point (x,y)$\in R^2$ and the viewpoint t$\in R$ will now be defined. Let $\Delta t^-$, $\Delta t^+$ be positive viewpoint increments, and let W(x,y,t,$\Delta t^-$,$\Delta t^+$) be the set which is equal to a single-element set containing the average velocity vector $(u_A(x,y,t,\Delta t^-,\Delta t^+),v_A(x,y,t,\Delta t^-,\Delta t^+))$ if (x,y)$\in\Omega$(t,$\Delta t^-$, $\Delta t^+$), and is equal to an empty set $\emptyset$ otherwise. Then for every positive viewpoint increment $\Delta t<\delta t$ (here $\delta t$ is a positive real constant), the set W(x,y,t,$\Delta t$) will be defined from the relation $$W(x,y,t,\Delta t) = \cup W(x,y,t,\Delta t^-,\Delta t^+), \quad (2\text{-}11)$$
$$0<\Delta t^-<\Delta t$$
$$0<\Delta t^+<\Delta t$$

while the set W(x,y,t) will be defined as $$W(x,y,t) = \cap\overline{W(x,y,t,\Delta t)}, \quad (2\text{-}12)$$
$$0<\Delta t<\delta t$$

where the symbol $\overline{W(x,y,t,\Delta t)}$ means the topological closure of the set W(x,y,t,$\Delta t$). It will be assumed that W(x,y,t) are single-element sets for almost every (x,y,t)$\in R^3$. This assumption means that the subset of the set $R^3$ containing the points (x,y,t), where the sets W(x,y,t) are not single-element sets, has a Lebesgue measure equal to zero. For every point (x,y,t)$\in R^3$ such that the set W(x,y,t) consists of a single element, that element is selected as the value of the instantaneous velocity vector $(u_I(x,y,t),v_I(x,y,t))$; otherwise a zero vector is chosen for the value of the instantaneous velocity vector $(u_I(x,y,t),v_I(x,y,t))$.

Assume that the functions $u_I(x,y,t),v_I(x,y,t),(x,y,t)\in R^3$ are locally integrable with respect to the Lebesgue measure dx dy dt in $R^3$ and thereby can be used to form continuous linear functionals $U_I$, $V_I$ (generalized functions) defined on the locally convex linear topological space $\Phi(R^3)$. The values of the generalized functions $U_I$, $V_I$ at the testing function $\phi\in\Phi(R^3)$ are given by the relations $$U_I(\phi) = \int\int_{R^3}\int u_I(x,y,t)\phi(x,y,t)dxdydt, \quad (2\text{-}13)$$

$$V_I(\phi) = \int\int_{R^3}\int v_I(x,y,t)\phi(x,y,t)dxdydt, \quad (2\text{-}14)$$

Let (x,y) be an image point from $\Omega$, t a viewpoint from T, and $\sigma$ a parameter value from $[1,\infty)$; then the "velocity vector" $(u^\sigma(x,y,t),v^\sigma(x,y,t))$ of the image corresponding to the parameter value $\sigma$ at the point (x,y) and the viewpoint t is defined from the relations $$u^\sigma(x,y,t) = \quad (2\text{-}15)$$

$$\frac{1}{\sigma^3}\int\int\int_{R^3}u_I(\tilde{x},\tilde{y},\tilde{t})\psi((\tilde{x}-x)/\sigma,(\tilde{y}-y)/\sigma,(\tilde{t}-t)/\sigma)d\tilde{x}d\tilde{y}d\tilde{t},$$

$$v^\sigma(x,y,t) = \quad (2\text{-}16)$$

$$\frac{1}{\sigma^3}\int\int\int_{R^3}v_I(\tilde{x},\tilde{y},\tilde{t})\psi((\tilde{x}-x)/\sigma,(\tilde{y}-y)/\sigma,(\tilde{t}-t)/\sigma)d\tilde{x}d\tilde{y}d\tilde{t},$$

where $\psi$ is the measurement function from the set $\Phi(R^3)$. Note that as has been mentioned earlier the vertical component $v^\sigma(x,y,t)$ of the velocity vector $(u^\sigma(x,y,t),v^\sigma(x,y,t))$ is independent of the image point (x,y) and therefore will be denoted as $v^\sigma(t)$ while the velocity vector will be denoted as $(u^\sigma(x,y,t),v^\sigma(t))$. The collection of the velocity vectors $\{(u^\sigma(x,y,t),v^\sigma(t))|(x,y)\in\Omega\}$ corresponding to the viewpoint t$\in T$ and to the parameter value of $\sigma\in[1,\infty)$ will be called the "velocity vector field" of the image $\{g^\sigma(x,y,t)|(x,y)\in\Omega\}$ corresponding to the parameter value $\sigma$ and taken at the viewpoint t. The collection $\{(u^\sigma(x,y,t),v^\sigma(t))|(x,y)\in\Omega,\sigma\in[1,$ ∞)} of the velocity vector fields {($u^\sigma(x,y,t),v^\sigma(t))|(x,y)\in\Omega$} of the images {$g^\sigma(x,y,t)|(x,y)\in\Omega$} corresponding to every parameter value $\sigma\in[1,\infty)$ and taken at a fixed viewpoint $t\in T$ will be called the "parametric velocity vector field" of the parametric image {$g^\sigma(x,y,t)|(x,y)\in\Omega,\sigma\in[1,\infty)$} taken at the viewpoint t.

Let $t_0'<t_1'<\ldots<t_{K'}'$ be a finite increasing sequence of viewpoints from some viewpoint interval T, and let t be a viewpoint from the same viewpoint interval T. Then the estimation problem can be formulated as follows. Given a sequence of parametric images {$g^\sigma(x,y,t_k')|(x,y)\in\Omega, \sigma\in[1,\infty)$}$_{k=0}^{K'}$ taken at the viewpoints $t_k'$, k=0, 1, ..., K', which will be called the "parametric viewpoint-varying image sequence", and given the viewpoint t, find the parametric vector field {$(\tilde{u}^\sigma(x,y,t),\tilde{v}^\sigma(t))|(x,y)\in\Omega,\sigma\in[1,\infty)$} which is an estimate of the parametric velocity vector field {$(u^\sigma(x,y,t),v^\sigma(t))|(x,y)\in\Omega,\sigma\in[1,\infty)$} of the parametric image {$g^\sigma(x,y,t)|(x,y)\in\Omega,\sigma\in[1,\infty)$} taken at the viewpoint t.

Although changes in the scene giving rise to the parametric velocity vector field {$(u^\sigma(x,y,t),v^\sigma(t))|(x,y)\in\Omega,\sigma\in[1,\infty)$} are reflected in the parametric viewpoint-varying image sequence {$g^\sigma(x,y,t_k')|(x,y)\in\Omega,\sigma\in[1,\infty)$}$_{k=0}^{K'}$ the relation between them is not necessarily unique. The same parametric viewpoint-varying image sequence can be associated with different parametric velocity vector fields and, vice versa, the same parametric velocity vector field can result from different parametric viewpoint-varying image sequences.

The method of the present invention, then, includes determining an estimate of the parametric velocity vector field corresponding to a given parametric viewpoint-varying image sequence. In order for this determination to be possible, specific assumptions have to be made about the scene being imaged and about the imaging process itself. The assumptions we make are described in the following. Based on these assumptions constraints are imposed on the estimate of the parametric velocity vector field. The determination of the estimate is then reduced to solving the system of equations arising from such constraints for a given parametric viewpoint-varying image sequence.

Let {$g^\sigma(x,y,t_k')|(x,y)\in\Omega,\sigma\in[1,\infty)$}$_{k=0}^{K'}$ be a given parametric viewpoint-varying image sequence taken at the viewpoints $t_k'$, k=0, 1, ..., K', which form an increasing sequence within the viewpoint interval T, and let t be a given viewpoint within the viewpoint interval T. We consider the problem of finding an estimate {$(\tilde{u}^\sigma(x,y,t),\tilde{v}^\sigma(t))|(x,y)\in\Omega,\sigma\in[1,\infty)$} of the parametric velocity vector field {$(u^\sigma(x,y,t),v^\sigma(t))|(x,y)\in\Omega,\sigma\in[1,\infty)$} as a function of the parametric viewpoint-varying image sequence {$g^\sigma(x,y,t_k')|(x,y)\in\Omega,\sigma\in[1,\infty)$}$_{k=0}^{K'}$.

In what follows, the estimate {$(\tilde{u}^\sigma(x,y,t),\tilde{v}^\sigma(t))|(x,y)\in\Omega,\sigma\in[1,\infty)$} of the parametric velocity vector field {$(u^\sigma(x,y,t),v^\sigma(t))|(x,y)\in\Omega,\sigma\in[1,\infty)$} is determined as the parametric vector field satisfying a set of constraints. These constraints are based on the following assumptions:

1. The scene to be imaged is assumed to have near-constant and near-uniform illumination, which means that the changes in the incident illumination of each surface patch in the scene are small across the space, and are mainly due to the orientation of such surface patch relative to the light source.

2. The radiance of each surface point in the scene is assumed to be nearly Lambertian, which means that locally its dependence on the viewing position is small and can be neglected.

3. As has been mentioned in the previous section, the irradiance $\xi(x,y,t)$, $\xi\in\Theta$ of each point (x,y) in the image plane $R^2$ at a viewpoint $t\in R$ is assumed to be roughly proportional to the radiance of the point in the scene projecting into the point (x,y) in the image plane at the viewpoint t, and the proportionality coefficient, to be independent of the location (x,y) and the viewpoint t.

4. The scene is assumed to be made out of opaque objects. The criteria for selecting feature points $(x_\mu,y_\mu,t_\mu)\in M$ and the criteria for assigning feature values $\eta(x_\mu,y_\mu,t_\mu),\eta\in H$ to each feature point $(x_\mu,y_\mu,t_\mu)\in M$ are assumed to represent the true properties of the objects and to be independent of the objects' spatial attitudes.

5. The velocities of neighboring points of the objects in the scene are assumed to be similar, on one hand, and to change slowly with respect to viewpoint, on the other hand. In other words, it is assumed that the parametric viewpoint-varying velocity vector field of the surface points of each object in the scene varies smoothly across the space and across the viewpoint location.

Let $\Pi_t$ be a subset of the space $R^2$ defined by the relation $$\Pi_t=\{(\Delta t^-,\Delta t^+)|(\Delta t^-,\Delta t^+)\in R^2, \Delta t^-+\Delta t^+>0, (t-\Delta t^-), (t+\Delta t^+)\in\{t_k'\}_{k=0}^{K'}\} \quad (3\text{-}1)$$

let $P_t$ be a subset of the set $\Pi_t$, and let $G_t=G\times P_t$ be the Cartesian product of the set G on the set $P_t$. The elements from the set $G_t$ are denoted by the symbol $g_t$, and the set $G_t$ is assumed to be a measurable space with some measure $dg_t$ defined on the family $B(G_t)$ of Borel subsets of the set $G_t$. In practice, the set $G_t$ is finite, and the measure $dg_t$ is a point measure on the finite set $G_t$, but a more general approach is used for the sake of uniformity of presentation.

Let $g_t=(g,\Delta t^-,\Delta t^+)\in G_t, \sigma\in[1,\infty)$, and let $g_t^\sigma(x,y,t,u^\sigma,v^\sigma)$ be a function defined by the relation $$g_t^\sigma(x,y,t,u^\sigma,v^\sigma)=(g^\sigma(x+\Delta t^+u^\sigma(x,y,t),y+\Delta t^+v^\sigma(t),t+\Delta t^+)-g^\sigma(x-\Delta t^-u^\sigma(x,y,t),y-\Delta t^-v^\sigma(t), t-\Delta t^-))/(\Delta t^-+\Delta t^+), \quad (3\text{-}2)$$

for every $(x,y)\in\Omega$, where: $(u^\sigma,v^\sigma)\equiv(u^\sigma(x,y,t),v^\sigma(t))$ is the velocity vector of the image corresponding to the parameter value $\sigma$ at the image point (x,y) and the viewpoint t. Here, to simplify the notation, the symbol $g_t$ is used as the part of the notation $g_t^\sigma$ for the above defined function (3-2) in addition to its role as the index for such a function Let $(x,y)\in\Omega$ be an image point that is taken at the viewpoint t projection of some point in the scene that does not belong to the occluding boundaries. The occluding boundary of an object is defined as the points in the scene belonging to the portion of the object that projects to its silhouette. The assumptions 1–4 made at the beginning of this section imply that the absolute value of the function $g_t^\sigma(x,y,t,u^\sigma,v^\sigma)$ is small. Therefore it is natural to use the function $$(g_t^\sigma(x,y,t,\tilde{u}^\sigma,\tilde{v}^\sigma))^2 \quad (3\text{-}3)$$

as a part of the functional whose minimum specifies the estimate $(\tilde{u}^\sigma,\tilde{v}^\sigma)\equiv(\tilde{u}^\sigma(x,y,t),\tilde{v}hu\sigma(t))$ of the velocity vector $(u^\sigma(x,y,t),v^\sigma(t))$ of the image corresponding to the parameter value $\sigma$. It is customary for the function (3-3) to be called the "optical flow constraint" corresponding to the parameter value $\sigma$ and the index $g_t$ [2, 12–14, 18–21].

Note that if the viewpoint increments $\Delta t^-, \Delta t^+$ approach zero, then for an integer n greater than or equal to 2 the n th-order partial derivative of the function $g_t^\sigma(x,y,t,\tilde{u}^\sigma,\tilde{v}^\sigma)$ with respect to the components $\tilde{u}^\sigma\equiv\tilde{u}^\sigma(x,y,t),\tilde{v}^\sigma\equiv\tilde{v}^\sigma(t)$ of the estimate of the velocity vector approaches zero at a rate proportional to $(\Delta t^-)^{n-1}+(\Delta t^+)^{n-1}$. This, in particular, implies that when the viewpoint increments $\Delta t^-,\Delta t^+$ approach zero the function $g_t^\sigma(x,y,t,\bar{u}^\sigma,\bar{v}^\sigma)$ approaches the function which is linear with respect to the components $\bar{u}^\sigma,\bar{v}^\sigma$ of the estimate of the velocity vector.

It can be easily verified that the estimate $(\bar{u}^\sigma(x,y,t), \bar{v}^\sigma(t))$ of the velocity vector on which the function (3-3) achieves its minimum satisfies the system of equations $$\begin{cases} g_{t\bar{u}}^\sigma(x, y, t, \bar{u}^\sigma, \bar{v}^\sigma)g_t^\sigma(x, y, t, \bar{u}^\sigma, \bar{v}^\sigma) = 0, \\ g_{t\bar{v}}^\sigma(x, y, t, \bar{u}^\sigma, \bar{v}^\sigma)g_t^\sigma(x, y, t, \bar{u}^\sigma, \bar{v}^\sigma) = 0, \end{cases} \quad (3\text{-}4)$$

where the functions $g_{t\bar{u}}^\sigma(x,y,t,\bar{u}^\sigma,\bar{v}^\sigma)$ and $g_{t\bar{v}}^\sigma(x,y,t,\bar{u}^\sigma,\bar{v}^\sigma)$ are the first-order partial derivative derivatives of the function $g_t^\sigma(x,y,t,\bar{u}^\sigma,\bar{v}^\sigma)$ with respect to the components $\bar{u}^\sigma$ and $\bar{v}^\sigma$ of the estimate of the velocity vector.

Let the vector $(\Delta u^\sigma(x,y,t), \Delta v^\sigma(t))$ be defined as in the relations $$\bar{u}^\sigma(x,y,t) = u^\sigma(x,y,t) + \Delta u^\sigma(x,y,t), \quad (3\text{-}5)$$

$$\bar{v}^\sigma(t) = v^\sigma(t) + \Delta v^\sigma(t). \quad (3\text{-}6)$$

By expanding the left hand sides of the relation (3-4) into their Taylor series about the velocity vector $(u^\sigma(x,y,t),v^\sigma(t))$ and by setting the second-order and higher partial derivatives of the function $g_t^\sigma(x,y,t,u^\sigma,v^\sigma)$ with respect to the components $u^\sigma \equiv u^\sigma(x,y,t)$ and $v^\sigma \equiv v^\sigma(t)$ of the velocity vector to zero, we obtain the system of linear equations, relative to the vector $(\Delta u^\sigma(x,y,t), \Delta v^\sigma(t))$, $$\begin{cases} (g_{tu}^\sigma(x, y, t, u^\sigma, v^\sigma))^2 \Delta u^\sigma(x, y, t) + g_{tu}^\sigma(x, y, t, u^\sigma, v^\sigma) \\ \quad g_{tv}^\sigma(x, y, t, u^\sigma, v^\sigma) \Delta v^\sigma(t) + g_t^\sigma(x, y, t, u^\sigma, v^\sigma) \\ \quad g_t^\sigma(x, y, t, u^\sigma, v^\sigma) = 0, \\ g_{tu}^\sigma(x, y, t, u^\sigma, v^\sigma) g_{tv}^\sigma(x, y, t, u^\sigma, v^\sigma) \Delta u^\sigma(x, y, t) + \\ \quad (g_{tv}^\sigma(x, y, t, u^\sigma, v^\sigma))^2 \Delta v^\sigma(t) + g_t^\sigma(x, y, t, u^\sigma, v^\sigma) \\ \quad g_t^\sigma(x, y, t, u^\sigma, v^\sigma) = 0. \end{cases} \quad (3\text{-}7)$$

where the functions $g_{tu}^\sigma(x,y,t,u^\sigma,v^\sigma)$ and $g_{tv}^\sigma(x,y,t,u^\sigma,v^\sigma)$ are the first-order partial derivatives of the function $g_t^\sigma(x,y,t,u^\sigma,v^\sigma)$ with respect to the components $u^\sigma$ and $v^\sigma$ of the velocity vector.

Let us first assume that the norm of the gradient $$(g_{tu}^\sigma(x,y,t,u^\sigma,v^\sigma), g_{tv}^\sigma(x,y,t,u^\sigma,v^\sigma)) \quad (3\text{-}8)$$

of the function $g_t^\sigma(x,y,t,u^\sigma,v^\sigma)$, with respect to the components $u^\sigma$ and $v^\sigma$ of the velocity vector, is relatively large; then the system of equations (3-7) is equivalent to the relation $$g_{tu}^\sigma(x,y,t,u^\sigma,v^\sigma)\Delta u^\sigma(x,y,t) + g_{tv}^\sigma(x,y,t,u^\sigma,v^\sigma)\Delta v^\sigma(t) + g_t^\sigma(x,y,t,u^\sigma,v^\sigma) = 0. \quad (3\text{-}9)$$

The last relation implies that the requirement for the function (3-3) to achieve a minimum on the estimate $(\tilde{u}^\sigma(x,y,t),\tilde{v}^\sigma(t))$ of the velocity vector $(u^\sigma(x,y,t),v^\sigma(t))$ specifies the component of the estimate in the direction of the gradient (3-8) and leaves the component orthogonal to the gradient (3-8) undetermined.

If the norm of the gradient (3-8) is relatively small; then the system of equations (3-7) becomes too weak, and the requirement for the function (3-3) to achieve a minimum on the estimate $(\tilde{u}^\sigma(x,y,t),\tilde{v}^\sigma(t))$ of the velocity vector $(u^\sigma(x,y,t),v^\sigma(t))$ imposes no constraint on the estimate.

The above discussion suggests that we need to impose additional constraints on the estimate $\{(\tilde{u}^\sigma(x,y,t), \tilde{v}^\sigma(t))|(x,y)\in\Omega,\sigma\in[1,\infty)\}$ of the parametric velocity vector field $\{(u^\sigma(x,y,t),v^\sigma(t))|(x,y)\in\Omega,\sigma\in[1,\infty)\}$ in order for the computation to be well defined.

Let $S \equiv \{(s_x,s_y)|(s_x,s_y)\in R^2, s_x^2+s_y^2=1\}$ be a unit circle in the two-dimensional Euclidean space $R^2$, with each vector $s \equiv (s_x,s_y)\in S$ specifying the direction in the image plane. The set $S$ is assumed to be a measurable space with some uniform measure $ds$ defined on the family $B(S)$ of Borel subsets of the set $S$.

Let $s \equiv (s_x,s_y)\in S$, and let $(s,\nabla u^\sigma(x,y,t))$ be the function defined by the relation $$(s, \nabla u^\sigma(x, y, t)) = \left( -\frac{\partial}{\partial\omega} u^\sigma(x+\omega s_x, y+\omega s_y, t) \right)_{\omega=0}, \quad (3\text{-}10)$$

for every $(x,y)\in\Omega$. Here the symbol $\nabla$ stands for the gradient of a function with respect to the variables $x,y$.

Let $s \equiv (s_x,s_y)\in S$, and let $(x,y)\in\Omega$ be an image point that is taken at a viewpoint $t$ projection of some point in the scene that does not cross the occluding boundary in the direction $s$, meaning that for all sufficiently small positive constants $\omega$, the following two points in the scene both belong to the same object and are sufficiently close to each other: the first is the one projecting to the image point $(x+\omega s_x, y+\omega s_y)$ at the viewpoint $t$, whereas the second is the one projecting to the image point $(x,y)$ at the viewpoint $t$. The assumption 5 made at the beginning of this section implies that the absolute values of the function $(s,\nabla u^\sigma(x,y,t))$ is small. Therefore it is natural to use the function $$(s, \nabla \tilde{u}^\sigma(x,y,t))^2, \quad (3\text{-}11)$$

as a part of the functional whose minimum specifies the estimate $(\tilde{u}^\sigma(x,y,t),\tilde{v}^\sigma(t))$ of the velocity vector $(u^\sigma(x,y,t),v^\sigma(t))$ of the image corresponding to the parameter value $\sigma$. It is customary for the function (3-11) to be called the "smoothness constraint" in the direction $s$ [2,12–14,18–21].

Finally, to make the process of computing the estimate $\{(\tilde{u}^\sigma(x,y,t),\tilde{v}^\sigma(t))|(x,y)\in\Omega,\sigma\in[1,\infty)\}$ of the parametric velocity vector field $\{(u^\sigma(x,y,t),v^\sigma(t))|(x,y)\in\Omega,\sigma\in[1,\infty)\}$ well defined, we require that for every image point $(x,y)\in\Omega$ and for every parameter value $\sigma\in[1,\infty)$ where the optical flow constraints and the directional smoothness constraints impose no restrictions the difference between the unknown estimate $(\tilde{u}^\sigma(x,y,t),\tilde{v}^\sigma(t))$ of the velocity vector $(u^\sigma(x,y,t),v^\sigma(t))$ and its initial estimate $(\tilde{u}_0^\sigma(x,y,t),\tilde{v}_0^\sigma(t))$ be small. This can be accomplished by including the functions $$(\tilde{u}^\sigma(x,y,t) - \tilde{u}_0^\sigma(x,y,t))^2, \quad (3\text{-}12)$$

$$(\tilde{v}^\sigma(t) - \tilde{v}_0^\sigma(t))^2 \quad (3\text{-}13)$$

in the functional whose minimum specifies the estimate $(\tilde{u}^\sigma(x,y,t),\tilde{v}^\sigma(t))$ of the velocity vector $(u^\sigma(x,y,t),v^\sigma(t))$ of the image corresponding to the parameter value $\sigma$ in addition to the functions (3-3) and (3-11) specifying the optical flow and the directional smoothness constraints, provided that the weights associated with the functions (3-12) and (3-13) are small relative to the weights associated with the functions (3-3) and (3-11). The initial estimate $(\tilde{u}_0^\sigma(x,y,t),\tilde{v}_0^\sigma(t))$ appearing in the relations (3-12), (3-13) is defined later in this section. The constraints imposed on the estimate $(\tilde{u}^\sigma(x,y,t),\tilde{v}^\sigma(t))$ of the velocity vector $(u^\sigma(x,y,t),v^\sigma(t))$ at the image point $(x,y)\in\Omega$ and the viewpoint $t$ by the above requirements will be called the "regularization constraints".

As has been stated earlier, the optical flow and the directional smoothness constraints are not necessarily valid at the points near the occluding boundaries, even when the assumptions described at the beginning of this section are observed. The method of computing the estimate of the parametric velocity vector field of the present invention resolves the above difficulties by adjusting the weight associated with each constraint in such a way that it becomes small whenever the constraint is not valid. In the following, it is described how the functions (3-3), (3-11), (3-12), and (3-13), specifying the optical flow, directional smoothness, and regularization constraints, are combined into the functional of the estimate of the parametric velocity vector field. The estimate is then computed by solving the system of nonlinear equations arising from a certain optimality criterion related to such functional.

The following describes the system of nonlinear equations used in the method of the present invention in its estimation of velocity vector fields. In the method of the invention, the estimate $\{(\tilde{u}^\sigma(x,y,t),\tilde{v}^\sigma(t))|(x,y)\in\Omega,\sigma\in[1,\infty)\}$ of the parametric velocity vector field $\{(u^\sigma(x,y,t),v^\sigma(t))|(x,y)\in\Omega,\sigma\in[1,\infty)\}$ is determined as the parametric vector field on which a weighted average of the optical flow, directional smoothness, and regularization constraints is minimized. The weight functions are chosen in such a way that at every image point $(x,y)\in\Omega$ which is near the occluding boundary the following requirements are met: each weight function associated with an optical flow constraint becomes small whenever the optical flow constraint is not satisfied, and each weight function associated with a smoothness constraint corresponding to a direction in which an occluding boundary is crossed becomes small whenever the directional smoothness constraint is not satisfied. The criteria for the presence of the occluding boundary near a given image point, and the criteria for the occluding boundary being crossed near a given image point in a given direction, can be defined most effectively in terms of the values of the unknown estimate of the parametric velocity vector field. Therefore, the values of the unknown estimate of the parametric velocity vector field have to be used implicitly in each of the weight functions. On the other hand, each weight function has to be treated as if it were independent of the values of the unknown estimate of the parametric velocity vector field, because it only specifies a relative significance of the corresponding constraint as a part of the weighted average and not the constraint itself. To overcome these difficulties, two copies of the unknown estimate of the parametric velocity vector field are introduced: the invariable one, and the variable one. In the weight functions the values of the invariable copy of the unknown estimate of the parametric velocity vector field are used, whereas in the constraint functions the values of the variable copy of the unknown estimate of the parametric velocity vector field are used. Then a more general variational principle as opposed to an energy minimization principle is applied to the weighted average of the optical flow, directional smoothness, and regularization constraints to derive the system of nonlinear equations of the unknown estimate of the parametric velocity vector field. This variational principle can be described as follows.

Let $(\tilde{u},\tilde{v})\equiv\{(\tilde{u}^\sigma(x,y,t),\tilde{v}^\sigma(t))|(x,y)\in\Omega,\sigma\in[1,\infty)\}$ be an invariable copy of the estimate of the parametric velocity vector field, let $(\hat{u},\hat{v})\equiv\{(\hat{u}^\sigma(x,y,t),\hat{v}^\sigma(t))|(x,y)\in\Omega,\sigma\in[1,\infty)\}$ be a variable copy of the estimate of the parametric velocity vector field, and let the parametric vector field $(\Delta\tilde{u},\Delta\tilde{v})\equiv\{(\Delta\tilde{u}^\sigma(x,y,t),\Delta\tilde{v}^\sigma(t))|(x,y)\in\Omega,\sigma\in[1,\infty)\}$ be defined by the relation $$(\Delta\tilde{u}^\sigma(x,y,t),\Delta\tilde{v}^\sigma(t))=(\hat{u}^\sigma(x,y,t),\hat{v}^\sigma(t))-(\tilde{u}^\sigma(x,y,t),\tilde{v}^\sigma(t)),$$
$$(x,y)\in\Omega,\sigma\in[1,\infty). \quad (4\text{-}1)$$

Assume that the derivative of the parametric vector field $(\Delta\tilde{u},\Delta\tilde{v})$ in the direction normal to the boundary $\partial\Omega$ of the image $\Omega$ is equal to zero for every parameter value $\sigma\in[1,\infty)$ and for every image point $(x,y)$ belonging to the image boundary $\partial\Omega$. This will impose restrictions on the types of the variations that can be applied to the variable copy of the unknown estimate of the parametric velocity vector field.

Let $f(\tilde{u},\tilde{v},\hat{u},\hat{v})$ be a functional of the parametric vector fields $(\tilde{u},\tilde{v}),(\hat{u},\hat{v})$ defined as a weighted average of functions (3-3), (3-11), (3-12), and (3-13), specifying the optical flow, directional smoothness, and regularization constraints, respectively, by the following relation:

$$f(\tilde{u},\tilde{v},\hat{u},\hat{v}) = \int_1^\infty \left[ \int_\Omega \left[ \int_{G_f} 0.5\alpha_{g_f}^\sigma(x,y,t,\tilde{u}^\sigma,\tilde{v}^\sigma,|\nabla\tilde{u}^\sigma|) \right. \right.$$
$$(g_f^\sigma(x,y,t,\hat{u}^\sigma,\hat{v}^\sigma))^2 dg_f + \int_S 0.5\beta_s^\sigma(x,y,t,\tilde{u}^\sigma,\tilde{v}^\sigma,$$
$$(s,\nabla\tilde{u}^\sigma))(s,\nabla\hat{u}^\sigma(x,y,t))^2 ds + 0.5\gamma_{u,0}(\hat{u}^\sigma(x,y,t) -$$
$$\left. \tilde{u}_0^\sigma(x,y,t))^2 \right] dxdy + 0.5\gamma_{v,0}(\hat{v}^\sigma(t) - \tilde{v}_0^\sigma(t))^2 \right] d\sigma. \quad (4\text{-}2)$$

Here:

(i) $\alpha_{g_f}^\sigma(x,y,t,\tilde{u}^\sigma,\tilde{v}^\sigma,|\nabla\tilde{u}^\sigma|),(x,y)\in\Omega,\sigma\in[1,\infty),g_f\in G_f$ is a weight associated with an optical flow constraint corresponding to the parameter value $\sigma$ and the index $g_f$, which is a function of the independent variables $x,y,t$ and of the functions $\tilde{u}^\sigma\equiv\tilde{u}^\sigma(x,y,t),\tilde{v}^\sigma\equiv\tilde{v}^\sigma(t),|\nabla\tilde{u}^\sigma|\equiv|\nabla\tilde{u}^\sigma(x,y,t)|$ of these variables;

(ii) $\beta_s^\sigma(x,y,t,\tilde{u}^\sigma,\tilde{v}^\sigma,(s,\nabla\tilde{u}^\sigma)),(x,y)\in\Omega,\sigma\in[1,\infty),s\in S$ is a weight associated with a smoothness constraint in the direction s, which is a function of the independent variables $x,y,t$ and of the functions $\tilde{u}^\sigma\equiv\tilde{u}^\sigma(x,y,t),\tilde{v}^\sigma\equiv\tilde{v}^\sigma(t),(s,\nabla\tilde{u}^\sigma)\equiv(s,\nabla\tilde{u}^\sigma(x,y,t))$ of these variables;

(iii) $\gamma_{y,0}$, are positive constant specifying weights for the regularization constraints;

(iv) the function $|\nabla\tilde{u}^\sigma(x,y,t)|,(x,y)\in\Omega,\sigma\in[1,\infty)$ is the norm of the vector valued function $\nabla\tilde{u}^\sigma(x,y,t)$, which is the gradient with respect to the variables $x,y$ of the function $\tilde{u}^\sigma(x,y,t)$, given by the relation $$|\nabla\tilde{u}^\sigma(x,y,t)| = \sqrt{\tilde{u}_x^\sigma(x,y,t)^2 + \tilde{u}_y^\sigma(x,y,t)^2}, \quad (4\text{-}3)$$

(v) the functions $(s,\nabla\tilde{u}^\sigma(x,y,t)),(s,\nabla\hat{u}^\sigma(x,y,t)),(x,y)\in\Omega,\sigma\in[1,\infty),s\in S$ are defined as in the relation (3-10);

(vi) the function $g_f^\sigma(x,y,t,\hat{u}^\sigma,\hat{v}^\sigma),(x,y)\in\Omega,\sigma\in[1,\infty),g_f\in G_f$ is defined as in the relation (3-2); and (vii) the components $\tilde{u}_0^\sigma(x,y,t),\tilde{v}_0^\sigma(t)$ of the initial estimate of the velocity vector corresponding to the parameter value $\sigma\in[1,\infty)$ at the image point $(x,y)\in\Omega$ are defined later.

The estimate of the parametric velocity vector field is then defined as the parametric vector field $(\tilde{u},\tilde{v})$, on which the functional $f(\tilde{u},\tilde{v},\hat{u},\hat{v})$, considered as the function of the parametric vector field $(\hat{u},\hat{v})$ and depending on the parametric vector field $(\tilde{u},\tilde{v})$ as on the parameters, achieves a local minimum when the value of the parametric vector field $(\hat{u},\hat{v})$ is identically equal to the value of the parametric vector field $(\tilde{u},\tilde{v})$. Taking into account the relation (4-1) the functional $f(\tilde{u},\tilde{v},\hat{u},\hat{v})$ can be expressed in the form $f(\tilde{u},\tilde{v},\tilde{u}+\Delta\tilde{u},\tilde{v}+\Delta\tilde{v})$. The parametric vector field $(\Delta\tilde{u},\Delta\tilde{v})$ specifies a perturbation to the parametric vector field $(\tilde{u},\tilde{v})$, and the functional $f(\tilde{u},\tilde{v},\tilde{u}+\Delta\tilde{u},\tilde{v}+\Delta\tilde{v})$ assigns the cost to each choice of the parametric vector field $(\tilde{u},\tilde{v})$ and its perturbation $(\Delta\tilde{u},\Delta\tilde{v})$. Then the estimate of the parametric velocity vector field is the parametric vector field $(\tilde{u},\tilde{v})$, for which a locally minimal cost is achieved when the perturbation $(\Delta\tilde{u},\Delta\tilde{v})$ is identically equal to zero. Using the calculus of variations with respect to the parametric vector field $(\Delta\tilde{u},\Delta\tilde{v})$ applied to the functional $f(\tilde{u},\tilde{v},\tilde{u}+\Delta\tilde{u},\tilde{v}+\Delta\tilde{v})$, the above defined estimate $(\tilde{u},\tilde{v})$ of the parametric velocity vector field is a solution of the system of equations $$\int_{G_t} \alpha^\sigma_{g_t}(x, y, t, \tilde{u}^\sigma, \tilde{v}^\sigma, |\nabla \tilde{u}^\sigma|) g^\sigma_0(x, y, t, \tilde{u}^\sigma, \tilde{v}^\sigma) \quad (4\text{-}4)$$

$$g^\sigma_t(x, y, t, \tilde{u}^\sigma, \tilde{v}^\sigma) dg_t -$$

$$\int_S (s, \nabla(\beta^\sigma_s(x, y, t, \tilde{u}^\sigma, \tilde{v}^\sigma, (s, \nabla\tilde{u}^\sigma))(s, \nabla\tilde{u}^\sigma(x, y, t))))ds +$$

$$\gamma_{u,o}(\tilde{u}^\sigma(x, y, t) - \tilde{u}_o^\sigma(x, y, t)) = 0,$$

$$\int\int_\Omega \int_{G_t} \alpha^\sigma_{g_t}(x, y, t, \tilde{u}^\sigma, \tilde{v}^\sigma, |\nabla \tilde{u}^\sigma|) g^\sigma_\nu(x, y, t, \tilde{u}^\sigma, \tilde{v}^\sigma) g_t^\sigma$$

$$(x, y, t, \tilde{u}^\sigma, \tilde{v}^\sigma) dg_t dxdy + \gamma_{v,o}(\tilde{v}^\sigma(t) - \tilde{v}_o^\sigma(t)) = 0,$$

where the functions $g_{\tilde{u}}{}^\sigma(x,y,t,\tilde{u}^\sigma,\tilde{v}^\sigma)$ and $g_{\tilde{v}}{}^\sigma(x,y,t,\tilde{u}^\sigma,\tilde{v}^\sigma)$ are the first-order partial derivatives of the function $g_t{}^\sigma(x,y,t,\tilde{u}^\sigma,\tilde{v}^\sigma)$ with respect to the components $\tilde{u}^\sigma \equiv \tilde{u}^\sigma(x,y,t)$ and $\tilde{v}^\sigma \equiv \tilde{v}^\sigma(t)$ of the estimate of the velocity vector.

To select the weight functions associated with the optical flow, directional smoothness, and regularization constraints, consider the functional $f(\tilde{u},\tilde{v},\tilde{u},\tilde{v})$ defined by the relation (4-2) under the conditions that the parametric vector field $(\tilde{u},\tilde{v})$ be identically equal to the parametric vector field $(\tilde{u}, \tilde{v})$, and that both be equal to the estimate $\{(\tilde{u}^\sigma(x,y,t), \tilde{v}^\sigma(t))|(x,y)\in\Omega,\sigma\in[1,\infty)\}$ of the parametric velocity vector field obtained as the solution of the system of nonlinear equations (4-5). In this case the functional $f(\tilde{u},\tilde{v},\tilde{u},\tilde{v})$ takes the form $$f(\tilde{u}, \tilde{v}, \tilde{u}, \tilde{v}) = \int_1^\infty \left[ \int_\Omega \int \left[ \int_{G_t} 0.5\alpha^\sigma_{g_t}(x, y, t, \tilde{u}^\sigma, \tilde{v}, \sigma, |\nabla\tilde{u}^\sigma|) \right. \right. \quad (4\text{-}5)$$

$$(g^\sigma_t(x, y, t, \tilde{u}^\sigma, \tilde{v}^\sigma))^2 dg_t + \int_S 0 \cdot t\beta^\sigma_s(x, y, t, \tilde{u}^\sigma, \tilde{v}^\sigma, (s, \nabla\tilde{u}^\sigma))(s,$$

$$\left. \nabla\tilde{u}^\sigma(x, y, t))^2 ds + 0.5\gamma_{u,o}(\tilde{u}^\sigma(x, y, t) - \tilde{u}_o^\sigma(x, y, t))^2 \right] dxdy +$$

$$\left. 0.5\gamma_{v,o}(\tilde{v}^\sigma(t) - \tilde{v}_o^\sigma(t))^2 \right] d\sigma.$$

Let $\{(\tilde{u}^\sigma(x,y,t),\tilde{v}^\sigma(t))|(x,y)\in\Omega,\sigma\in[1,\infty)\}$ be an estimate of the parametric velocity vector field, which is obtained as the solution of the system of nonlinear equations (4-4). Select each of the weight functions $\alpha_{g_t}{}^\sigma(x,y,t,\tilde{u}^\sigma,\tilde{v}^\sigma,|\nabla\tilde{u}^\sigma|),g_t\in G_t$ in such a way that the contribution of the optical flow constraint $g_t{}^\sigma(x,y,t,\tilde{u}^\sigma,\tilde{v}^\sigma)$ to the functional (4-5) becomes small for every image point $(x,y)\in\Omega$ located near the occluding boundary where the optical flow constraint $g_t{}^\sigma(x,y,t,\tilde{u}^\sigma,\tilde{v}^\sigma)$ is not satisfied. Similarly, each of the weight functions $\beta_s{}^\sigma(x,y,t,\tilde{u}^\sigma,\tilde{v}^\sigma,(s,\nabla\tilde{u}^\sigma))$, $s\in S$ will be chosen so that the contributions of the directional smoothness constraint $(s,\nabla\tilde{u}^\sigma(x,y,t))$ to the functional (4-5) become small for every image point $(x,y)\in\Omega$ located near the occluding boundary where the occluding boundary is crossed in the direction s and the directional smoothness constraint $(s,\nabla\tilde{u}^\sigma(x,y,t))$ is not satisfied. Let the image point $(x,y)\in\Omega$ be near the occluding boundary; then the following two events are likely to happen:

1. For some small positive viewpoint increments $\Delta t^-$ and $\Delta t^+$ the point in the scene projecting into the image point $(x,y)$ at the viewpoint t either is visible at the viewpoint $(t-\Delta t^-)$ and is invisible at the viewpoint $(t+\Delta t^+)$, or it is visible at the viewpoint $(t+\Delta t^+)$ and is invisible at the viewpoint $(t-\Delta t^-)$. Let $(x_1,y_1)$ and $(x_2,y_2)$ be projections of such a point in the scene into the image plane taken at the viewpoints $(t-\Delta t^-)$ and $(t+\Delta t^+)$, respectively. If the radiance of the point in the scene projecting into the image point $(x_1,y_1)$ at the viewpoint $(t-\Delta t^-)$ is significantly different from the radiance of the point in the scene projecting into the image point $(x_2,y_2)$ at the viewpoint $(t+\Delta t^+)$, and if the radiance undergoes some changes in the neighborhoods of the above points in the scene, then the following cases are likely to be encountered:

1.1. The point in the scene projecting into the image point $(x-\Delta t^-\tilde{u}^\sigma(x,y,t),y-\Delta t^-\tilde{v}^\sigma(t))$ at the viewpoint $(t-\Delta t^-)$, and the point in the scene projecting into the image point $(x+\Delta t^+\tilde{u}^\sigma(x,y,t),y+\Delta t^+\tilde{v}^\sigma(t))$ at the viewpoint $(t+\Delta t^+)$, both belong to the occluded object, on one hand, and have different radiances, on the other hand. The later may happen if the above points occupy distinct locations on the object of the scene which, in turn, may be caused by the presence of the occluding boundary. Under these conditions the absolute values of some of the functions $g^\sigma_t(x,y,t,\tilde{u}^\sigma,\tilde{v}^\sigma),g_t\in G_t$ become large.

1.2. The point in the scene projecting into the image point $(x-\Delta t^-\tilde{u}^\sigma(x,y,t),y-\Delta t^-\tilde{v}^\sigma(t))$ at the viewpoint $(t-\Delta t^-)$ and the point in the scene projecting into the image point $(x+\Delta t^+\tilde{u}^\sigma(x,y,t),y+\Delta t^+\tilde{v}^\sigma(t))$ at the viewpoint $(t+\Delta t^+)$ both belong either to the occluding object or to the occluded one. In addition to this, for some not-too-large vector $(\Delta \tilde{u}^\sigma(x,y,t),\Delta \tilde{v}^\sigma(t))$, one of the following two points in the scene belongs to the occluding object, while the other belongs to the occluded one: the first point is the one projecting into the image point $(x-\Delta t^-(\tilde{u}^\sigma(x,y,t)+\Delta \tilde{u}^\sigma(x,y,t)),y-\Delta t^-(\tilde{v}^\sigma(t)+\Delta\tilde{v}^\sigma(t)))$ at the viewpoint $(t-\Delta t^-)$, and the second point is the one projecting into the image point $(x+\Delta t^+(\tilde{u}^\sigma(x,y,t)+\Delta\tilde{u}^\sigma(x,y,t)),y+\Delta t^+(\tilde{v}^\sigma(t)+\Delta\tilde{v}^\sigma(t)))$ at the viewpoint $(t+\Delta t^+)$. Likewise, for the same vector $(\Delta \tilde{u}^\sigma(x,y,t),\Delta\tilde{v}^\sigma(t))$, one of the following two points in the scene belongs to the occluding object, while the other belongs to the occluded one: the first point is the one projecting into the image point $(x-\Delta t^-(\tilde{u}^\sigma(x,y,t)-\Delta\tilde{u}^\sigma(x,y,t)),y-\Delta t^-(\tilde{v}^\sigma(t)-\Delta\tilde{v}^\sigma(t)))$ at the viewpoint $(t-\Delta t^-)$, and the second point is the one projecting into the image point $(x+\Delta t^+(\tilde{u}^\sigma(x,y,t)-\Delta\tilde{u}^\sigma(x,y,t)),y+\Delta t^+(\tilde{v}^\sigma(t)-\Delta\tilde{v}^\sigma(t)))$ at the viewpoint $(t+\Delta t^+)$ (see FIG. 1). In such a case the values of the functions $(g_t{}^\sigma(x,y,t,\tilde{u}^\sigma,\tilde{v}^\sigma))^2,g_t\in G_t$ become relatively small, while the values of some of the functions $(g_t{}^\sigma(x,y,t,\tilde{u}^\sigma+\Delta\tilde{u}^\sigma,\tilde{v}^\sigma+\Delta\tilde{v}^\sigma))^2,g_t\in G_t$ as well as the values of some of the functions $(g_t{}^\sigma(x,y,t,\tilde{u}^\sigma-\Delta\tilde{u}^\sigma,\tilde{v}^\sigma-\Delta\tilde{v}^\sigma))^2,g_t\in G_t$ become relatively large. This implies that the values of some of the functions $$(g_t{}^\sigma(x,y,t,\tilde{u}^\sigma+\Delta\tilde{u}^\sigma,\tilde{v}^\sigma+\Delta\tilde{v}^\sigma))^2 + (g_t{}^\sigma(x,y,t,\tilde{u}^\sigma-\Delta\tilde{u}^\sigma,\tilde{v}^\sigma-\Delta\tilde{v}^\sigma))^2 - 2(g_t{}^\sigma(x,y,t,\tilde{u}^\sigma,\tilde{v}^\sigma))^2, \quad (4\text{-}6)$$

$g_t\in G_t$ become large. If the second-order and higher partial derivatives of the function $g_t{}^\sigma(x,y,t,\tilde{u}^\sigma,\tilde{v}^\sigma)$ with respect to the components $\tilde{u}^\sigma \equiv \tilde{u}^\sigma(x,y,t)$ and $\tilde{v}^\sigma \equiv \tilde{v}^\sigma(t)$ of the estimate of the velocity vector are ignored, each of the functions (4-7) can be expressed in the form $$2(\Delta \tilde{u}^\sigma(x,y,t) g_{\tilde{u}}^\sigma(x,y,t,\tilde{u}^\sigma,\tilde{v}^\sigma) + \Delta \tilde{v}^\sigma(t) \, g_{\tilde{v}}^\sigma(x,y,t,\tilde{u}^\sigma, \tilde{v}^\sigma))^2 \qquad (4\text{-}7)$$

where the functions $g_{\tilde{u}}^\sigma(x,y,t,\tilde{u}^\sigma,\tilde{v}^\sigma)$ and $g_{\tilde{v}}^\sigma(x,y,t,\tilde{u}^\sigma,\tilde{v}^\sigma)$ are the first-order partial derivatives of the function $g_t^\sigma(x,y,t,\tilde{u}^\sigma,\tilde{v}^\sigma)$ with respect to the components $\tilde{u}^\sigma$ and $\tilde{v}^\sigma$ of the estimate of the velocity vector. For the vector $s \equiv (s_x, s_y)$, $s \in S$ that is collinear to the vector $(\Delta \tilde{u}^\sigma(x,y,t), \Delta \tilde{v}^\sigma(t))$, the above observations imply that the absolute values of some of the functions $(s, \nabla' g_t^\sigma(x,y,t,\tilde{u}^\sigma,\tilde{v}^\sigma)), g_t \in G_t$, defined by the relation $$(s, \nabla' g_t^\sigma(x,y,t,\tilde{u}^\sigma,\tilde{v}^\sigma)) = s_x g_{\tilde{u}}^\sigma(x,y,t,\tilde{u}^\sigma,\tilde{v}^\sigma) + s_y g_{\tilde{v}}^\sigma(x,y,t,\tilde{u}^\sigma,\tilde{v}^\sigma) \qquad (4\text{-}8)$$

become large.

2. The estimate $\{(\tilde{u}^\sigma(x,y,t), \tilde{v}^\sigma(t)) | (x,y) \in \Omega, \sigma \in [1, \infty)\}$ of the parametric velocity vector field changes rapidly in the vicinity of the image point (x,y) (see FIG. 2), which implies the following:

2.1. The value of the functions $|\nabla \tilde{u}^\sigma(x,y,t)|$ become large.

2.2. The absolute values of the functions $(s, \nabla \tilde{u}^\sigma(x,y,t)), s \in S$ become large, provided that the image point (x,y) crosses the occluding boundary in the direction s.

If the conditions on the scene being imaged and on the imaging process itself described at the beginning of the previous section are satisfied, then in the event of the absolute value of the function $g_t^\sigma(x,y,t,\tilde{u}^\sigma,\tilde{v}^\sigma)$ being large for some $g_t \in G_t$, or of the values of the functions $|\nabla \tilde{u}^\sigma(x,y,t)|$ being large in addition to the absolute value of the function $g_t^\sigma(x,y,t,\tilde{u}^\sigma,\tilde{v}^\sigma)$ being large for some $g_t \in G_t$, the image point (x,y) is likely to be near the occluding boundary, while in the event of the absolute values of the functions $(s, \nabla \tilde{u}^\sigma(x,y,t))$, $s \in S$ being large, or of the absolute values of some of the functions $(s, \nabla' g_t^\sigma(x,y,t,\tilde{u}^\sigma, \tilde{v}^\sigma))$, $g_t \in G_t$ being large in addition to the absolute values of the functions $(s, \nabla \tilde{u}^\sigma(x,y,t))$, $s \in S$ being large, the image point (x,y) is likely to cross the occluding boundary in the direction s. Note that in the case of the functions $|\nabla \tilde{u}^\sigma(x,y,t)|$ being large, the image point (x,y) does not necessarily lie near the occluding boundary. It may, for example, lie on the object of the scene whose projection onto the image plane undergoes a rotation or a local deformation. Also note that in the case of some of the functions $(s, \nabla' g_t^\sigma(x,y,t,\tilde{u}^\sigma, \tilde{v}^\sigma))$, $g_t \in G_t$ being large, the image point (x,y) doe snot necessarily cross the occluding boundary in the direction s. It may, for example, cross the radiance boundary arising from a texture or a sudden change in he illumination.

These observations suggest the following: each of the weight functions $\alpha_{g_t}^\sigma(x,y,t,\tilde{u}^{\sigma,\nabla\sigma}, |\nabla \tilde{u}^\sigma|), g_t \in G_t$ should be a steadily decreasing function relative to the absolute value of the function $g_t^\sigma(x,y,t,\tilde{u}^\sigma,\tilde{v}^\sigma)$ and to the values of the function $|\nabla \tilde{u}^\sigma(x,y,t)|$ multiplied by the absolute value of the function $g_t^\sigma(x,y,t,\tilde{u}^\sigma,\tilde{v}^\sigma)$; and each of the weight functions $\beta_s^\sigma(x,y,t,\tilde{u}^\sigma,\tilde{v}^\sigma,(s, \nabla \tilde{u}^\sigma))$, $s \in S$ should be a steadily decreasing function relative to the absolute values of the function $(s, \nabla \tilde{u}^\sigma(x,y,t))$ and to the absolute values of some of the functions $(s, \nabla' g_t^\sigma(x,y,t,\tilde{u}^\sigma, \tilde{v}^\sigma))$, $g_t \in G_t$ multiplied by the absolute values of the function $(s, \nabla \tilde{u}^\sigma(x,y,t))$.

It is natural to require each of the weight functions corresponding to either an optical flow constraint or a directional smoothness constraint to be selected in such a way that the product of the weight function and the corresponding constraint function appearing as the summand in the functional (4-6) becomes larger whenever the constraint function becomes larger. This makes the solution of the system of nonlinear equations (4-4) determining the estimate of the parametric velocity vector field more robust with respect to the choice of the initial estimate of the parametric velocity vector field and with respect to the noise. To be more specific, these requirements consist of the following.

1. for every $g_t \in G_t$ the function defined by the relation:

$$\alpha_{g_t}^\sigma(x,y,t,\tilde{u}^{\sigma,\nabla},|\nabla \tilde{u}^\sigma|), (g_t^\sigma(x,y,t,\tilde{u}^\sigma,\tilde{v}^\sigma))^2, \qquad (4\text{-}9)$$

and appearing as the summand in the functional (4-5) is required to be steadily increasing relative to the function $(g_t^\sigma(x,y,t,\tilde{u}^\sigma,\tilde{v}^\sigma))^2$. In other words, the function (4-9) is required to increase whenever the function $(g_t^\sigma(x,y,t,\tilde{u}^\sigma, \tilde{v}^\sigma))^2$ is increased.

2. For every $s \in S$ the function defined by the relation:

$$\beta_s^\sigma(x,y,t,\tilde{u}^\sigma,\tilde{v}^\sigma,(s,\nabla \tilde{u}^\sigma)) \, (s, \nabla \tilde{u}^\sigma(x,y,t))^2 \qquad (4\text{-}10)$$

and appearing as the summand in the functional (4-5) is required to be steadily increasing relative to the function $(s, \nabla \tilde{u}^\sigma(x,y,t))^2$. In other words, the function (4-10) is required to increase whenever the function $(s, \nabla \tilde{u}^\sigma(x,y,t))^2$ is increased.

The weight functions $$\alpha_{g_t}^\sigma(x,y,t,\tilde{u}^\sigma,\tilde{v}^\sigma,|\nabla \tilde{u}^\sigma|) = (r^2 + (p^2 + q^2|\nabla \tilde{u}^\sigma(x,y,t)|^2)(g_t^\sigma(x,y,t,\tilde{u}^\sigma,\tilde{v}^\sigma))^2)^{-1}, \qquad (4\text{-}11)$$

for every $g_t \in G_t$, where $r^2$, $p^2$, $q^2$ are non-negative real constants, and $$\beta_s^\sigma(x,y,t,\tilde{u}^\sigma,\tilde{v}^\sigma,(s,\nabla \tilde{u}^\sigma)) = (a^2 + (c^2 + b^2(s, \nabla' g_t^\sigma(x,y,t,\tilde{u}^\sigma,\tilde{v}^\sigma))^2)(s, \nabla \tilde{u}^\sigma(x,y,t))^2)^{-1}, \qquad (4\text{-}12)$$

for every $s \in S$, where the expression $b^2(s, \nabla' g_t^\sigma(x,y,t,\tilde{u}^\sigma, \tilde{v}^\sigma))^2$ is defined as in the relation $$b^2(s, \nabla' g_t^\sigma(x,y,t,\tilde{u}^\sigma,\tilde{v}^\sigma))^2 = \int_{G_t} b_{g_t}^2(s, \nabla' g_t^\sigma(x,y,t,\tilde{u}^\sigma,\tilde{v}^\sigma))^2 dg_t, \qquad (4\text{-}13)$$

and $a^2, c^2, b_{g_t}^2, g_t \in G_t$ are non-negative real constants, comply with the above requirements and with the requirements stated earlier in this section.

The approach of obtaining the estimate of the parametric velocity vector field $\{(\tilde{u}^\sigma(x,y,t,\tilde{v}^\sigma(t))| (x,y) \in \Omega, \sigma \in [1, \infty)\}$ by solving the system of nonlinear equations (4-4) for each parameter value $\sigma$ independently may encounter difficulty relating to the fact that the system of equations (4-4) may, in general, have many solutions. To overcome this difficulty, the values of the estimates of the velocity vector field corresponding to the different values of the parameter $\sigma$ are tied together by imposing the following restriction: the estimate of the parametric velocity vector field $\{(\tilde{u}^\sigma(x,y,t, \tilde{v}^\sigma(t))| (x,y) \in \Omega, \sigma \in [1, \infty)\}$ is required to be a continuously differentiable function with respect to the parameter $\sigma$ for every image point $(x,y) \in \Omega$ and for every parameter value $\sigma \in [1, \infty)$. The additional restrictions on the estimate of the parametric velocity vector field $\{(\tilde{u}^\sigma(x,y,t, \tilde{v}^\sigma(t))| (x,y) \in \Omega, \sigma \in [1, \infty)\}$ are imposed in the form of the boundary conditions as follows:

1. The estimate of the parametric velocity vector field $\{(\tilde{u}^\sigma(x,y,t,\tilde{v}^\sigma(t))| (x,y) \in \Omega, \sigma \in [1, \infty)\}$ is required to converge to the vector field that is identically equal to a given vector constant $(\tilde{u}^\infty,\tilde{v}^\infty)$ when the parameter $\sigma$ converges to $\infty$, and such convergence is required to be uniform over the set of the image points $\Omega$.

2. The derivative of the estimate of the parametric velocity vector field $\{(\tilde{u}^\sigma(x,y,t),\tilde{v}^\sigma(t))|(x,y)\in\Omega,\sigma\in[1,\infty)\}$ in the direction normal to the boundary $\partial\Omega$ of the image $\Omega$ is required to be equal to zero for every image point (x,y) belonging to the image boundary $\partial\Omega$ and for every parameter value $\sigma\in[1,\infty)$.

Let $\sigma\in[1,\infty)$ be a given parameter value, and let $\Delta\sigma$ be an infinitesimal positive real value. Taking into consideration the above restrictions, the initial estimate of the velocity vector field $\{(\tilde{u}_0^\sigma(x,y,t),\tilde{v}_0^\sigma(t))|(x,y)\in\Omega\}$ corresponding to the parameter value $\sigma$ can be defined as follows:

$$(\tilde{u}_0^\sigma(x,y,t),\tilde{v}_0^\sigma(t))\equiv(\tilde{u}^{\sigma+\Delta\sigma}(x,y,t),\tilde{v}^{\sigma+\Delta\sigma}(t)),(x,y)\in\Omega \quad (4\text{-}14)$$

Then the regularization constraints (3-12) and (3-13) can, respectively, be approximated by the relations $$\gamma_{u,\sigma}(\tilde{u}^\sigma(x,y,t)-\tilde{u}_o^\sigma(x,y,t))=-\gamma_u\frac{\partial}{\partial\sigma}\tilde{u}^\sigma(x,y,t), \quad (4\text{-}15)$$

$$\gamma_{v,\sigma}(\tilde{v}^\sigma(t)-\tilde{v}_o^\sigma(t))=-\gamma_v\frac{\partial}{\partial\sigma}\tilde{v}^\sigma(t), \quad (4\text{-}16)$$

for every image point $(x,y)\in\Omega$. $\gamma_u,\gamma_v$ are positive real constants given by the relations $$\gamma_u=\gamma_{u,o}\Delta\sigma. \quad (4\text{-}17)$$

$$\gamma_v=\gamma_{v,o}\Delta\sigma. \quad (4\text{-}18)$$

By substituting the regularization constraints $\gamma_{u,o}(\tilde{u}^\sigma(x,y,t)-\tilde{u}_0^\sigma(x,y,t))$ and $\gamma_{v,o}(\tilde{v}^\sigma(t)-\tilde{v}_0^\sigma(t))$ appearing in the system of nonlinear equations (4-4) with the constraints $$-\gamma_u\frac{\partial}{\partial\sigma}\tilde{u}^\sigma(x,y,t) \text{ and } -\gamma_v\frac{\partial}{\partial\sigma}\tilde{v}^\sigma(t),,$$

respectively, and by defining the weight functions $\alpha^\sigma_{g_t}(x,y,t,\tilde{u}^\sigma,\tilde{v}^\sigma,|\nabla\tilde{u}^\sigma|),g_t\in G_t$ and $\beta_s^\sigma(x,y,t,\tilde{u}^\sigma,\tilde{v}^\sigma,(s,\nabla\tilde{u}^\sigma)),s\in S$ according to the relations (4-11) and (4-12), respectively, the system (4-4) becomes the following system of equations relative to the unknown estimate of the parametric velocity vector field $\{(\tilde{u}^\sigma(x,y,t),\tilde{v}^\sigma(t))|(x,y)\in\Omega,\sigma\in[1,\infty)\}$:

$$\int_{G_t}\frac{g_{xt}^\sigma(x,y,t,\tilde{u}^\sigma,\tilde{v}^\sigma)g_t^\sigma(x,y,t,\tilde{u}^\sigma,\tilde{v}^\sigma)}{r^2+(p^2+q^2|\nabla\tilde{u}^\sigma(x,y,t)|^2)(g_t^\sigma(x,y,t,\tilde{u}^\sigma,\tilde{v}^\sigma))^2}dg_t- \quad (4\text{-}19)$$

$$\gamma_u\frac{\partial}{\partial\sigma}\tilde{u}^\sigma(x,y,t)-$$

$$\int_S\left(s,\nabla\frac{(s,\nabla\tilde{u}^\sigma(x,y,t))}{a^2+(c^2+b^2(s,\nabla'g_t^\sigma(x,y,t,\tilde{u}^\sigma,\tilde{v}^\sigma))^2)}\right)ds=0,$$

$$(s,\nabla\tilde{u}^\sigma(x,y,t))^2$$

$$\int_\Omega\int_{G_t}\int\frac{g_{vt}^\sigma(x,y,t,\tilde{u}^\sigma,\tilde{v}^\sigma)g_t^\sigma(x,y,t,\tilde{u}^\sigma,\tilde{v}^\sigma)}{r^2+(p^2+q^2|\nabla\tilde{u}^\sigma(x,y,t)|^2)}dg_tdxdy-$$

$$(g_t^\sigma(x,y,t,\tilde{u}^\sigma,\tilde{v}^\sigma))^2$$

$$\gamma_v\frac{\partial}{\partial\sigma}\tilde{v}^\sigma(t)=0.$$

Under conditions that the regularization constraints $0.5\gamma_u,\sigma(\tilde{u}^\sigma(x,y,t)-\tilde{u}_0^\sigma(x,y,t))^2$ and $0.5\gamma_{v,o}(\tilde{v}^\sigma(t)-\tilde{v}_0^\sigma(t))^2$ appearing in the functional $f(\tilde{u},\tilde{v},\hat{u},\hat{v})$ defined by the relation (4-2) be replaced with the constraints $$0.5\gamma_u\left(\hat{u}^\sigma(x,y,t)-\tilde{u}^\sigma(x,y,t)-\frac{\partial}{\partial\sigma}\tilde{u}^\sigma(x,y,t)\right)^2 \text{ and}$$

$$0.5\gamma_v\left(\hat{v}^\sigma(t)-\tilde{v}^\sigma(t)-\frac{\partial}{\partial\sigma}\tilde{v}^\sigma(t)\right)^2,$$

respectively, and provided that the weight functions $\alpha^\sigma_{g_t}(x,y,t,\tilde{u}^\sigma,\tilde{v}^\sigma,|\nabla\tilde{u}^\sigma|),g_t\in G_t$ are defined according to the relation (4-11), whereas the weight functions $\beta_s^\sigma(x,y,t,\tilde{u}^\sigma,\tilde{v}^\sigma,(s,\nabla\tilde{u}^\sigma)),s\in S$ are defined according to the relation (4-12), the functional $f(\tilde{u},\tilde{v},\hat{u},\hat{v})$ of the parametric vector field $(\tilde{u},\tilde{v})\equiv\{(\tilde{u}^\sigma(x,y,t),\tilde{v}^\sigma(t))|(x,y)\in\Omega,\sigma\in[1,\infty)\}$ and the parametric vector field $(\hat{u},\hat{v})\equiv\{(\hat{u}^\sigma(x,y,t),\hat{v}^\sigma(t))|(x,y)\in\Omega,\sigma\in[1,\infty)\}$ defined by the relation (4-2) can be replaced with the functional $h(\tilde{u},\tilde{v},\hat{u},\hat{v})$ of the same parametric vector fields $(\tilde{u},\tilde{v})(\hat{u},\hat{v})$ defined as in the relation $$h(\tilde{u},\tilde{v},\hat{u},\hat{v})= \quad (4\text{-}20)$$

$$\int_1^\infty\left[\int\int_\Omega\left[\int_{G_t}\frac{\ln(r^2+(p^2+q^2|\nabla\tilde{u}^\sigma(x,y,t)|^2)(g_t^\sigma(x,y,t,\tilde{u}^\sigma,\tilde{v}^\sigma))^2)}{2(p^2+q^2|\nabla\tilde{u}^\sigma(x,y,t)|^2)}dg_t+\right.\right.$$

$$\int_S\frac{\ln(a^2+(c^2+b^2(s,\nabla'g_t^\sigma(x,y,t,\tilde{u}^\sigma,\tilde{v}^\sigma))^2)(s,\nabla\tilde{u}^\sigma(x,y,t))^2)}{2(c^2+b^2(s,\nabla'g_t^\sigma(x,y,t,\tilde{u}^\sigma,\tilde{v}^\sigma))^2)}ds+$$

$$0.5\gamma_u\left(\hat{u}^\sigma(x,y,t)-\tilde{u}^\sigma(x,y,t)-\frac{\partial}{\partial\sigma}\tilde{u}^\sigma(x,y,t)\right)^2\Bigg]dxdy+$$

$$0.5\gamma_v\left(\hat{v}^\sigma(t)-\tilde{v}^\sigma(t)-\frac{\partial}{\partial\sigma}\tilde{v}^\sigma(t)\right)^2\Bigg]d\sigma,$$

where the symbol ln stands for the natural logarithm function.

The above substitutions imply that the parametric vector field $(\tilde{u},\tilde{v})$ satisfies the system of nonlinear equations (4-19) if and only if every variation of the functional $h(\tilde{u},\tilde{v},\hat{u},\hat{v})$ with respect to the parametric vector field $(\hat{u},\hat{v})$ is equal to zero whenever the parametric vector field $(\tilde{u},\tilde{v})$ is identically equal to the parametric vector field $(\tilde{u},\tilde{v})$.

Note that when the constant $q^2$ approaches zero and when the increments between successive viewpoints of the viewpoint sequence $((t"_k)_{k=0}^{k'}$ uniformly approach zero the functional $h(\tilde{u},\tilde{v},\tilde{u},\tilde{v})$ approaches the functional, which is independent of the parametric vector field $(\tilde{u},\tilde{v})$ and the problem of finding the estimate of the parametric velocity vector field becomes the energy minimization problem.

Let $(\tilde{u},\tilde{v}) \equiv \{(\tilde{u}^\sigma(x,y,t),\tilde{v}^\sigma(t))|(x,y) \in \Omega, \sigma \in [1,\infty)\}$ be the estimate of the parametric velocity vector field obtained as the solution of the system of nonlinear equations (4-19). We now examine [000c]the behavior of the system of nonlinear equations (4-19) near such a solution. First, the changes in the behavior of the optical flow and the directional smoothness constraints when the image point (x,y) goes from the position beyond the occluding boundary to the position near the occluding boundary are considered. Then, the dependence of the optical flow and the directional smoothness constraints on the parameters $r^2$, $p^2$, $q^2$ specifying the weight functions $\alpha_{gt}^\sigma(x,y,t,\tilde{u}^\sigma,\tilde{v}^\sigma,|\nabla\tilde{u}^\sigma|)$, $g_t \in G_t$, as in the relation (4-11) and on the parameters $a^2$,$c^2$,$b^2_g$, $g_t \in G_t$, specifying the weight functions $\beta_s^\sigma(x,y,t,\tilde{u}^\sigma,\tilde{v}^\sigma,(s,\nabla\tilde{u}^\sigma))$, $s \in S$ as in the relation (4-12) are investigated.

$(\Delta\tilde{u},\Delta\tilde{v}) \equiv \{(\Delta\tilde{u}^\sigma(x,y,t),\Delta\tilde{v}^\sigma(t))|(x,y) \in \Omega, \sigma \in [1,\infty)\}$ be a parametric vector field defined by the relation (4-1), then in the neighborhood of the parametric vector field $(\tilde{u},\tilde{v})$ the functional $h(\tilde{u},\tilde{v},\tilde{u}+\tilde{u},\tilde{v}+\tilde{v})$ can be expanded into the quadratic form of the parametric vector field $(\Delta\tilde{u},\Delta\tilde{v})$ as follows:

$$h(\tilde{u},\tilde{v},\tilde{u} + \Delta\tilde{u},\tilde{v} + \Delta\tilde{v}) - h(\tilde{u},\tilde{v},\tilde{u},\tilde{v}) = \quad (4\text{-}21)$$

$$\frac{1}{2}\int_1^\infty \left[ \int\int_\Omega \left[ \int G_t \frac{r^2 - (p^2 + q^2|\nabla\tilde{u}^\sigma(x,y,t)|^2)(g_t^\sigma(x,y,t,\tilde{u}^\sigma,\tilde{v}^\sigma))^2}{(r^2 + (p^2 + q^2|\nabla\tilde{u}^\sigma(x,y,t)|^2)(g_t^\sigma(x,y,t,\tilde{u}^\sigma,\tilde{v}^\sigma))^2)^2} \right. \right.$$

$$(g_{tu}^\sigma(x,y,t,\tilde{u}^\sigma,\tilde{v}^\sigma)\Delta\tilde{u}^\sigma(x,y,t) + g_{tv}^\sigma(x,y,t,\tilde{u}^\sigma,\tilde{v}^\sigma)\Delta\tilde{v}^\sigma(t))^2 dg_t +$$

$$\int_s \frac{(a^2 - (c^2 + b^2(s,\nabla'g_t^\sigma(x,y,t,\tilde{u}^\sigma,\tilde{v}^\sigma))^2)(s,\nabla\tilde{u}^\sigma(x,y,t))^2)}{(a^2 + (c^2 + b^2(s,\nabla'g_t^\sigma(x,y,t,\tilde{u}^\sigma,\tilde{v}^\sigma))^2)(s,\nabla\tilde{u}^\sigma(x,y,t))^2)^2}$$

$$\left. \left. (s,\nabla(\Delta\tilde{u}^\sigma(x,y,t)))^2 ds + \gamma_u(\Delta\tilde{u}^\sigma(x,y,t))^2 \right] dxdy + \gamma_v(\Delta\tilde{v}^\sigma(t))^2 \right] d\sigma.$$

The optical flow constraint $g_t^\sigma(x,y,t,\tilde{u}^\sigma,\tilde{v}^\sigma)$ corresponding to the index $g_t \in G_t$) is represented in the system of nonlinear equations (4-19) by the expression $$\frac{\sqrt{(g_t^\sigma(x,y,t,\tilde{u}^\sigma,\tilde{v}^\sigma))^2}}{r^2 + (p^2 + q^2|\nabla\tilde{u}^\sigma(x,y,t)|^2)(g_t^\sigma(x,y,t,\tilde{u}^\sigma,\tilde{v}^\sigma))^2} \quad (4\text{-}22)$$

With respect to this expression the following cases can be considered:

1. The image point (x,y) is beyond the occluding boundary. Then the value of the function $(g_t^\sigma(x,y,t,\tilde{u}^\sigma,\tilde{v}^\sigma))^2$ may become small. In this case the value of the function (4-22) would approach the value of the function $$\frac{\sqrt{(g_t^\sigma(x,y,t,\tilde{u}^\sigma,\tilde{v}^\sigma))^2}}{r^2} \quad (4\text{-}23)$$

This, in turn, would make each of the two summands of the system of nonlinear equations (4-19) associated with the optical flow constraint $g_t^\sigma(x,y,t,\tilde{u}^\sigma,\tilde{v}^\sigma)$ corresponding to the index $g_t$, behave as a linear function relative to the function $g_t^\sigma(x,y,t,\tilde{u}^\sigma,\tilde{v}^\sigma)$ with the proportionality coefficient equal to the function $g_{tu}^\sigma(x,y,t,\tilde{u}^\sigma,\tilde{v}^\sigma)/r^2$ in the case of the first summand and to the function $g_{tv}^\sigma(x,y,t,\tilde{u}^\sigma,\tilde{v}^\sigma)/r^2$ in the case of the second summand.

2. The image point (x,y) approaches the occluding boundary. Then the value of the function $(g_t^\sigma(x,y,t,\tilde{u}^\sigma,\tilde{v}^\sigma))^2$ may increase. In the case when the value of the function $(g_t^\sigma(x,y,t,\tilde{u}^\sigma,\tilde{v}^\sigma))^2$ is less than the value of the function $r^2/p^2+q^2|\nabla\tilde{u}^\sigma(x,y,t)|^2)$, the fact that the summand of the quadratic form (4-12) associated with the optical flow constraint $g_t^\sigma(x,y,t,\tilde{u}^\sigma,\tilde{v}^\sigma)$ is positive implies that the function (4-22) would increase. In the case when the value of the function $(g_t^\sigma(x,y,t,\tilde{u}^\sigma,\tilde{v}^\sigma))^2$ is greater than the value of the function $r^2/(p^2+q^2|\nabla\tilde{u}^\sigma(x,y,t)|^2)$, the fact that the summand of the quadratic form (4-21) associated with the optical flow constraint $g_t^\sigma(x,y,t,\tilde{u}^\sigma,\tilde{v}^\sigma)$ is negative implies that the function (4-22) would decrease. Therefore, the function (4-22) achieves its maximal value $$\frac{1}{2r\sqrt{p^2 + q^2|\nabla\tilde{u}^\sigma(x,y,t)|^2}} \quad (4\text{-}24)$$

when the value of the function $(g_t^\sigma(x,y,t,\tilde{u}^\sigma,\tilde{v}^\sigma))^2$ is equal to the value of the function $r^2/(p^2+q^2|\nabla\tilde{u}^\sigma(x,y,t)|^2)$.

It may also happen that the values of the function $|\nabla\tilde{u}^\sigma(x,y,t)|$ becomes large. Under these conditions the following values are reduced: the maximal value of the function (4-22) specified by the relation (4-24), the value $r^2/(p^2+q^2|\nabla\tilde{u}^\sigma(x,y,t)|^2)$ of the function $(g_t^\sigma(x,y,t,\tilde{u}^\sigma,\tilde{v}^\sigma))^2$ where this maximal value is achieved. The above situation may occur in the following cases.

1. The occluding object may artificially constrain the estimate $(\tilde{u}^\sigma(x,y,t),\tilde{v}^\sigma(t))$ in the direction orthogonal to the occluding boundary. Then the optical flow constraint may react by shifting the estimate $(\tilde{u}^\sigma(x,y,t),\tilde{v}^\sigma(t))$ of the velocity vector in the direction parallel to the occluding boundary to reduce the absolute value of the function $g_t^\sigma(x,y,t,\tilde{u}^\sigma,\tilde{v}^\sigma)$. This, in turn, may increase the value of the function $|\nabla\tilde{u}^\sigma(x,y,t)|$.

2. The estimate $(\tilde{u}^\sigma(x,y,t),\tilde{v}^\sigma(t))$ may diverge as the result of nonlinearity of the optical flow constraint or as the result of the noise present in the images.

The directional smoothness constraint $(s,\nabla\tilde{u}^\sigma(x,y,t))$ in the direction $s \in S$ is represented in the system of nonlinear equations (4-19) by the expression $$\frac{\sqrt{(s,\nabla\tilde{u}^\sigma(x,y,t))^2}}{a^2 + (c^2 + b^2(s,\nabla'g_t^\sigma(x,y,t,\tilde{u}^\sigma,\tilde{v}^\sigma))^2)(s,\nabla\tilde{u}^\sigma(x,y,t))^2} \quad (4\text{-}25)$$

With respect to this expression the following cases can be considered:

1. The image point (x,y) does not cross the occluding boundary in the direction s. Then the value of the function $(s,\nabla\tilde{u}^\sigma(x,y,t))^2$ may become small. In this case the value of the function (4-25) would approach the value of the function $$\frac{\sqrt{(s,\nabla\tilde{u}^\sigma(x,y,t))^2}}{a^2} \quad (4\text{-}26)$$

This, in turn, would make the summand of the system of nonlinear equations (4-19) associated with the directional smoothness constraint $(s,\nabla\tilde{u}^\sigma(x,y,t))$ behave as a linear function of the corresponding constraint with proportionality coefficient equal to the constant value $1/a^2$.

2. The image point (x,y) approaches the occluding boundary in he direction s. Then the value of the function $(s,\nabla \tilde{u}^\sigma(x,y,t))^2$ may increase. In the case when the value of the function $(s,\nabla\tilde{u}^\sigma(x,y,t))^2$ is less than the value of the function $a^2/(c^2+b^2(s,\nabla'g_t^\sigma(x,y,t,\tilde{u}^\sigma,\tilde{v}^\sigma))^2)$, the fact that the summand of the quadratic form (4-21) associated with the directional smoothness constraint $(s,\nabla\tilde{u}^\sigma(x,y,t))$ is positive implies that the function (4-25) would increase. In the case when the value of the function $(s,\nabla\tilde{u}^\sigma(x,y,t))^2$ is greater than the value of the function $a^2/(c^2+b^2(s,\nabla'g_t^\sigma(x,y,t,\tilde{u}^\sigma,\tilde{v}^\sigma))^2)$, the fact that the summand of the quadratic form (4-21) associated with the directional smoothness constraint $(s,\nabla\tilde{u}^\sigma(x,y,t))$ is negative implies that the function (4-25) would decrease. Therefore, the function (4-25) achieves its maximal value $$\frac{1}{2a\sqrt{c^2 + b^2(s,\nabla'g_t^\sigma(x,y,t,\tilde{u}^\sigma,\tilde{v}^\sigma))^2}} \quad (4\text{-}27)$$

when the value of the function $(s,\nabla\tilde{u}^\sigma(x,y,t))^2$ is equal to the value of the function $a^2/(c^2+b^2(s,\nabla'g_t^\sigma(x,y,t,\tilde{u}^\sigma,\tilde{v}^\sigma))^2)$.

In the case when the values of some of the functions $(s,\nabla'g_t^\sigma(x,y,t,\tilde{u}^\sigma,\tilde{v}^\sigma)),g_t\epsilon G_t$ are large the following values are reduced: the maximal value of the function (4-25) specified by the relation (4-27), the value $a^2/(c^2+b^2(s,\nabla'g_t^\sigma(x,y,t,\tilde{u}^\sigma,\tilde{v}^\sigma))^2)$, of the function $(s,\nabla\tilde{u}^\sigma(x,y,t))^2$ where this maximal value is achieved. Such an action reflects the fact that in this case the image point (x,y) is likely to cross the occluding boundary in the direction s if the value of the function $(s,\nabla\tilde{u}^\sigma(x,y,t))^2$ specifying the degree of the smoothness of the estimate of the velocity vector field in such a direction s is large.

As has been stated earlier the role of the regularization constraint is to discriminate between the parametric vector fields $(\tilde{u}, \tilde{v})$ giving the same optimal values to the weighted average of the optical flow and the directional smoothness constraints without causing any significant changes in these values. This is achieved by assigning small values to the parameters $\gamma_u$ and $\gamma_v$ appearing in the system of nonlinear equations (4-19). For the sake of simplicity of the analysis given below, we shall ignore the regularization constraints by assuming that the parameters $\gamma_u$ and $\gamma_v$ are equal to zero while keeping in mind that the solution of the system of nonlinear equations (4-19) is locally unique.

Taking the above into account, the process of solving the system of nonlinear equations (4-19) described in the next section can be regarded as an attempt to achieve an equal balance between the functions representing two antagonistic sets of constraints: optical flow constraints and directional smoothness constraints. This, in part, is the consequence of the fact that the quadratic form arising from the linearization (5-16) of the system of nonlinear equations (4-19) described in the next section is positive definite.

It is not difficult to see that by increasing the values of the parameters $r^2$, $p^2$, $q^2$ appearing in the relation (4-11), we decrease the values of the weight functions $\alpha_{g_t}^\sigma(x,y,t,\tilde{u}^\sigma, \tilde{v}^\sigma,|\nabla\tilde{u}^\sigma|),g_t\epsilon G_t$. This would shift the balance in the system of nonlinear equations (4-19) toward the directional smoothness constraints. To restore the equal balance between the optical flow and the directional smoothness constraints the system of nonlinear equations (4-19) would react in such a way that the absolute values of the function $(s,\nabla \tilde{u}^\sigma(x,y,t)),s\epsilon S$ corresponding to the directional smoothness constraint is reduced, while the absolute values of the functions $\alpha_{g_t}^\sigma(x,y,t,\tilde{u}^\sigma,\tilde{v}^\sigma,|\nabla\tilde{u}^\sigma|)$, $g_t\epsilon G_t$ corresponding to the optical flow constraints are increased. Likewise, by increasing the values of the parameters $a^2,c^2,b^2_{g_t},g_t\epsilon G_t$ appearing in the relation (4-13), we decrease the values of the weight functions $\beta_s^\sigma(x,y,t,\tilde{u}^\sigma,\tilde{v}^\sigma,(s,\nabla\tilde{u}^\sigma)),s\epsilon S$. This, in turn, would shift the balance in the system of nonlinear equations (4-19) toward the optical flow constraints. To restore equal balance between the optical flow and the directional smoothness constraints the system of nonlinear equations (4-19) would react in the way that would reduce the absolute values of the functions $g_t^\sigma(x,y,t,\tilde{u}^\sigma,\tilde{v}^\sigma),g_t\epsilon G_t$ corresponding to the optical flow constraints and would increase the absolute value of the function $(s,\nabla\tilde{u}^\sigma(x,y,t)),s\epsilon S$ corresponding to the directional smoothness constraints.

Taking into account the earlier discussion related to the behavior of the optical flow and the directional smoothness constraints, we can conclude the following. The parameters $r^2$ and $a^2$ have their greatest impact on the solution of the system of nonlinear equations (4-19) at the image points that are away from the occluding boundary, while the parameters $p^2$, $q^2$, $c^2$, $b^2_{g_t},g_t\epsilon G_t$ mostly influence the solution at the image points that are near the occluding boundary. The parameter $r^2$ defines the coefficient of proportionality for the functions $g_t^\sigma(x,y,t,\tilde{u}^\sigma,\tilde{v}^\sigma),g_t\epsilon G_t$ specifying the optical flow constraints, while the parameter $a^2$ determines the proportionality coefficient for the function $(s,\nabla\tilde{u}^\sigma(x,y,t)),s\epsilon S$ specifying the directional smoothness constraints. The combination (4-24) of the parameters $r^2$, $p^2$, and $q^2$ determines the upper limit for the influence of the optical flow constraints on the solution of the system of nonlinear equations (4-19), while the combination (4-27) of the parameters $a^2$, $c^2$ and $b^2_{g_t},g_t\epsilon G_t$ determines the upper limit for the influence of the directional smoothness constraints on the solution of the system of nonlinear equations (4-19).

Earlier the estimate $\{(\tilde{u}^\sigma(x,y,t),\tilde{v}^\sigma(t))|(x,y)\epsilon\Omega,\sigma\epsilon[1,\infty)\}$ of the parametric velocity vector field $\{(\tilde{u}^\sigma(x,y,t), \tilde{v}^\sigma(t))|(x,y)\epsilon\Omega,\sigma\epsilon[1,\infty)\}$ was defined as a solution of the system of nonlinear equations (4-19), which can be expressed in the following form:

$$\int_{G_t} \frac{\tilde{g}_t^\sigma \tilde{g}_t^\sigma dg_t}{r^2 + (p^2 + q^2|\nabla\tilde{u}^\sigma|^2)(\tilde{g}_t^\sigma)^2} - \quad (5\text{-}1)$$

$$\int_S \left( s,\nabla \frac{(s,\nabla\tilde{u}^\sigma)}{a^2 + (c^2 + b^2(s,\nabla'\tilde{g}_t^\sigma)^2)(s,\nabla\tilde{u}^\sigma)^2} \right) ds -$$

$$\gamma_u \frac{\partial}{\partial\sigma} \tilde{u}^\sigma = 0,$$

-continued $$\int\int_\Omega \int_{G_t} \frac{\tilde{g}_{ru}^\sigma \tilde{g}_t^\rho dg_t dx dy}{r^2 + (p^2 + q^2|\nabla \tilde{u}^\sigma|^2)(\tilde{g}_t^\sigma)^2} -$$

$$\gamma_v \frac{\partial}{\partial \sigma} \tilde{v}^\sigma = 0. \quad (5)$$

Here, for the sake of compactness of the notation, the arguments of the functions appearing in the system of nonlinear equations (4-19) have been omitted. Also, the symbols $\tilde{g}_t^\sigma$, $\tilde{g}_{ru}^\sigma$, $\tilde{g}_{rv}^\sigma$, $\tilde{g}_t^\sigma$ have been used instead of the symbols $\bar{g}_t^\sigma$, $\bar{g}_{ru}^\sigma$, $\bar{g}_{rv}^\sigma$, $\bar{g}_t^\sigma$ to indicate that at every image point $(x,y)\in\Omega$ the corresponding functions depend on the estimate $(\tilde{u}^\sigma(x,y,t),\tilde{v}^\sigma(t))$ of the velocity vector $(u^\sigma(x,y,t),v^\sigma(t))$.

To compute the estimate of the parametric velocity vector field $\{(\tilde{u}^\sigma(x,y,t),\tilde{v}^\sigma(t))|(x,y)\in\Omega,\sigma\in[1,\infty)\}$ a restriction is imposed ourselves to a finite subset $\sigma_1, \ldots, \sigma_n$ of the parameter values from the interval $[1,\infty)$. Let $\sigma_0$ be the parameter with the value equal to $\infty$. Suppose that the value of the parameter $\sigma_n$ is equal to 1; and that the sequence of the parameters $\sigma_0, \sigma_1, \ldots, \sigma_n$ is not too sparse, and is decreasing in values. Then the estimate of the parametric velocity vector field $\{(\tilde{u}^\sigma(x,y,t),\tilde{v}^\sigma(t))|(x,y)\in\Omega,\sigma=\sigma_1, \ldots, \sigma_n\}$ is obtained by successively solving the system of nonlinear equations (5-1) for each value of the parameter $\sigma=\sigma_1, \ldots \sigma_n$, starting with the parameter value $\sigma=\sigma_0$ where the solution is identically equal to a given vector constraint $(\tilde{u}^\infty,\tilde{v}^\infty)$, and proceeding in the direction decreasing with respect to the parameter values using the solution of the system of nonlinear equations (5-1) obtained for the preceding parameter value as the initial estimate.

Let $\delta(\sigma)$ be a function of the parameter $\sigma$ defined on the set of the parameter values $\sigma=\sigma_1, \ldots, \sigma_n$ by the following relation:

$$\delta(\sigma_i) = \sigma_{i-1}, i=1, \ldots, n. \quad (5-2)$$

If the weight constants $\gamma_u^\sigma, \gamma_v^\sigma, \sigma=\sigma_1, \ldots, \sigma_n$ are defined as in the relations $$\gamma_u = \gamma_u^\sigma(\delta(\sigma)-\sigma), \quad (5-3)$$

$$\gamma_v = \gamma_v^\sigma(\delta(\sigma)-\sigma), \quad (5-4)$$

then the regularization constraints $$-\gamma_u \frac{\partial}{\partial \sigma} \tilde{u}^\sigma(x,y,t) \text{ and } -\gamma_v \frac{\partial}{\partial \sigma} \tilde{v}^\sigma(t)$$

can respectively, be approximated as $$-\gamma_u \frac{\partial}{\partial \sigma} \tilde{u}^\sigma(x,y,t) \approx \gamma_u^\sigma(\tilde{u}^\sigma(x,y,t) - \tilde{u}^{\delta(\sigma)}(x,y,t)), \quad (5-5)$$

$$-\gamma_v \frac{\partial}{\partial \sigma} \tilde{v}^\sigma(t) \approx \gamma_v^\sigma(\tilde{v}^\sigma(t) - \tilde{v}^{\delta(\sigma)}(t)), \quad (5-6)$$

for every image point $(x,y)\in\Omega$, and for every parameter value $\sigma=\sigma_1, \ldots \sigma_n$. Under these conditions the system of nonlinear equations (5-1) of the unknown estimate of the parametric velocity vector field $\{(\tilde{u}^\sigma(x,y,t), \tilde{v}^\sigma(t))|(x,y)\in\Omega,\sigma=\sigma_1, \ldots, \sigma_n\}$ takes the form $$\int_{G_t} \frac{\tilde{g}_{ru}^\sigma \tilde{g}_t^\rho dg_t}{r^2 + (p^2 + q^2|\nabla \tilde{u}^\sigma|^2)(\tilde{g}_t^\sigma)^2} - \quad (5-7)$$

$$\int_S \left( s,\nabla \frac{(s,\nabla \tilde{u}^\sigma)}{a^2 + (c^2 + b^2(s,\nabla \tilde{g}_t^\sigma)^2)(s,\nabla \tilde{u}^\sigma)^2} \right) ds +$$

$$\int\int_\Omega \int_{G_t} \frac{\tilde{g}_{ru}^\sigma \tilde{g}_t^\rho dg_t dx dy}{r^2 + (p^2 + q^2|\nabla \tilde{u}^\sigma|^2)(\tilde{g}_t^\sigma)^2} + \gamma_v^\sigma(\tilde{v}^\sigma - \tilde{v}^{\delta(\sigma)}) = 0.$$

Then the computational process for estimating the parametric velocity vector field can be more precisely described as follows: for every parameter value $\sigma=\sigma_1, \ldots, \sigma_n$, using the previously obtained estimate $\{(\tilde{u}^{\delta(\sigma)}(x,y,t), \tilde{v}^{\delta(\sigma)}(t))|(x,y)\in\Omega\}$ of the velocity vector field corresponding to the parameter value $\delta(\sigma)$ as the initial estimate, find the estimate $\{(\tilde{u}^\sigma(x,y,t),\tilde{v}^\sigma(t))|(x,y)\in\Omega\}$ of the velocity vector field corresponding to the parameter value $\sigma$ that is the closest to the initial estimate by solving the system of nonlinear equations (5-7).

For a fixed value of the parameter $\sigma=\sigma_1, \ldots, \sigma_n$, the system of nonlinear equations (5-7) relative to the unknown estimate $(\tilde{u},\tilde{v}^\sigma)\equiv\{(\tilde{u}^\sigma(x,y,t),\tilde{v}^\sigma(t))|(x,y)\in\Omega\}$ of the velocity vector field corresponding to the parameter value $\sigma$, defines, for every image point $(x,y)\in\Omega$, a set of relations between the components of the velocity vector $(\tilde{u}^\sigma(x,y,t),\tilde{v}^\sigma(t))$ and its partial derivatives, which can be expressed in the form $$F^\sigma(\tilde{u}^\sigma,\tilde{v}^\sigma)=0. \quad (5-8)$$

To find the estimate $(\tilde{u}^\sigma,\tilde{v}^\sigma)$ of the velocity vector field corresponding to the parameter value $\sigma$ as an estimate of the solution of the system of nonlinear equations (5-7) corresponding to the parameter value $\sigma$ that is the closest to the initial estimate $(\tilde{u}^{\delta(\sigma)},\tilde{v}^{\delta(\sigma)})$ the iterative updating scheme can be used. In this scheme, starting with the initial estimate $(\tilde{u}^{\delta(\sigma)},\tilde{v}^{\delta(\sigma)})$, which is taken as the current estimate $(\tilde{u}^\sigma,\tilde{v}^\sigma)$ of the solution of the system of nonlinear equations (5-7) corresponding to the parameter value $\sigma$, the improved estimate $(\tilde{u}_+^\sigma,\tilde{v}_+^\sigma)\equiv\{(\tilde{u}_+^\sigma(x,y,t),\tilde{v}_+^\sigma(t))|(x,y)\in\Omega\}$ of the solution of the system of nonlinear equations (5-7) corresponding to the parameter value $\sigma$ is determined by the step $$(\tilde{u}_+^\sigma,\tilde{v}_+^\sigma)=(\tilde{u}^\sigma,\tilde{v}^\sigma)+\omega(\Delta\tilde{u}^\sigma,\Delta\tilde{v}^\sigma), \quad (5-9)$$

where the scaler parameter $\omega$ defines the length of the step, while the vector field $(\Delta\tilde{u}^\sigma,\Delta\tilde{v}^\sigma)\equiv\{(\Delta\tilde{u}^\sigma(x,y,t),\Delta\tilde{v}^\sigma(t))|(x,y)\in\Omega\}$ defines the direction of the step. The step length $\omega\in(0,1]$ is selected in such a way that the following function is minimized:

$$f^\sigma(\omega)=F^\sigma(\tilde{u}^\sigma+\omega\Delta\tilde{u}^\sigma,\tilde{v}^\sigma+\omega\Delta\tilde{v}^\sigma)^T F^\sigma(\tilde{u}^\sigma+\omega\Delta\tilde{u}^\sigma,\tilde{v}^\sigma+\omega\Delta\tilde{v}^\sigma). \quad (5-10)$$

The step direction $(\Delta\tilde{u}^\sigma,\Delta\tilde{v}^\sigma)$ is selected in such a way that the function (5-10) becomes steadily decreasing for sufficiently small values of $\omega\in(0,1]$. The improved estimate $(\tilde{u}_+^\sigma,\tilde{v}_+^\sigma)$ is taken as the current estimate $(\tilde{u}^\sigma,\tilde{v}^\sigma)$ of the solution of the system of nonlinear equations (5-7) corresponding to the parameter value $\sigma$, and the step (5-9) of the iterative updating scheme is repeated to determine the next improved estimate $(\tilde{u}_+^\sigma,\tilde{v}_+^\sigma)$ of the solution of the system of nonlinear equations (5-7) corresponding to the parameter value σ. This process is continued until the appropriate criteria are met, in which case the improved estimate $(\tilde{u}_+^\sigma, \tilde{v}_+^\sigma)$ is taken as the estimate $(\tilde{u}^\sigma, \tilde{v}^\sigma)$ of the velocity vector field corresponding to the parameter value σ.

If the vector field $(\Delta\tilde{u}^\sigma, \Delta\tilde{v}^\sigma)$ is not too large, then in the neighborhood of the vector field $(\tilde{u}^{\sigma,v\sigma})$ the nonlinear operator $F^\sigma$ can be linearly expanded as $$F^\sigma(\tilde{u}^\sigma + \Delta\tilde{u}^\sigma, \tilde{v}^\sigma + \Delta\tilde{v}^\sigma) = F^\sigma(\tilde{u}^\sigma, \tilde{v}^\sigma) + J^\sigma(\tilde{u}^\sigma, \tilde{v}^\sigma, \Delta\tilde{u}^\sigma, \Delta\tilde{v}^\sigma). \quad (5\text{-}11)$$

Here the linear and bounded with respect to the vector field $(\Delta\tilde{u}^\sigma, \Delta\tilde{v}^\sigma)$ operator $J^\sigma(\tilde{u}^\sigma, \tilde{v}^\sigma, \Delta\tilde{u}^\sigma, \Delta\tilde{v}^\sigma)$ is the Jacobian of the nonlinear operator $F^\sigma(\tilde{u}^\sigma, \tilde{v}^\sigma)$. The operator $J^\sigma(\tilde{u}^\sigma, \tilde{v}^\sigma, \Delta\tilde{u}^\sigma, \Delta\tilde{v}^\sigma)$ can be more conveniently expressed in the form $$J^\sigma(\tilde{u}^\sigma, \tilde{v}^\sigma, \Delta\tilde{u}^\sigma, \Delta\tilde{v}^\sigma) = J^\sigma(\tilde{u}^\sigma, \tilde{v}^\sigma)(\Delta\tilde{u}^\sigma, \Delta\tilde{v}^\sigma). \quad (5\text{-}12)$$

In the Newton method [22] the vector field $(\Delta\tilde{u}^\sigma, \Delta\tilde{v}^\sigma)$ is defined as a solution of the system of linear equations $$=J^\sigma(\tilde{u}^\sigma, \tilde{v}^\sigma)(\Delta\tilde{u}^\sigma, \Delta\tilde{v}^\sigma) = -F^\sigma(\tilde{u}^\sigma, \tilde{v}^\sigma). \quad (5\text{-}13)$$

Then the improved estimate $(\tilde{u}_+^\sigma, \tilde{v}_+^\sigma)$ of the solution of the system of nonlinear equations (5-7) is defined as in the relation (5-9) where the scalar parameter ω is taken to be equal to 1.

The improved estimate $(\tilde{u}_+^\sigma, \tilde{v}_+^\sigma)$ of the solution of the system of nonlinear equations (5-7), which is obtained as the result of solving the system of linear equations (5-13) and then applying the relation (5-9), is not necessarily a better estimate. The reason behind it comes from the fact that the Jacobian $J^\sigma(\tilde{u}^\sigma, \tilde{v}^\sigma)$ of the nonlinear operator $F^\sigma(\tilde{u}^\sigma, \tilde{v}^\sigma)$ is nonsymmetric and ill-conditioned, so that the system of linear equations (5-13) cannot be reliably solved for the vector field $(\Delta\tilde{u}^\sigma, \Delta\tilde{v}^\sigma)$. The last is the consequence of the fact that the regularization constraints can only be effective in resolving the ambiguities of the system of nonlinear equations (5-7) at the image points that are beyond the occluding boundaries where the quadratic form appearing in the relation (4-12) is positive definite. The regularization constraints become ineffective in resolving the ambiguities of the system of nonlinear equations (5-7) at the image points that are near the occluding boundaries where the quadratic form appearing in the relation (4-21) is not positive definite. This observation suggests that an alternative method should be employed.

In the quasi-Newton method of solving the system of nonlinear equations (5-7) the system of linear equations (5-13) is replaced with the system of linear equations $$M^\sigma(\tilde{u}^\sigma, \tilde{v}^\sigma)\Delta(\tilde{u}^\sigma, \Delta\tilde{v}^\sigma), \quad (5\text{-}14)$$

which combines the globally convergent strategy of the well-conditioned method with the fast local strategy of the Newton method in a way that derives the benefits of both. This quasi-Newton method defines the regularization of the system of nonlinear equations (5-7) that is meaningful for the problem of estimating the parametric velocity vector field. The linear and bounded with respect to the vector field $(\Delta\tilde{u}^\sigma, \Delta\tilde{v}^\sigma)$ operator $M^\sigma(\tilde{u}^\sigma, \tilde{v}^\sigma)(\Delta\tilde{u}^\sigma, \Delta\tilde{v}^\sigma)$ is the approximation to the Jacobian $J^\sigma(\tilde{u}^\sigma, \tilde{v}^\sigma)(\Delta\tilde{u}^\sigma, \Delta\tilde{v}^\sigma)$ of the nonlinear operation $F^\sigma(\tilde{u}^\sigma, \tilde{v}^\sigma)$ defined as follows.

Let $F_\theta^\sigma(\tilde{u}^\sigma, \tilde{v}^\sigma, \hat{u}^\sigma, \hat{v}^\sigma), \theta \in [0,1]$, be a family of nonlinear operators of the invariable copy $(\tilde{u}^\sigma, \tilde{v}^\sigma)$ and of the variable copy $(\hat{u}^\sigma, \hat{v}^\sigma)$ of the estimate of the velocity vector field corresponding to the parameter value σ defined by the relation $$\int_{G_t} \frac{\tilde{g}_{t,s}^\sigma \hat{g}_t^\sigma dg_t}{(r^2 + (p^2 + q^2|\nabla \tilde{u}^\sigma|^2)(\tilde{g}_t^\sigma)^2)^{1-\theta}(r^2 + (p^2 + q^2|\nabla \tilde{u}^\sigma|^2)(\hat{g}_t^\sigma)^2)^\theta} + \gamma_*^\sigma(\hat{u}^\sigma - \tilde{u}^{\delta(\sigma)}) - \quad (5\text{-}15)$$

$$\int_S \left( s_* \nabla \frac{s_* \nabla \hat{u}^\sigma}{(a^2 + (c^2 + b^2(s_* \nabla \tilde{g}_t^\sigma)^2)(s_* \nabla \tilde{u}^\sigma)^2)^{1-\theta}(a^2 + (c^2 + b^2(s_* \nabla \hat{g}_t^\sigma)^2)(s_* \nabla \hat{u}^\sigma)^2)^\theta} \right)$$

$$\int\int_\Omega \int_{G_t} \frac{\tilde{g}_{t,s}^\sigma \hat{g}_t^\sigma dg_t dxdy}{(r^2 + (p^2 + q^2|\nabla \tilde{u}^\sigma|^2)(\tilde{g}_t^\sigma)^2)^{1-\theta}(r^2 + p^2 + q^2|\nabla \tilde{u}^\sigma|^2)(\hat{g}_t^\sigma)^2)^\theta} + \gamma_*^\sigma(\hat{v}^\sigma - \tilde{v}^{\delta(\sigma)}),$$

where the symbols $\tilde{g}_t^\sigma, \tilde{g}_{t,\bar{u}}^{\sigma}, \tilde{g}_{t,\bar{v}}^{\sigma}, \tilde{g}_t^\sigma$ are used to indicate that at every image point $(x,y) \in \Omega$ the corresponding functions depend on the invariable copy $(\tilde{u}^\sigma(x,y,t), \tilde{v}^\sigma(t))$ of the estimate of the velocity vector $(u^{\sigma(x,y,t),v\sigma}(t))$, while the symbol $\hat{g}_t^\sigma$ is used to indicate that at every image point $(x,y) \in \Omega$ the corresponding function depends on the variable copy $(\hat{u}^\sigma(x,y,t), \hat{v}^\sigma(t))$ of the estimate of the velocity vector $(u^{\sigma(x,y,t),v\sigma}(t))$. If the variable copy $(\hat{u}^\sigma, \hat{v}^\sigma)$ of the estimate of the velocity vector field is identically equal to the invariable copy $(\tilde{u}^\sigma, \tilde{v}^\sigma)$ of the estimate of the velocity vector field, then for every $\theta \in [0,1]$ the nonlinear operator $F_\theta^\sigma(\tilde{u}^\sigma, \tilde{v}^\sigma, \hat{u}^\sigma, \hat{v}^\sigma)$ is identically equal to the nonlinear operator $F^\sigma(\tilde{u}^\sigma, \tilde{v}^\sigma)$. The parameter θ defines the degree of the feedback relaxation of the optical flow and the directional smoothness constraints through the variable copy $(\hat{u}^\sigma, \hat{v}^\sigma)$ of the estimate of the velocity vector field.

Let $M_\theta^\sigma(\tilde{u}^\sigma, \tilde{v}^\sigma)(\Delta\tilde{u}^\sigma, \Delta\tilde{v}^\sigma), \theta \in [0,1]$ be a family of the linear and bounded with respect to the vector field $(\Delta\tilde{u}^\sigma, \Delta\tilde{v}^\sigma)$ operators, where for each $\theta \in [0,1]$ the operator $M_\theta^\sigma(\tilde{u}^\sigma, \tilde{v}^\sigma)(\Delta\tilde{u}^\sigma, \Delta\tilde{v}^\sigma)$ is the Jacobian of the nonlinear operator $F_\theta^\sigma(\tilde{u}^\sigma, \tilde{v}^\sigma, \hat{u}^\sigma, \hat{v}^\sigma)$, considered as the function of the vector field $(\hat{u}^\sigma, \hat{v}^\sigma)$, and depending on the vector field $(\tilde{u}^\sigma, \tilde{v}^\sigma)$ as on the parameter, under the conditions that the vector field $(\hat{u}^\sigma, \hat{v}^\sigma)$ is identically equal to the vector field $(\tilde{u}^\sigma, \tilde{v}^\sigma)$. Then the operator $M^\sigma(\tilde{u}^\sigma, \tilde{v}^\sigma)(\Delta\tilde{u}^\sigma, \Delta\tilde{v}^\sigma)$ is defined as the member of the family $M_\theta^\sigma(\tilde{u}^\sigma, \tilde{v}^\sigma)(\Delta\tilde{u}^\sigma, \Delta\tilde{v}^\sigma), \theta \in [0,1]$ satisfying the following requirements:

1. As a part of the globally convergent strategy, the vector field $(\Delta\tilde{u}^\sigma, \Delta\tilde{v}^\sigma)$ obtained as the solution of the system of linear equations (5-14) is required to be a descent direction for the functional $h(\tilde{u}^\sigma, \tilde{v}^\sigma, \hat{u}^\sigma, \hat{v}^\sigma)$, considered as the function of the vector field $(\hat{u}^\sigma, \hat{v}^\sigma)$, and depending on the vector field $(\tilde{u}^\sigma, \tilde{v}^\sigma)$ as on the parameter, under the conditions that the vector field $(\hat{u}^\sigma, \hat{v}^\sigma)$ be identically equal to the vector field $(\tilde{u}^\sigma, \tilde{v}^\sigma)$. In other words, the first-order partial with respect to the variable ω derivative of the functional $h(\tilde{u}^\sigma, \tilde{v}^\sigma, \tilde{u}^\sigma + \omega\Delta$ $\bar{u}^\sigma, \tilde{v}^\sigma + \omega \Delta \bar{v}^\sigma$) considered as the function of the scalar variable $\omega$ is required to be negative when the value of such variable $\omega$ is equal to 0. It is not difficult to see that the value of this derivative is equal to $$-F^\sigma(\bar{u}^\sigma, \tilde{v}^\sigma)^T M^\sigma(\bar{u}^\sigma, \tilde{v}^\sigma)^{-1} F^\sigma(\bar{u}^\sigma, \tilde{v}^\sigma). \quad (5\text{-}16)$$

the requirement for the functional (5-16) to be negative can be satisfied by in turn requiring the operator $M^\sigma(\bar{u}^\sigma, \tilde{v}^\sigma)(\Delta \bar{u}^\sigma, \Delta \bar{v}^\sigma)$ to be positive definite.

2. As a part of the fast local strategy, the operator $M^\sigma(\bar{u}^\sigma, \tilde{v}^\sigma)(\Delta \bar{u}^\sigma, \Delta \bar{v}^\sigma)$ is required to be the nearest possible approximation to the Jacobian $J^\sigma(\bar{u}^\sigma, \tilde{v}^\sigma)(\sigma \bar{u}^\sigma, \sigma \bar{v}^\sigma)$ of the nonlinear operator $F^\sigma(\bar{u}^\sigma, \tilde{v}^\sigma)$.

The operator $M_\theta{}^\sigma(\bar{u}^\sigma, \tilde{v}^\sigma)(\Delta \bar{u}^\sigma, \Delta \bar{v}^\sigma)$ from the family corresponding to the parameter value $\theta = 0.5$ satisfies the above requirements and is taken as the operator $M^\sigma(\bar{u}^\sigma, \tilde{v}^\sigma)(\Delta \bar{u}^\sigma, \Delta \bar{v}^\sigma)$ appearing in the system of linear equations (5-14). With this choice of the operator $M^\sigma(\bar{u}^\sigma, \tilde{v}^\sigma)(\Delta \bar{u}^\sigma, \Delta \bar{v}^\sigma)$ the system of linear equations (5-14) has the following explicit form $$\int_{G_t} \frac{r^2 \tilde{g}_t^\sigma (\tilde{g}_{tu}^\sigma \Delta \bar{u}^\sigma + \tilde{g}_{tv}^\sigma \Delta \bar{v}^\sigma) \, dg_t}{(r^2 + (p^2 + q^2 |\nabla \bar{u}^\sigma|^2)(\tilde{g}_t^\sigma)^2)^2} - \quad (5\text{-}17)$$

$$\int_S \left( s, \nabla \frac{a^2(s, \nabla(\Delta \bar{u}^\sigma))}{(a^2 + (c^2 + b^2(s, \nabla \tilde{g}_t^\sigma)^2)(s, \nabla \bar{u}^\sigma)^2)^2} \right) ds +$$

$$\gamma_u{}^\sigma \Delta \bar{u}^\sigma = \int_{G_t} \frac{-\tilde{g}_{tu}^\sigma \tilde{g}_t^\sigma dg_t}{r^2 + (p^2 + q^2 |\nabla \bar{u}^\sigma|^2)(\tilde{g}_t^\sigma)^2} +$$

$$\int_S \left( s, \nabla \frac{(s, \nabla \bar{u}^\sigma)}{a^2 + (c^2 + b^2(s, \nabla \tilde{g}_t^\sigma)^2)(s, \nabla \bar{u}^\sigma)^2} \right) ds -$$

$$\gamma_u{}^\sigma (\bar{u}^\sigma - \bar{u}^{\delta(\sigma)}),$$

$$\int\int_\Omega \int_{G_t} \frac{r^2 \tilde{g}_t^\sigma (\tilde{g}_{tu}^\sigma \Delta \bar{u}^\sigma + \tilde{g}_{tv}^\sigma \Delta \bar{v}^\sigma) dg_t dxdy}{r^2 + (p^2 + q^2 |\nabla \bar{u}^\sigma|^2)(\tilde{g}_t^\sigma)^2)^2} + \gamma_v{}^\sigma \Delta \bar{v}^\sigma =$$

$$\int\int_\Omega \int_{G_t} \frac{-\tilde{g}_{tv}^\sigma \tilde{g}_t^\sigma dg_t dxdy}{r^2 + (p^2 + q^2 |\nabla \bar{u}^\sigma|^2)(\tilde{g}_t^\sigma)^2} - \gamma_v{}^\sigma (\bar{v}^\sigma - \bar{v}^{\delta(\sigma)}),$$

Next, the finite-difference discretizations of the system of nonlinear equations (5-7) as well as the system of linear equations (5-17) are considered. The method of constructing the estimate of the solution of the system of nonlinear equations (5-7) is extended to the finite-difference discretization of this system.

Although the theoretical analysis for the computation of the estimate of the parametric velocity vector field can be effectively performed in the case when the combined generalized initial image functions $\Gamma_g$, $g \in G$ are defined over the entire set of testing functions $\Phi(R^3)$, while the estimate $(\bar{u}(x,y,t), \bar{v}(t))$ of the velocity vector $(u(x,y,t), v(t))$ is defined for every image point $(x,y) \in \Omega$ and for every viewpoint $t \in T$, the actual computation can only be accomplished on finite sets of the above data sets. In this section a fininte-difference discretization of the system of nonlinear equations (5-7) is described. The estimate of the parametric velocity vector field is then determined as a solution of the resulted system of a finite number of nonlinear equations.

Given a generalized function F defined on the locally convex linear topological space $\Phi(R^3)$, and given a testing function $\phi \in \Phi(R^3)$ the "convolution" of the generalized function F and the testing function $\phi$ is the infinitely differentiable function $(F*\phi)$ defined on the space $r^3$ by the relation $$(F*\Phi)(x,y,t) = F(\Phi_{x,y,t}), \Phi_{x,y,t}(\tilde{x},\tilde{y},\tilde{t}) = \Phi(x-\tilde{x}, y-\tilde{y}, t-\tilde{t}), (\tilde{x},\tilde{y},\tilde{t}) \in R^3, \quad (6\text{-}1)$$

for every $(x,y,t) \in R^3$.

Let F be a generalized function, and let $\chi \in \Phi(R^3)$ be a given fixed non-negative testing function such that $$\int\int_{R^3}\int \chi(x,y,t) dxdydt = 1.$$

For instance, take $$\chi(x,y,t) \equiv \psi(x,y,t) / \int\int_{R^3}\int \psi(\tilde{x},\tilde{y},\tilde{t}) d\tilde{x}d\tilde{y}d\tilde{t}, (x,y,t) \in R^3$$

where $\psi$ is the function described later. The testing function $\chi$ will be called the "sampling function". Then the "regularization" of the generalized function F through the sampling function $\chi$ is defined on the space $R^3$ as the infinitely differentiable function $(F*\chi)$, which is obtained as the convolution of the generalized function F and the sampling function $\chi$.

Let $\{t'_k\}_{k=0}^{k^*}$ be an increasing sequence of viewpoints containing the sequence of viewpoints $\{t''_k\}_{k=0}^{k^*}$. Assume that for every $t \in \{t'_k\}_{k=0}^{k^*}$ the regularizations $\gamma_\xi \equiv (\Gamma_\xi * \chi)$ of the generalized functions $\Gamma_\xi$ associated with the irradiance image functions $\xi$, $\xi \in \Xi$ through the sampling function $\chi$ and the regularizations $\gamma \equiv (\Gamma * \chi)$ of the generalized functions $\Gamma \eta$ associated with the feature image functions $\eta$, $\eta \in H$ through the sampling function $\chi$ are given at the points $(x,y)$ belonging to the following subset of the image plane:

$$R^2(h'_{\sigma,1}, h'_{\sigma,2}) = \{(x',y') | (x',y') = i_1 h'_{\sigma,1} + i_2 h'_{\sigma,2}, i_1, i_2 \in Z\}. \quad (6\text{-}2)$$

Here Z is the set of integers; $h'_{\sigma,1}, h'_{\sigma,2}$ are two-dimensional real vectors; and $i_1 h'_{\sigma,1} + i_2 h'_{\sigma,2}$ is a linear combination of such vectors with integer coefficients $i_1, i_2$. The points from the set $R^2(h'_{\sigma,1}, h'_{\sigma,2})$ will be called the "sampling points" corresponding to the parameter $\sigma$; the functions $\gamma_\xi$, $\xi \in \Xi$ will be called the "sampled irradiance image functions"; and the functions $\gamma_\eta$, $\eta \in H$ will be called the "sampled feature image functions".

The generalized functions $\Gamma_{\xi,\sigma}$ associated with the sampled irradiance image functions $\gamma_\xi$, $\xi \in \Xi$ and the generalized functions $\Gamma_{\eta,\sigma}$ associated with the sampled feature image functions $\gamma_\eta$, $\eta \in H$ are defined on the set of testing functions $\Phi(R^3)$ as follows. The value of the generalized function $\Gamma_{\xi,\sigma}$ associated with the sampled irradiance image function $\gamma_\xi$ at the testing function $\phi \in \Phi(R^3)$ is given by the relation $$\Gamma_{\xi,\sigma}(\phi) = \sum\sum\sum_{(x,y,t) \in R^2(h'_{\sigma,1}, h'_{\sigma,2}) \times \{t_k\}_{k=0}^{k^*}} \gamma_\xi(x,y,t) \phi(x,y,t). \quad (6\text{-}3)$$

The value of the generalized function $\Gamma_{\eta,\sigma}$ associated with the sampled feature image function $\gamma_{86}$ at the testing function $\phi \in \Phi(R^3)$ is given by the relation $$\Gamma_{\eta,\sigma}(\phi) = \underset{(x,y,t)\in R^2}{\Sigma \Sigma \Sigma} \gamma_\eta(x,y,t)\phi(x,y,t) (h'_{\sigma,1},h'_{\sigma,2}) \times (t_k)_{k=0}^{r}. \quad (6\text{-}4)$$

Let $\lambda \equiv \{\lambda_\xi, \lambda | \xi \in \Xi, \eta \in H\}$ be a set of real-valued constants; leg $g(\lambda)$ be an index attached to the set $\lambda$; and let $m_{g(\lambda)} \equiv \{m_{\xi,x}, m_{\xi,y}, m_{\xi,t}, m_{\eta,x}, m_{\eta,y}, m_{\eta,t} | \xi \in \Xi, \eta \in H\}$ be a set of non-negative integer constants corresponding to the set of constants $\lambda$. Then the "combined generalized sampled image function" corresponding to the index $g \equiv g(\lambda)$ is the generalized function $\Gamma_{g,\sigma}$ defined on the locally convex linear topological space $\Phi(R^3)$. The value of the combined generalized sampled image function $\Gamma_{g,\sigma}$ at the testing function $\phi \in \Phi(R^3)$ is given by the relation $$\Gamma_{g,\sigma}(\phi) = \sum_{\xi \in \Xi} \lambda_\xi \frac{\partial^{m_{\xi,x}+m_{\xi,y}+m_{\xi,t}}}{\partial x^{m_{\xi,x}} \partial y^{m_{\xi,y}} \partial t^{m_{\xi,t}}} \Gamma_{\xi,\sigma}(\phi) + \quad (6\text{-}5)$$

$$\sum_{\eta \in \Xi} \lambda_\eta \frac{\partial^{m_{\eta,x}+m_{\eta,y}+m_{\eta,t}}}{\partial x^{m_{\eta,x}} \partial y^{m_{\eta,y}} \partial t^{m_{\eta,t}}} \Gamma_{\eta,\sigma}(\phi)$$

and is called the "observation" of the combined generalized sampled image function $\Gamma_{g,\lambda}$ on the testing function $\phi$.

Assume the restriction to the case when each set $R^2(h'_{\sigma,1}, h'_{\sigma,2}), \sigma = \sigma_0, \sigma_1, \ldots, \sigma_n$ is a square grid of points on the image plane. In other words, it is a requirement that the vectors $h'_{\sigma,1}, h'_{\sigma,2}$ are of equal length and are orthogonal to each other for every $\sigma = \sigma_0, \sigma_1, \ldots, \sigma_n$. Also, it is a requirement that such grids of points constitute a pyramid on the image plane which means that the following relation is satisfied:

$$R^2(h'_{\sigma_0,1}, h'_{\sigma_0,2}) \subset \ldots \subset R^2(h'_{\sigma_n,1}, h'_{\sigma_n,2}). \quad (6\text{-}6)$$

The "grid rotation method" is the sampling method that complies with the above requirements. It is commonly used to obtain numerical solutions of partial differential equations. In this method the vectors $h'_{\sigma_0,1}, h'_{\sigma_0,2}$ are selected to be of equal length and orthogonal to each other; then for every $k=1, \ldots, n$ the vectors $h_{\sigma_k,1}, h_{\sigma_k,2}$ are defined as in the relations $$h'_{\sigma_k,1} = 0.5(h'_{\sigma_{k-1},1} + h'_{\sigma_{k-1},2}), \quad (6\text{-}7)$$

$$h'_{\sigma_k,2} = 0.5(h'_{\sigma_{k-1},1} - h'_{\sigma_{k-1},2}). \quad (6\text{-}8)$$

It is not difficult to see that the above defined vectors $h_{\sigma_k,1}, h_{\sigma_k,2}$ are of equal length and are orthogonal to each other for every $k=0,1,\ldots,n$, and that the relation (6-6) is satisfied.

Let $k'$ be a positive integer constant and $\psi \in \Phi(R^3)$ be a given measurement function. Then for every viewpoint $t \in \{t''_k\}_{k=0}^{k'}$, and for every parameter value $\sigma = \sigma_0, \sigma_1, \ldots, \sigma_n$ the image function $g^\sigma(x,y,t)$ and its spatial partial derivatives $g_x^\sigma(x,y,t), g_y^\sigma(x,y,t)$ are defined on the set $\Omega$ as follows:

First, assume that the image point $(x,y)$ belongs to the subset $\Omega''(h''_{\sigma,1}, h''_{\sigma,2}) \cap R^2(h''_{\sigma,1}, h''_{\sigma,2})$. Here the two-dimensional real vectors $h''_{\sigma,1}, h''_{\sigma,2}$ are defined as in the relations $$h''_{\sigma,1} = k'h'_{\sigma,1}, \quad (6\text{-}9)$$

$$h''_{\sigma,2} = k'h'_{\sigma,2}, \quad (6\text{-}10)$$

while the set $\Omega''(h''_{\sigma,1}, h''_{\sigma,2}) \subset R^2$ is defined as in the relation $$\Omega''(h''_{\sigma,1}, h''_{\sigma,2}) = \quad (6\text{-}11)$$

$$\underset{\substack{-1.0 \leq \theta_1 \leq +1.0 \\ -1.0 \leq \theta_2 \leq +1.0}}{\cup} \{(x,y) + \theta_1 h''_{\sigma,1} + \theta_2 h''_{\sigma,2} | (x,y) \in \Omega\}.$$

Then for every $g \in G$ the value of the component $g^\sigma(x,y,t)$ of the image function $g^\sigma(x,y,t)$ is determined as the observation $\Gamma_{g,\sigma}(\psi_{x,y,t}^\sigma)$ of the combined generalized sampled image function $\Gamma_{g,\sigma}$ on the testing function $\psi_{x,y,t}^\sigma$ defined by the relation (2-4); and the values of the components $g_x^\sigma(x,y,t), g_y^\sigma(x,y,t)$ of the partial derivatives $g_x^\sigma(x,y,t), g_y^\sigma(x,y,t)$ of the image function $g^\sigma(x,y,t)$ are given as the observations $$\Gamma_{g,\sigma}\left(-\frac{\partial}{\partial x} \psi_{x,y,t}^\sigma\right), \Gamma_{g,\sigma}\left(-\frac{\partial}{\partial y} \psi_{x,y,t}^\sigma\right)$$

of the combined generalized sampled image function $\Gamma_{g,\sigma}$ on the defined by the relations (2-5), (2-6) testing functions $$-\frac{\partial}{\partial x} \psi_{x,y,t}^\sigma, -\frac{\partial}{\partial y} \psi_{x,y,t}^\sigma \in \Phi(R^3).$$

Let $(x,y)$ be any image point from the set $\Omega$, then for some integer numbers $i_1, i_2$ and for some real numbers $\theta_1, \theta_2$ from the interval $[0,1]$ the following relation is satisfied:

$$(x,y) = (i_1+\theta_1)h''_{\sigma,1} + (i_2+\theta_2)h''_{\sigma,2}. \quad (6\text{-}12)$$

Then the values of the image function $g^\sigma(x,y,t)$ and its partial derivatives $g_x^\sigma(x,y,t), g_y^\sigma(x,y,t)$ are obtained through the bilinear interpolations $$g^\sigma(x,y,t) = (1-\theta_2)((1-\theta_1)g^\sigma(x_{1,1},y_{1,1},t) + \theta_1 g^\sigma(x_{1,2},y_{1,2},t)) + \theta_2((1-\theta_1)g^\sigma(x_{2,1},y_{2,1},t) + \theta_1 g^\sigma(x_{2,2},y_{2,2},t)), \quad (6\text{-}13)$$

$$g_x^\sigma(x,y,t) = (1-\theta_2)((1-\theta_1)g_x^\sigma(x_{1,1},y_{1,1},t) + \theta_1 g_x^\sigma(x_{1,2},y_{1,2},t)) + \theta_2((1-\theta_1)g_x^\sigma(x_{2,1},y_{2,1},t) + \theta_1 g_x^\sigma(x_{2,2},y_{2,2},t)), \quad (6\text{-}14)$$

$$g_y^\sigma(x,y,t) = (1-\theta_2)((1-\theta_1)g_y^\sigma(x_{1,1},y_{1,1},t) + \theta_1 g_y^\sigma(x_{1,2},y_{1,2},t)) + \theta_2((1-\theta_1)g_y^\sigma(x_{2,1},y_{2,1},t) + \theta_1 g_y^\sigma(x_{2,2},y_{2,2},t)), \quad (6\text{-}15)$$

of the values of the image function $g^\sigma(x,y,t)$ and, respectively, its partial derivatives $g_x^\sigma(x,y,t), g_y^\sigma(x,y,t)$ at the points from the set $\Omega''(h''_{\sigma,1}, h''_{\sigma,2}) \cap R^2(h''_{\sigma,1}, h''_{\sigma,2})$ given as in the relations $$(x_{1,1},y_{1,1}) = i_1 h''_{\sigma,1} + i_2 h''_{\sigma,2}, \quad (6\text{-}16)$$

$$(x_{1,2},y_{1,2}) = (i_1+1)h''_{\sigma,1} + i_2 h''_{\sigma,2}, \quad (6\text{-}17)$$

$$(x_{2,1},y_{2,1}) = i_1 h''_{\sigma,1} + (i_2+1)h''_{\sigma,2}, \quad (6\text{-}18)$$

$$(x_{2,2},y_{2,2}) = (i_1+1)h''_{\sigma,1} + (i_2+1)h''_{\sigma,2}, \quad (6\text{-}19)$$

Let $k''$ be a positive integer constant, and let $h_{\sigma,1}, h_{\sigma,2}$ be two-dimensional real vectors defined as in the relations $$h_{\sigma,1} = k''h''_{\sigma,1}, \quad (6\text{-}20)$$

$$h_{\sigma,2} = k''h''_{\sigma,2}, \quad (6\text{-}21)$$

while the set $\Omega(h_{\sigma,1}, h_{\sigma,2}) = \subset \Omega$ be defined in the relation $\Omega(h_{\sigma,1}, h_{\sigma,2}) \Omega \cap R^2(h_{\sigma,1}, h\sigma, 2)$. (6-22)

The finite-difference discretizations of the system of nonlinear equations (5-7) and of the system of linear equations (5-17), both corresponding to the parameter value $\sigma = \sigma_0, \sigma_1, \ldots, \sigma_n$, are defined on the set $\Omega(h_{\sigma,1}, h_{\sigma,2})$ as, respectively, the system of nonlinear equations relative to the unknown estimate of the velocity vector field $\{(\tilde{u}^\sigma(x,y,t), \tilde{v}^\sigma(t))|(x,y)\in\Omega(h_{\sigma,1}, h_{\sigma,2})\}$ corresponding to the parameter value $\sigma$ and its finite differences, and the system of linear equations relative to the unknown vector field $\{(\Delta \tilde{u}^\sigma(x,y,t), \Delta \tilde{v}^\sigma(t))|(x,y)\in\Omega(h_{\sigma,1}, h_{\sigma,2})\}$ corresponding to the parameter value $\sigma$ and its finite differences as follows.

The expressions appearing under the integral signs over the set S in the system of nonlinear equations (5-7) and in the system of linear equations (5-17) have the general form $$(s, \nabla f(x,y,t,s)), \quad (6\text{-}23)$$

$f(x,y,t,s)$ is a function of the variables $(x,y)\in\Omega, t\in T, s\in S$, which is continuously differentiable with respect to the variables $(x,y)\in\Omega$ for every fixed value of the variables $t\in T, s\in S$.

The unit circle making up the set S is replaced by a finite set, denoted by the same symbol S, of the set $R^2(h_{\sigma,1}, h_{\sigma,2})$ having the following properties: the set S does not contain the origin, and for every element S belonging to the set S the element $-s$ also belongs to the set S. The measure ds is replaced with the point measure associating the value 0.5 to every element $s\in S$.

As a consequence of the above actions an integral over the set S of values of any expression of the form (6-23) becomes a finite sum over the set S of the values of that expression; in other words, the following relation is satisfied:

$$\int_S (s, \nabla f(x,y,t,s))ds = \sum_{s\in S} 0.5(s, \nabla f(x,y,t,s)). \quad (6\text{-}24)$$

Given a function $f(x,y,t,s)$ that is continuously differentiable with respect to the variables $(x,y)\in\Omega$ for every $t\in T$, $s\in S$, and given an element $s\in S$, the expression (6-23) is defined on the set $R^2(h_{\sigma,1}, h_{\sigma,2})$ in terms of the finite-difference approximations to the partial derivatives as $$(s, \nabla f(x,y,t,s)) = \rho_s(f(x+0.5s_x, y+0.5s_y, t, s) - f(x-0.5s_x, y-0.5s_y, t, s)), \quad (6\text{-}25)$$

$\rho_s$ is a real positive constant depending on the length of the vector s as a parameter, and the values $s_x, s_y$ are the components of the vector $s \equiv (s_x, s_y)$.

Taking into account the relation (6-25) and the fact that the set S has the property that for every element $s\in S$ the element $-s\in S$, then, in the case when $f(x,y,t,s)$ is an odd function with respect to the variable s, the sum appearing in eh relation (6-24) can be expressed as $$\sum_{s\in S} 0.5(s, \nabla f(x,y,t,s)) = \sum_{s\in S} \rho_s f(x+0.5s_x, y+0.5s_y, t, s). \quad (6\text{-}26)$$

It is assumed that the set $G_t$ is finite and that $dg_t$ is the point measure associating the value $\rho(g_t)$ to the element $g_t\in G_t$. Here $\rho(g_t)$ is a real positive constant for every $g_t\in G_t$.

Based on the above discussion, the system of nonlinear equations (5-7) can be defined on the set $R^2(h_{\sigma,1}, h_{\sigma,2})$ as $$\sum_{g_t\in G_t} \frac{\rho(g_t) \tilde{g}_{\tilde{u}}^\sigma \tilde{g}_t^\sigma}{r^2 + (p^2 + q^2|\nabla \tilde{u}^\sigma|^2)(\tilde{g}_t^\sigma)^2} - \quad (6\text{-}27)$$

$$\sum_{s\in S} \frac{\rho_s(s, \nabla \tilde{u}^\sigma)}{a^2 + (c^2 + b^2(s, \nabla \tilde{g}_t^\sigma)^2)(s, \nabla \tilde{u}^\sigma)^2} + \gamma_u^\sigma(\tilde{u}^\sigma - \tilde{u}^{\delta(\sigma)}) = 0,$$

$$\sum_{(x,y,g_t)\in\Omega\times G_t} \frac{\rho(g_t) \tilde{g}_{\tilde{v}}^\sigma \tilde{g}_t^\sigma}{r^2 + (p^2 + q^2|\nabla \tilde{u}^\sigma|^2)(\tilde{g}_t^\sigma)^2} + \gamma_v^\sigma(\tilde{v}^\sigma - \tilde{v}^{\delta(\sigma)}) = 0,$$

while the system of linear equations (5-17) can be defined on the set $R^2(h_{\sigma,1}, h_{\sigma,2})$ as $$\sum_{g_t\in G_t} \frac{\rho(g_t) r^2 \tilde{g}_t^\sigma(\tilde{g}_{\tilde{u}}^\sigma \Delta \tilde{u}^\sigma + \tilde{g}_{\tilde{v}}^\sigma \Delta \tilde{v}^\sigma)}{(r^2 + (p^2 + q^2|\nabla \tilde{u}^\sigma|^2)(\tilde{g}_t^\sigma)^2)^2} - \quad (6\text{-}28)$$

$$\sum_{s\in S} \frac{\rho_s a^2(s, \nabla(\Delta \tilde{u}^\sigma))}{(a^2 + (c^2 + b^2(s, \nabla \tilde{g}_t^\sigma)^2)(s, \nabla \tilde{u}^\sigma)^2)^2} + \gamma_u^\sigma \Delta \tilde{u}^\sigma =$$

$$\sum_{g_t\in G_t} \frac{-\rho(g_t) \tilde{g}_{\tilde{u}}^\sigma \tilde{g}_t^\sigma}{r^2 + (p^2 + q^2|\nabla \tilde{u}^\sigma|^2)(\tilde{g}_t^\sigma)^2} +$$

$$\sum_{s\in S} \frac{\rho_s(s, \nabla \tilde{u}^\sigma)}{a^2 + (c^2 + b^2(s, \nabla \tilde{g}_t^\sigma)^2)(s, \nabla \tilde{u}^\sigma)^2} - \gamma_u^\sigma(\tilde{u}^\sigma - \tilde{u}^{\delta(\sigma)}),$$

$$\sum_{(x,y,g_t)\in\Omega\times G_t} \frac{\rho(g_t) r^2 \tilde{g}_t^\sigma(\tilde{g}_{\tilde{u}}^\sigma \Delta \tilde{u}^\sigma + \tilde{g}_{\tilde{v}}^\sigma \Delta \tilde{v}^\sigma)}{(r^2 + (p^2 + q^2|\nabla \tilde{u}^\sigma|^2)(\tilde{g}_t^\sigma)^2)^2} + \gamma_v^\sigma \Delta \tilde{v}^\sigma =$$

$$\sum_{(x,y,g_t)\in\Omega\times G_t} \frac{-\rho(g_t) \tilde{g}_{\tilde{v}}^\sigma \tilde{g}_t^\sigma}{r^2 + (p^2 + q^2|\nabla \tilde{u}^\sigma|^2)(\tilde{g}_t^\sigma)^2} - \gamma_v^\sigma(\tilde{v}^\sigma - \tilde{v}^{\delta(\sigma)}).$$

The arguments of the functions appearing in the relations (6-27), (6-28) have been omitted for the sake of simplicity of notation. The functions appearing under the summation over the set S sign are evaluated at the points $(x+0.5s_x, y+0.5s_y, t)$, while the rest of the functions are evaluated at the points $(x,y,t)$ for every $(x,y)\in R^2(h_{\sigma,1}, h_{\sigma,2}), t\in T, s\equiv(s_x, s_y)\in S$. The functions $\tilde{g}_t^\sigma, \tilde{g}_{\tilde{u}}^\sigma, \tilde{g}_{\tilde{v}}^\sigma$ are defined, respectively, by the relations $$\tilde{g}_t^\sigma \equiv g_t^\sigma(x,y,t,\tilde{u}^\sigma, \tilde{v}^\sigma) = (g^\sigma(x + \Delta t^+ \tilde{u}^\sigma(x,y,t), y + \Delta t^+ \tilde{v}^\sigma(t), \quad (6\text{-}29)$$

$$t + \Delta t^+) - g^\sigma(x - \Delta t^- \tilde{u}^\sigma(x,y,t), y - \Delta t^- \tilde{v}^\sigma(t), t - \Delta t^-))/(\Delta t^- + \Delta t^+),$$

$$\tilde{g}_{\tilde{u}}^\sigma \equiv g_{\tilde{u}}^\sigma(x,y,t,\tilde{u}^\sigma,\tilde{v}^\sigma) = \quad (6\text{-}30)$$

$$(\Delta t^+ g_x^\sigma(x + \Delta t^+ \tilde{u}^\sigma(x,y,t), y + \Delta t^+ \tilde{v}^\sigma(t), t + \Delta t^+) +$$

$$\Delta t^- g_x^\sigma(x - \Delta t^- \tilde{u}^\sigma(x,y,t), y - \Delta t^- \tilde{v}^\sigma(t), t - \Delta t^-))/(\Delta t^- + \Delta t^+).$$

$$\tilde{g}_{\tilde{v}}^\sigma \equiv g_{\tilde{v}}^\sigma(x,y,t,\tilde{u}^\sigma,\tilde{v}^\sigma) = \quad (6\text{-}31)$$

$$(\Delta t^+ g_y^\sigma(x + \Delta t^+ \tilde{u}^\sigma(x,y,t), y + \Delta t^+ \tilde{v}^\sigma(t), t + \Delta t^+) +$$

$$\Delta t^- g_y^\sigma(x - \Delta t^- \tilde{u}^\sigma(x,y,t), y - \Delta t^- \tilde{v}^\sigma(t), t - \Delta t^-))/(\Delta t^- + \Delta t^+).$$

The function $|\nabla \tilde{u}|^2$ is defined as in the relation $$|\nabla \tilde{u}^\sigma|^2 \equiv |\nabla \tilde{u}^\sigma(x,y,t)|^2 = \sum_{s\in S} \rho_s(\tilde{u}^\sigma(x+s_x, y+s_y, t) - \tilde{u}^\sigma(x,y,t))^2 \quad (6\text{-}32)$$

The function $(s, \nabla \tilde{u}^\sigma)$ is defined by the relations $$(s, \nabla \tilde{u}^\sigma) \equiv (s, \nabla \tilde{u}^\sigma(x+0.5s_x, y+0.5s_y, t)) = \rho_s(\tilde{u}^\sigma(x+s_x, y+s_y, t) - \tilde{u}^\sigma(x,y,t)), \quad (6\text{-}33)$$

while the function $(s, \nabla(\Delta \tilde{u}^\sigma))$ is defined as in the relations $$(s, \nabla(\Delta \tilde{u}^\sigma)) \equiv (s, \nabla(\Delta \tilde{u}^\sigma(x+0.5s_x, y+0.5s_y, t))) = \rho_s(\Delta \tilde{u}^\sigma(x+s_x, y+s_y, t) - \Delta$$

$\tilde{u}^\sigma(x,y,t)),$ (6-34)

The function $b^2(s,\nabla'\tilde{g}_t^\sigma)^2$ is defined by the relation $$b^2(s,\nabla'\tilde{g}_t^\sigma)^2 = \sum_{g_t \in G_t} \rho(g_t) b_{g_t}^2(s,\nabla'\tilde{g}_t^\sigma)^2, \quad (6\text{-}35)$$

where each function $(s,\nabla'\tilde{g}_t^\sigma)^2, g_t \in G_t$ is determined as $$(s,\nabla'\tilde{g}_t^\sigma)^2 \equiv (s,\nabla'\tilde{g}_t^\sigma(x+0.5s_x,y+0.5s_y,t,$$
$$\tilde{u}^\sigma,\tilde{v}^\sigma))^2 = (s,\nabla'g_t^\sigma(x,y,t,\tilde{u}^\sigma,\tilde{v}^\sigma))^2 + (s,\nabla'g_t^\sigma,$$
$$(x+s_x,y+s_y,t,\tilde{u}^\sigma,\tilde{v}^\sigma))^2. \quad (6\text{-}36)$$

Above, for each value (x',y',t) (equal either to (x,y,t) or to $(x+s_x,y+s_y,t)$) the value of the function $(s,\nabla'g_t^\sigma(x',y',t,\tilde{u}^\sigma,\tilde{v}^\sigma))^2$ is given by the relation (4-8).

The restriction of the system of nonlinear equations (6-27) and the restriction of the system of linear equations (6-28) on the set $\Omega(h_{\sigma,1},h_{94,2})$ of the set $R^2(h_{\sigma,1},h_{\sigma,2})$ are both accomplished through introduction of the boundary condition as follows. For every image point $(x,y) \in \Omega(h_{\sigma,1},h_{\sigma,2})$ and for every element $s \equiv (s_x,s_y) \in S$ such that the point $(x+s_x,y+s_y)$ is outside of the set $\Omega(h_{\sigma,1},h_{\sigma,2})$ the value of the estimate of the velocity vector $(\tilde{u}^\sigma(x+s_x,y+s_y,t),\tilde{v}^\sigma(t))$ is defined to be identically equal to the value of the estimate of the velocity vector $(\tilde{u}^\sigma(x,y,t),\tilde{v}^\sigma(t))$. Under these conditions the system of nonlinear equations (6-27) and the system of linear equations (6-28) are well defined for every image point (x,y) from the set $\Omega(h_{\sigma,1},h_{\sigma,2})$ and, therefore, form, respectively, the system of nonlinear equations relative to the unknown estimate of the velocity vector field $\{(\tilde{u}^\sigma(x,y,t),\tilde{v}^\sigma(t))|(x,y) \in \Omega(h_{\sigma,1},h_{\sigma,2})\}$ corresponding to the parameter value σ and its finite differences, and the system of linear equations relative to the unknown vector field $\{(\Delta \tilde{u}^\sigma(x,y,t),\Delta \tilde{v}^\sigma(t))|(x,y) \in \Omega(h_{\sigma,1},h_{\sigma,2})\}$ corresponding to the parameter value σ and its finite differences.

Let us denote by the symbol |S| the number of elements of the set S, then for every $s \equiv (s_x,s_y) \in S$ the constant $\rho_s$ can be defined as in the relation $$\rho_s = \sqrt{(s_x^2 + s_y^2)/|S|}. \quad (6\text{-}37)$$

The following are two commonly used ways of selecting the set S $$S \equiv \{h_{\sigma,1},-h_{\sigma,1},h_{\sigma,2},-h_{\sigma,2}\}, \quad (6\text{-}38)$$

$$S \equiv \{h_{\sigma,1},-h_{\sigma,1},h_{\sigma,2},-h_{\sigma,2},h_{\sigma,1}+h_{\sigma,2},-h_{\sigma,1}-h_{\sigma,2},h_{\sigma,1}$$
$$-h_{\sigma,2},-h_{\sigma,1}+h_{\sigma,2}\} \quad (6\text{-}39)$$

If the set S is selected as in the relation (6-38) we say that the "five-points finite-difference discretization" is used, while for the selection specified by the relation (6-39) we say that the "none-points finite-difference discretization" is used.

Let $k=0, \ldots, n-1$ and let $\{(\tilde{u}^{\sigma_k}(x,y,t), \tilde{v}^{\sigma_k}(t))|(x,y) \in \Omega(h_{\sigma_k,1},h_{\sigma_k,2})\}$ be an estimate of the velocity vector field corresponding to the parameter value $\sigma_k$. Then the initial estimate $\{(\tilde{u}^{\sigma_{k+1}}(x,y,t), \tilde{v}^{\sigma_{k+1}}(t))|(x,y) \in \Omega(h_{\sigma_{k+1},1},h_{\sigma_{k+1},2})\}$ of the velocity vector field corresponding to the parameter value $\sigma_{k+1}$ is defined as follows. For every $(x,y) \in \Omega(h_{\sigma_{k+1},1},h_{\sigma_{k+1},2})$ such that $(x,y) \in \Omega(h_{\sigma_k,1},h_{\sigma_k,2})$ the value of the estimate $(\tilde{u}^{\sigma_{k+1}}(x,y,t),\tilde{v}^{\sigma_{k+1}}(t))$ is given by the relation $$(\tilde{u}^{\sigma_{k+1}}(x,y,t),\tilde{v}^{\sigma_{k+1}}(t)) = (\tilde{u}^{\sigma_k}(x,y,t),\tilde{v}^{\sigma_k}(t)) \quad (6\text{-}40)$$

while for every $(x,y) \in \Omega(h_{\sigma_{k+1},1},h_{\sigma_{k+1},2})$ such that $(x,y) \notin \Omega(h_{\sigma_k,1},h_{\sigma_k,2})$ the value of the estimate $(\tilde{u}^{\sigma_{k+1}}(x,y,t),\tilde{v}^{\sigma_{k+1}}(t))$ is given as in the relation $$(\tilde{u}^{\sigma_{k+1}}(x,y,t),\tilde{v}^{\sigma_{k+1}}(t)) = \sum_{i_1,i_2=1,+1} 0.25(\tilde{u}^{\sigma_k}(x_{i_1,i_2},y_{i_1,i_2},t),\tilde{v}^{\sigma_k}(t)), \quad (6\text{-}41)$$

where $$(x_{i_1,i_2},y_{i_1,i_2}) = (x,y) + i_1 h_{\sigma_{k+1},1} + i_2 h_{\sigma_{k+1},2}. \quad (6\text{-}42)$$

The system of linear equations (6-28) is symmetric and positive definite. As shown below, the system of linear equations (6-28) can be partitioned into two systems, one of which can be directly inverted. Based on these properties a fast preconditioned iterative method is constructed. If we introduce an ordering on the set $\Omega(h_{\sigma,1},h_{\sigma,2})$, then the system of linear equations (6-28) can be expressed in the matrix notation as $$M^\sigma(\tilde{u}^\sigma,\tilde{v}^\sigma)(\Delta \tilde{u}^\sigma,\Delta \tilde{v}^\sigma)^T = -F^\sigma(\tilde{u}^\sigma,\tilde{v}^\sigma), \quad (7\text{-}1)$$

where $(\Delta \tilde{u}^\sigma,\Delta \tilde{v}^\sigma)^T$ is the transpose vector of the row-vector $(\Delta \tilde{u}^\sigma,\Delta \tilde{v}^\sigma)$, corresponding to the vector field $\{(\tilde{u}^\sigma(x,y,t),\Delta \tilde{v}^\sigma(t))|(x,y) \in \Omega(h_{\sigma,1},h_{\sigma,2})\}$, which is obtained by first listing the elements of the set $\{(\tilde{u}^\sigma(x,y,t)|(x,y) \in \Omega(h_{\sigma,1},h_{\sigma,2})\}$ according to the specified ordering, then listing the elements $\Delta \tilde{v}^\sigma(t)$. The "natural ordering" on the set $\Omega(h_{\sigma,1},h_{\sigma,2})$ can be defined as follows. The relations (6-2) and (6-22) imply that every element $(x,y) \in \Omega(h_{\sigma,1},h_{\sigma,2})$ can be uniquely represented in the form $(x,y) \equiv i_1 h_{\sigma,1} + i_2 h_{\sigma,2}$ where $i_1$, and $i_2$ are integer numbers. Then the element $(x,y) \equiv i_1 h_{\sigma,1} + i_2 h_{\sigma,2} \in \Omega(h_{\sigma,1},h_{\sigma,2})$ follows the element $(x',y') \equiv i'_1 h_{\sigma,1} + i'_2 h_{\sigma,2} \in \Omega(h_{\sigma,1},h_{\sigma,2})$ if $i_2 > i'_2$ or if $i_2 = i'_2$ and $i_1 > i'_1$.

Let the matrix $D^\sigma(\tilde{u}^\sigma,\tilde{v}^\sigma)$ be the diagonal part of the matrix $M^\sigma(\tilde{u}^\sigma,\tilde{v}^\sigma)$, while the matrix $-B^\sigma(\tilde{u}^\sigma,\tilde{v}^\sigma)$ is the off-diagonal part of the matrix $M^\sigma(\tilde{u}^\sigma,\tilde{v}^\sigma)$, so that the relation $$M^\sigma(\tilde{u}^\sigma,\tilde{v}^\sigma) = D^\sigma(\tilde{u}^\sigma,\tilde{v}^\sigma) - B^\sigma(\tilde{u}^\sigma,\tilde{v}^\sigma) \quad (7\text{-}2)$$

is satisfied, then the system of linear equations (6-28) takes the form $$(D^\sigma(\tilde{u}^\sigma,\tilde{v}^\sigma) - B^\sigma(\tilde{u}^\sigma,\tilde{v}^\sigma))(\Delta \tilde{u}^\sigma,\Delta \tilde{v}^\sigma)^T = -F^\sigma(\tilde{u}^\sigma,\tilde{v}^\sigma). \quad (7\text{-}3)$$

Let $c^\sigma(\tilde{u}^\sigma,\tilde{v}^\sigma)$ be a diagonal matrix defined by the relations $$C^\sigma(\tilde{u}^\sigma,\tilde{v}^\sigma) = D^\sigma(\tilde{u}^\sigma,\tilde{v}^\sigma)^{1/2}, \quad (7\text{-}4)$$

$$C^\sigma(\tilde{u}^\sigma,\tilde{v}^\sigma)^T C^\sigma(\tilde{u}^\sigma,\tilde{v}^\sigma) = D^\sigma(\tilde{u}^\sigma,\tilde{v}^\sigma). \quad (7\text{-}5)$$

Let $(\Delta \bar{u}^\sigma,\Delta \bar{v}^\sigma)$ be a vector defined by the relation $$(\Delta \bar{u}^\sigma,\Delta \bar{v}^\sigma)^T = C^\sigma(\tilde{u}^\sigma,\tilde{v}^\sigma)(\Delta \tilde{u}^\sigma,\Delta \tilde{v}^\sigma)^T. \quad (7\text{-}6)$$

If both sides of the system of linear equations (7-3) of the unknown vector $(\Delta \tilde{u}^\sigma,\Delta \tilde{v}^\sigma)$ are multiplied on the matrix $C^\sigma(\tilde{u}^\sigma,\tilde{v}^\sigma)^{-T}$ from the left and if the unknown vector $(\Delta \tilde{u}^\sigma,\tilde{v}^\sigma)$ is stituted with the unknown vector $(\Delta \bar{u}^\sigma,\bar{v}^\sigma)$ the system of linear equations (7-3) becomes the following system of linear equations relative to the unknown vector $(\Delta \bar{u}^\sigma,\bar{v}^\sigma)$:

$$(\Delta \bar{u}^\sigma,\Delta \bar{v}^\sigma)^T = C^\sigma(\tilde{u}^\sigma,\tilde{v}^\sigma)^{-T} B^\sigma(\tilde{u}^\sigma,\tilde{v}^\sigma) C^\sigma(\tilde{u}^\sigma,\tilde{v}^\sigma)^{-1} (\Delta \bar{u}^\sigma,\Delta \bar{v}^\sigma)^T - C^\sigma$$

$$(\tilde{u}^\sigma, \tilde{v}^\sigma)^{-T} F^\sigma(\tilde{u}^\sigma, \tilde{v}^\sigma). \tag{7-7}$$

Let $G^\sigma(\tilde{u}^\sigma, \tilde{v}^\sigma)$ be a matrix defined as in the relation $$G^\sigma(\tilde{u}^\sigma, \tilde{v}hu\ \sigma) = C^\sigma(\tilde{u}^\sigma, \tilde{v}^\sigma)^{-T} B^\sigma(\tilde{u}^\sigma, \tilde{v}^\sigma) C^\sigma(\tilde{u}^\sigma, \tilde{v}^\sigma)^{-1}, \tag{7-8}$$

while $h^\sigma(\tilde{u}^\sigma, \tilde{v}^\sigma)$ is a vector given by the relation $$h^\sigma(\tilde{u}^\sigma, \tilde{v}^\sigma) = C^\sigma(\tilde{u}^\sigma, \tilde{v}^\sigma)^{-T} F^\sigma(\tilde{u}^\sigma, \tilde{v}^\sigma); \tag{7-9}$$

then the following basic iterative method can be used to obtain an approximation to the solution of the system of linear equations (6-28).

The initial approximation $(\Delta \bar{u}_0^\sigma, \Delta \bar{v}_0^{\sigma 94})$ to the solution of the system of linear equations (7-7) is defined to be identically equal to zero. For every n=0,1, . . . the approximation $(\Delta \bar{u}_{n+1}^\sigma, \Delta \bar{v}_{n+1}^{\sigma 94})$ is defined in terms of the approximation $(\Delta \bar{u}_n^\sigma, \Delta \bar{v}_n^{\sigma 94})$ as in the relation $$(\Delta \bar{u}_{n+1}^\sigma, \Delta \bar{v}\sigma_{n+1})^T = G^\sigma(\tilde{u}^\sigma, \tilde{v}^\sigma)(\Delta \bar{u}_n^\sigma, \Delta \bar{v}_n^\sigma)^T - h^\sigma(\tilde{u}^\sigma, \tilde{v}^\sigma). \tag{7-10}$$

The process is continued until a proper approximation $(\Delta \bar{u}_N^\sigma, \Delta \bar{v}_N^{\sigma 94})$ to the solution of the system of linear equations (7-7) is achieved. The approximation $(\Delta \bar{u}^\sigma, \Delta \bar{v}^{\sigma 94})$ to the solution of the system of linear equations (6-28) is defined by the relation $$(\Delta \bar{u}^\sigma, \Delta \bar{v}^{\sigma 94})^T = C^\sigma(\tilde{u}^\sigma, \tilde{v}^\sigma)^{-1}(\Delta \bar{u}_N^\sigma, \Delta \bar{v}_N^\sigma)^T. \tag{7-11}$$

The performance of the basic iterative method (7-10) can be improved with the help of the polynomial acceleration applied to the basic iterative method. For the sake of simplicity of the presentation the following notation shall be used:

$$w \equiv (\Delta \bar{u}^\sigma, \Delta \bar{v}^{\sigma 94})^T,\ G \equiv G^\sigma(\tilde{u}^\sigma, \tilde{v}^{\sigma 94}),\ h \equiv h^\sigma(\tilde{u}^\sigma, \tilde{v}^{\sigma 94}). \tag{7-12}$$

Then the basic iterative method (7-10) becomes $$w_{n+1} = G w_n - h. \tag{7-13}$$

The conjugate gradient polynomial acceleration of the basic iterative method (7-13) can be described as follows. Start with the initial approximation bold $w_0$ which is identically equal to zero, then for every n=0,1, . . . the following iterative procedure is applied:

$$w_{n+1} = \rho_n(\gamma_n(G w_n - h) + (1 - \gamma_n) w_n) + (1 - \rho_n) w_{n-1}. \tag{7-14}$$

Here the coefficients $\rho_n$ and $\gamma_n$ are given by the relation $$\rho_n = \frac{\alpha_{n-1} + \alpha_n \beta_n}{\alpha_{n-1}},\ n \geq 1, \rho_0 = 1, \tag{7-15}$$

$$\gamma_n = \frac{\alpha_n \alpha_{n-1}}{\alpha_{n-1} + \alpha_n \beta_n},\ n \geq 1, \gamma_0 = \alpha_0,$$

where $$\alpha_n = \frac{(r_n, r_n)}{(p_n, q_n)},\ n \geq 0, \tag{7-16}$$

$$\beta_n = \frac{(r_n, r_n)}{(r_{n-1}, r_{n-1})},\ n \geq 1, \beta_0 = 0,$$

$$p_n = r_n + \beta_n p_{n-1}, n \geq 1,\ p_0 = r_0,\ q_n = p_n - G p_n,\ n \geq 0, \tag{7-17}$$

$$r_n = G w_n - w_n - h,\ n \geq 0. \tag{7-18}$$

The conjugate gradient method can be expressed in the alternative form $$w_{n+1} = w_n + \alpha_n p_n,\ r_{n+1} = r_n - \alpha_n q_n, \tag{7-19}$$

where the coefficients $\alpha_n$ are defined as in the relation (7-16), while the vectors $p_n$, $q_n$ are given by the relation (7-17).

In an exemplary embodiment of the invention, the five level resolution pyramid was used with the value of the parameter $\sigma$ decreasing by a factor of 2.0 for each successively finer resolution level. A none-points finite-difference discretization was used. The positive integer constant k' appearing in the relations (6-9), (6-10) is equal to 4, while the positive integer constant k" appearing in the relations (6-20), (6-21) is equal to 2. With these values, the present invention is capable of estimating the velocity vector field with good accuracy in the case of the images of real world scenes containing multiple occluding boundaries.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method, comprising the steps of:

(a) capturing a pair of stereo images of a scene separated in a horizontal direction;

(b) creating, using a computer, an in-between image intermediate between the pair by estimating velocity vector fields providing a correspondence between the images using a global search constrained in a horizontal direction and interpolating the in-between image; and (c) producing a depth image from the pair of stereo images and the in-between image.

2. A method as recited in claim 1, wherein step (b) creates plural in-between images.

3. A method as recited in claim 1, wherein step (b) includes aligning an entirety of the pair of stereo and the in-between image in a vertical direction simultaneously.

4. A method as recited in claim 1, wherein step (b) comprises the steps of:

(i) determining a scene correspondence between the pair of stereo images by constraining correspondence searching in the horizontal direction; and (ii) interpolating between the pair of stereo images using the scene correspondence.

* * * * *